United States Patent [19]

Hansen et al.

[11] Patent Number: 5,822,603
[45] Date of Patent: Oct. 13, 1998

[54] HIGH BANDWIDTH MEDIA PROCESSOR INTERFACE FOR TRANSMITTING DATA IN THE FORM OF PACKETS WITH REQUESTS LINKED TO ASSOCIATED RESPONSES BY IDENTIFICATION DATA

[75] Inventors: Craig Hansen, Los Altos; John Moussouris, Palo Alto, both of Calif.

[73] Assignee: Microunity Systems Engineering, Inc., Sunyvale, Calif.

[21] Appl. No.: 754,827

[22] Filed: Nov. 22, 1996

Related U.S. Application Data

[62] Division of Ser. No. 516,036, Aug. 16, 1995, Pat. No. 5,742,840.

[51] Int. Cl.$^6$ ..................................................... G06F 9/00
[52] U.S. Cl. ............................... 395/800.01; 395/200.8
[58] Field of Search ............................. 395/800.01, 670, 395/376, 280, 200, 200.68, 200.8; 364/131–134, 736, 741, 745, 754, 761, 768, 736.01, 741.05, 748.01, 754.01

[56] References Cited

U.S. PATENT DOCUMENTS

| | | | |
|---|---|---|---|
| 4,893,267 | 1/1990 | Alsup et al. | 364/745 |
| 4,975,868 | 12/1990 | Freerksen | 364/748 |
| 5,201,056 | 4/1993 | Daniel et al. | 395/800 |
| 5,268,855 | 12/1993 | Mason et al. | 364/748 |
| 5,426,600 | 6/1995 | Nakagawa et al. | 364/764 |

*Primary Examiner*—Alpesh M. Shah
*Attorney, Agent, or Firm*—McDermott, Will & Emery

[57] ABSTRACT

A general purpose, programmable media processor for processing and transmitting a media data stream of audio, video, radio, graphics, encryption, authentication, and networking information in real-time. The media processor incorporates an execution unit that maintains substantially peak data throughout of media data streams. The execution unit includes a dynamically partionable multi-precision arithmetic unit, programmable switch and programmable extended mathematical element. A high bandwidth external interface supplies media data streams at substantially peak rates to a general purpose register file and the multi-precision execution unit. A memory management unit, and instruction and data cache/buffers are also provided. High bandwidth memory controllers are linked in series to provide a memory channel to the general purpose, programmable media processor. The general purpose, programmable media processor is disposed in a network fabric consisting of fiber optic cable, coaxial cable and twisted pair wires to transmit, process and receive single or unified media data streams. Parallel general purpose media processors are disposed throughout the network in a distributed virtual manner to allow for multi-processor operations and sharing of resources through the network. A method for receiving, processing and transmitting media data streams over the communications fabric is also provided.

11 Claims, 25 Drawing Sheets

Microfiche Appendix Included
(4 Microfiche, 387 Pages)

GROUP DEAL : 128 BITS TO 128 BITS

GROUP SHUFFLE : 128 BITS TO 128 BITS

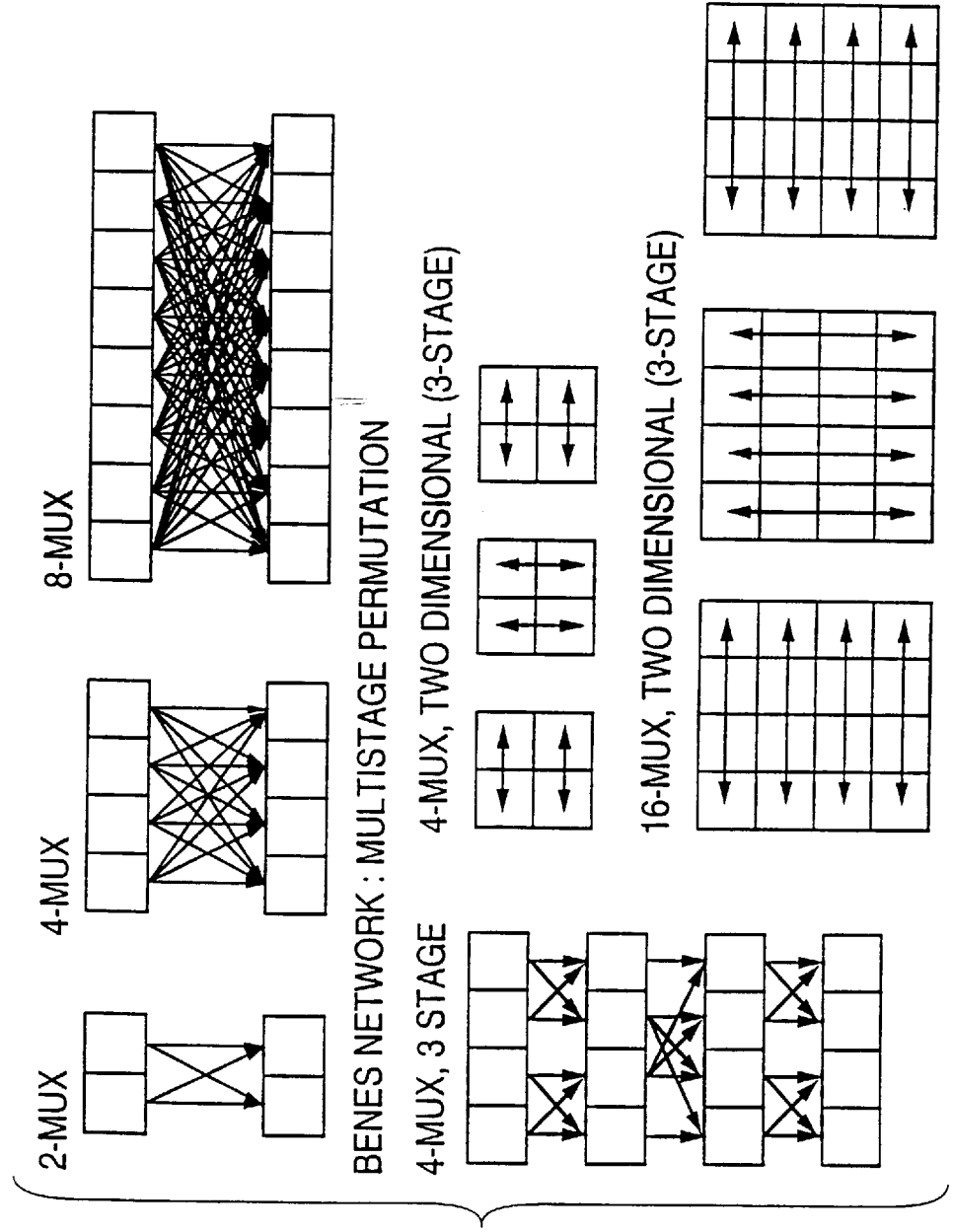

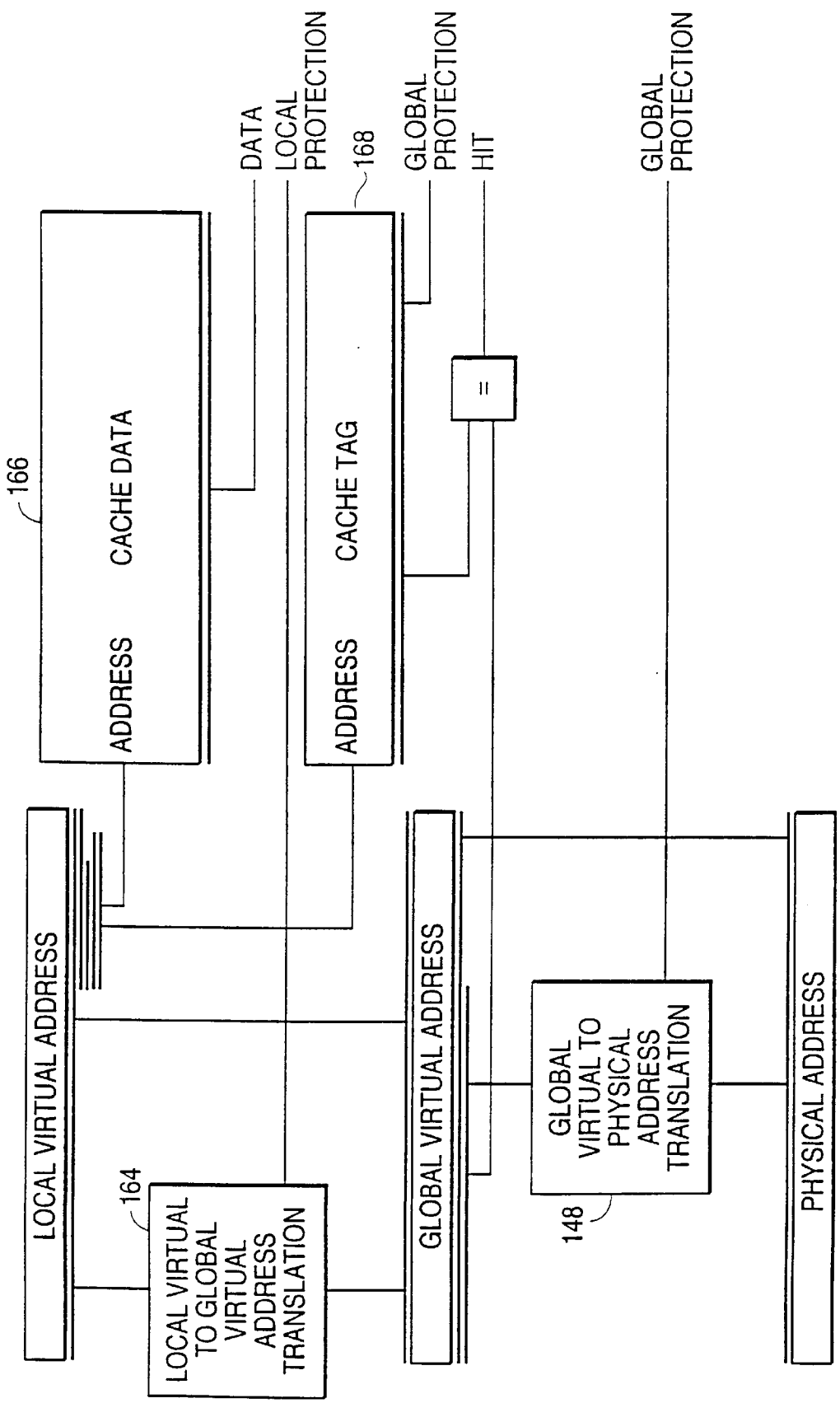

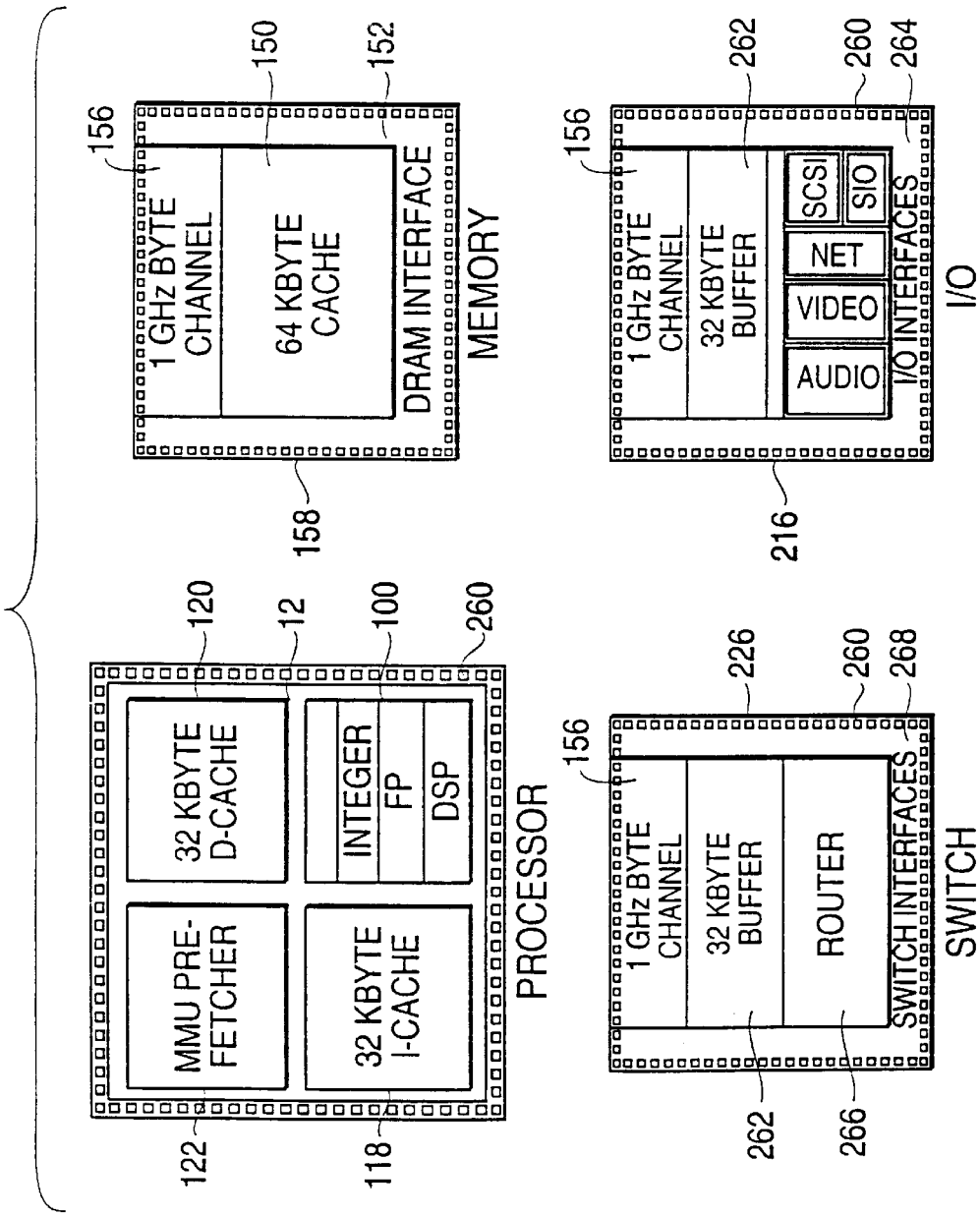

HIGH BANDWIDTH MEDIA PROCESSOR INTERFACE FOR TRANSMITTING DATA IN THE FORM OF PACKETS WITH REQUESTS LINKED TO ASSOCIATED RESPONSES BY IDENTIFICATION DATA

This is a divisional of application Ser. No. 08/516,036, filed Aug. 16, 1995, now U.S. Pat. No. 5,742,840.

A Microfiche Appendix consisting of 4 sheets (387 total frames) of microfiche is included in this application. The Microfiche Appendix contains material which is subject to copyright protection. The copyright owner has no objection to the facsimile reproduction by any one of the Microfiche Appendix, as it appears in the Patent and Trademark Office patent files or records, but otherwise reserves all copyright rights whatsoever.

FIELD OF THE INVENTION

This invention relates to the field of communications processing, and more particularly, to a method and apparatus for real-time processing of multi-media digital communications.

BACKGROUND OF THE INVENTION

Optical fiber and discs have made the transmission and storage of digital information both cheaper and easier than older analog technologies. An improved system for digital processing of media data streams is necessary in order to realize the full potential of these advanced media.

For the past century, telephone service delivered over copper twisted pair has been the lingua franca of communications. Over the next century, broadband services delivered over optical fiber and coax will more completely fulfill the human need for sensory information by supplying voice, video, and data at rates of about 1,000 times greater than narrow band telephony. Current general-purpose microprocessors and digital signal processors ("DSPs") can handle digital voice, data, and images at narrow band rates, but they are way too slow for processing media data at broadband rates.

This shortfall in digital processing of broadband media is currently being addressed through the design of many different kinds of application-specific integrated circuits ("ASICs"). For example, a prototypical broadband device such as a cable modem modulates and demodulates digital data at rates up to 45 Mbits/sec within a single 6 MHZ cable channel (as compared to rates of 28.8 Kbits/sec within a 6 KHz channel for telephone modems) and transcodes it onto a 10/100 baseT connection to a personal computer ("PC") or workstation. Current cable modems thus receive data from a coaxial cable connection through a chain of specialized ASIC devices in order to accomplish Quadrature Amplitude Modification ("QAM") demodulation, Reed-Solomon error correction, packet filtering, Data Encryption Standard ("DES") decryption, and Ethernet protocol handling. The cable modems also transmit data to the coaxial cable link through a second chain of devices to achieve DES encryption, Reed-Solomon block encoding, and Quaternary Phase Shift Keying ("QPSK") modulation. In these environments, a general-purpose processor is usually required as well in order to perform initialization, statistics collection, diagnostics, and network management functions.

The ASIC approach to media processing has three fundamental flaws: cost, complexity, and rigidity. The combined silicon area of all the specialized ASIC devices required in the cable modem, for example, results in a component cost incompatible with the per subscriber price target for a cable service. The cable plant itself is a very hostile service environment, with noise ingress, reflections, nonlinear amplifiers, and other channel impairments, especially when viewed in the upstream direction. Telephony modems have developed an elaborate hierarchy of algorithms implemented in DSP software, with automatic reduction of data rates from 28.8 Kbits/sec to 19.6 Kbits/sec, 14.4 Kbits/sec, or much lower rates as needed to accommodate noise, echoes, and other impairments in the copper plant. To implement similar algorithms on an ASIC-based broadband modem is far more complex to achieve in software.

These problems of cost, complexity, and rigidity are compounded further in more complete broadband devices such as digital set-top boxes, multimedia PCs, or video conferencing equipment, all of which go beyond the basic radio frequency ("RF") modem functions to include a broad range of audio and video compression and decoding algorithms, along with remote control and graphical user interfaces. Software for these devices must control what amounts to a heterogeneous multi-processor, where each specialized processor has a different, and usually eccentric or primitive, programming environment. Even if these programming environments are mastered, the degree of programmability is limited. For example, Motion Picture Expert Group-I ("MPEG-I") chips manufactured by AT&T Corporation will not implement advances such as fractal- and wavelet-based compression algorithms, but these chips are not readily software upgradeable to the MPEG-II standard. A broadband network operator who leases an MPEG ASIC-based product is therefore at risk of having to continuously upgrade his system by purchasing significant amounts of new hardware just to track the evolution of MPEG standards.

The high cost of ASIC-based media processing results from inefficiencies in both memory and logic. A typical ASIC consists of a multiplicity of specialized logic blocks, each with a small memory dedicated to holding the data which comprises the working set for that block. The silicon area of these multiple small memories is further increased by the overhead of multiple decoders, sense amplifiers, write drivers, etc. required for each logic block. The logic blocks are also constrained to operate at frequencies determined by the internal symbol rates of broadband algorithms in order to avoid additional buffer memories. These frequencies typically differ from the optimum speed-area operating point of a given semiconductor technology. Interconnect and synchronization of the many logic and memory blocks are also major sources of overhead in the ASIC approach.

The disadvantages of the prior ASIC approach can be over come by a single unified media processor. The cost advantages of such a unified processor can be achieved by gathering all the many ASIC functions of a broadband media product into a single integrated circuit. Cost reduction is further increased by reducing the total memory area of such a circuit by replacing the multiplicity of small ASIC memories with a single memory hierarchy large enough to accommodate the sum total of all the working sets, and wide enough to supply the aggregate bandwidth needs of all the logic blocks. Additionally, the logic block interconnect circuitry to this memory hierarchy may be streamlined by providing a generally programmable switching fabric. Many of the logic blocks themselves can also replaced with a single multi-precision arithmetic unit, which can be internally partitioned under software control to perform addition, multiplication, division, and other integer and floating point arithmetic operations on symbol streams of varying widths, while sustaining the full data throughput of the memory hierarchy. The residue of logic blocks that perform operations that are neither arithmetic or permutation group oriented can be replaced with an extended math unit that supports additional arithmetic operations such as finite field, ring, and table lookup, while also sustaining the full data throughput of the memory hierarchy.

The above multi-precision arithmetic, permutation switch, and extended math operations can then be organized as machine instructions that transfer their operands to and from a single wide multi-ported register file. These instructions can be further supplemented with load/store instructions that transfer register data to and from a data buffer/cache static random access memory ("SRAM") and main memory dynamic random access memories ("DRAMs"), and with branch instructions that control the flow of instructions executed from an instruction buffer/cache SRAM. Extensions to the load/store instructions can be made for synchronization, and to branch instructions for protected gateways, so that multiple threads of execution for audio, video, radio, encryption, networking, etc. can efficiently and securely share memory and logic resources of a unified machine operating near the optimum speed-area point of the target semiconductor process. The data path for such a unified media processor can interface to a high speed input/output ("I/O") subsystem that moves media streams across ultra-high bandwidth interfaces to external storage and I/O.

Such a device would incorporate all of the processing capabilities of the specialized multi-ASIC combination into a single, unified processing device. The unified processor would be agile and capable of reprogramming through the transmission of new programs over the communication medium. This programmable, general purpose device is thus less costly than the specialized processor combination, easier to operate and reprogram and can be installed or applied in many differing devices and situations. The device may also be scalable to communications applications that support vast numbers of users through massively parallel distributed computing.

It is therefore an object of this invention to process media data streams by executing operations at very high bandwidth rates.

It is also an object of this invention to unify the audio, video, radio, graphics, encryption, authentication, and networking protocols into a single instruction stream.

It is also an object of this invention to achieve high bandwidth rates in a unified processor that is easy to program and more flexible than a heterogeneous combination of special purpose processors.

It is a further object of the invention to support high level mathematical processing in a unified media processor, including finite group, finite field, finite ring and table look-up operations, all at high bandwidth rates.

It is yet a further object of the invention to provide a unified media processor that can be replicated into a multi-processor system to support a vast array of users.

It is yet another object of this invention to allow for massively parallel systems within the switching fabric to support very large numbers of subscribers and services.

It is also an object of the invention to provide a general purpose programmable processor that could be employed at all points in a network.

It is a further object of this invention to sustain very high bandwidth rates to arbitrarily large memory and input/output systems.

SUMMARY OF THE INVENTION

In view of the above, there is provided a system for media processing that maintains substantially peak data throughput in the execution and transmission of multiple media data streams. The system includes in one aspect a general purpose, programmable media processor, and in another aspect includes a method for receiving, processing and transmitting media data streams. The general purpose, programmable media processor of the invention further includes an execution unit, high bandwidth external interface, and can be employed in a parallel multi-processor system.

According to the apparatus of the invention, an execution unit is provided that maintains substantially peak data throughput in the unified execution of multiple media data streams. The execution unit includes a data path, and a multi-precision arithmetic unit coupled to the data path and capable of dynamic partitioning based on the elemental width of data received from the data path. The execution unit also includes a switch coupled to the data path that is programmable to manipulate data received from the data path and provide data streams to the data path. An extended mathematical element is also provided, which is coupled to the data path and programmable to implement additional mathematical operations at substantially peak data throughput. In a preferred embodiment of the execution unit, at least one register file is coupled to the data path.

According to another aspect of the invention, a general purpose programmable media processor is provided having an instruction path and a data path to digitally process a plurality of media data streams. The media processor includes a high bandwidth external interface operable to receive a plurality of data of various sizes from an external source and communicate the received data over the data path at a rate that maintains substantially peak operation of the media processor. At least one register file is included, which is configurable to receive and store data from the data path and to communicate the stored data to the data path. A multi-precision execution unit is coupled to the data path and is dynamically configurable to partition data received from the data path to account for the elemental symbol size of the plurality of media streams, and is programmable to operate on the data to generate a unified symbol output to the data path.

According to the preferred embodiment of the media processor, means are included for moving data between registers and memory by performing load and store operations, and for coordinating the sharing of data among a plurality of tasks by performing synchronization operations based upon instructions and data received by the execution unit. Means are also provided for securely controlling the sequence of execution by performing branch and gateway operations based upon instructions and data received by the execution unit. A memory management unit operable to retrieve data and instructions for timely and secure communication over the data path and instruction path respectively is also preferably included in the media processor. The preferred embodiment also includes a combined instruction cache and buffer that is dynamically allocated between cache space and buffer space to ensure real-time execution of multiple media instruction streams, and a combined data cache and buffer that is dynamically allocated between cache space and buffer space to ensure real-time response for multiple media data streams.

In another aspect of the invention, a high bandwidth processor interface for receiving and transmitting a media stream is provided having a data path operable to transmit media information at sustained peak rates. The high bandwidth processor interface includes a plurality of memory controllers coupled in series to communicate stored media information to and from the data path, and a plurality of memory elements coupled in parallel to each of the plurality of memory controllers for storing and retrieving the media information. In the preferred embodiment of the high bandwidth processor interface, the plurality of memory controllers each comprise a paired link disposed between each memory controller, where the paired links each transmit and receive plural bits of data and have differential data inputs and outputs and a differential clock signal.

Yet another aspect of the invention includes a system for unified media processing having a plurality of general purpose media processors, where each media processor is operable at substantially peak data rates and has a dynamically partitioned execution unit and a high bandwidth interface for communicating to memory and input/output elements to supply data to the media processor at substantially peak rates. A bi-directional communication fabric is provided, to which the plurality of media processors are coupled, to transmit and receive at least one media stream comprising presentation, transmission, and storage media information. The bi-directional communication fabric preferably comprises a fiber optic network, and a subset of the plurality of media processors comprise network servers.

According to yet another aspect of the invention, a parallel multi-media processor system is provided having a data path and a high bandwidth external interface coupled to the data path and operable to receive a plurality of data of various sizes from an external source and communicate the received data at a rate that maintains substantially peak operation of the parallel multi-processor system. A plurality of register files, each having at least one register coupled to the data path and operable to store data, are also included. At least one multi-precision execution unit is coupled to the data path and is dynamically configurable to partition data received from the data path to account for the elemental symbol size of the plurality of media streams, and is programmable to operate in parallel on data stored in the plurality of register files to generate a unified symbol output for each register file.

According to the method of the invention, unified streams of media data are processed by receiving a stream of unified media data including presentation, transmission and storage information. The unified stream of media data is dynamically partitioned into component fields of at least one bit based on the elemental symbol size of data received. The unified stream of media data is then processed at substantially peak operation.

In one aspect of the invention, the unified stream of media data is processed by storing the stream of unified media data in a general register file. Multi-precision arithmetic operations can then be performed on the stored stream of unified media data based on programmed instructions, where the multi-precision arithmetic operations include Boolean, integer and floating point mathematical operations. The component fields of unified media data can then be manipulated based on programmed instructions that implement copying, shifting and re-sizing operations. Multi-precision mathematical operations can also be performed on the stored stream of unified media data based on programmed instructions, where the mathematical operations including finite group, finite field, finite ring and table look-up operations. Instruction and data pre-fetching are included to fill instruction and data pipelines, and memory management operations can be performed to retrieve instructions and data from external memory. The instructions and data are preferably stored in instruction and data cache/buffers, in which buffer storage in the instruction and data cache/buffers is dynamically allocated to ensure real-time execution.

Other aspects of the invention include a method for achieving high bandwidth communications between a general purpose media processor and external devices by providing a high bandwidth interface disposed between the media processor and the external devices, in which the high bandwidth interface comprises at least one uni-directional channel pair having an input port and an output port. A plurality of media data streams, comprising component fields of various sizes, are transmitted and received between the media processor and the external devices at a rate that sustains substantially peak data throughput at the media processor. A method for processing streams of media data is also included that provides a bi-directional communications fabric for transmitting and receiving at least one stream of media data, where the at least one stream of media data comprises presentation, transmission and storage information. At least one programmable media processor is provided within the communications network for receiving, processing and transmitting the at least one stream of unified media data over the bi-directional communications fabric.

The general purpose, programmable media processor of the invention combines in a single device all of the necessary hardware included in the specialized processor combinations to process and communicate digital media data streams in real-time. The general purpose, programmable media processor is therefore cheaper and more flexible than the prior approach to media processing. The general purpose, programmable media processor is thus more susceptible to incorporation within a massively parallel processing network of general purpose media processors that enhance the ability to provide real-time multi-media communications to the masses.

These features are accomplished by deploying server media processors and client media processors throughout the network. Such a network provides a seamless, global media super-computer which allows programmers and network owners to virtualize resources. Rather than restrictively accessing only the memory space and processing time of a local resource, the system allows access to resources throughout the network. In small access points such as wireless devices, where very little memory and processing logic is available due to limited battery life, the system is able to draw upon the resources of a homogeneous multi-computer system.

The invention also allows network owners the facility to track standards and to deploy new services by broadcasting software across the network rather than by instituting costly hardware upgrades across the whole network. Broadcasting software across the network can be performed at the end of an advertisement or other program that is broadcasted nationally. Thus, services can be advertised and then transmitted to new subscribers at the end of the advertisement.

These and other features and advantages of the invention will be apparent upon consideration of the following detailed description of the presently preferred embodiments of the invention, taken in conjunction with the appended drawings.

BRIEF DESCRIPTION OF THE DRAWINGS

FIG. 5(a) shows the current distributed system, and FIG. 5(b) shows a possible integrated approach;

FIG. 8 is a drawing consisting of visual illustrations of the various group operations provided on the media processor, where FIG. 8(d) illustrates the group swizzle operation and FIG. 8(e) illustrates the various group permute operations;

FIG. 9 shows the preferred instruction and data sizes for the general purpose, programmable media processor, where

FIG. 10 is an illustration of a presently preferred memory management unit included in the general purpose processor shown in FIG. 7, where FIG. 10(a) is a translation block diagram and FIG. 10(b) illustrates the functional blocks of the transaction lookaside buffer;

FIG. 16 is a block diagram showing multiple memory channels connected to the general purpose media processor shown in FIG. 7, where

FIG. 18 shows a multi-processor configuration employing the general purpose media processor shown in FIG. 7, where FIG. 19 shows a presently preferred multi-chip implementation of the general purpose, programmable media processor of the invention.

DETAILED DESCRIPTION OF THE PRESENTLY PREFERRED EMBODIMENTS

Figure 1:
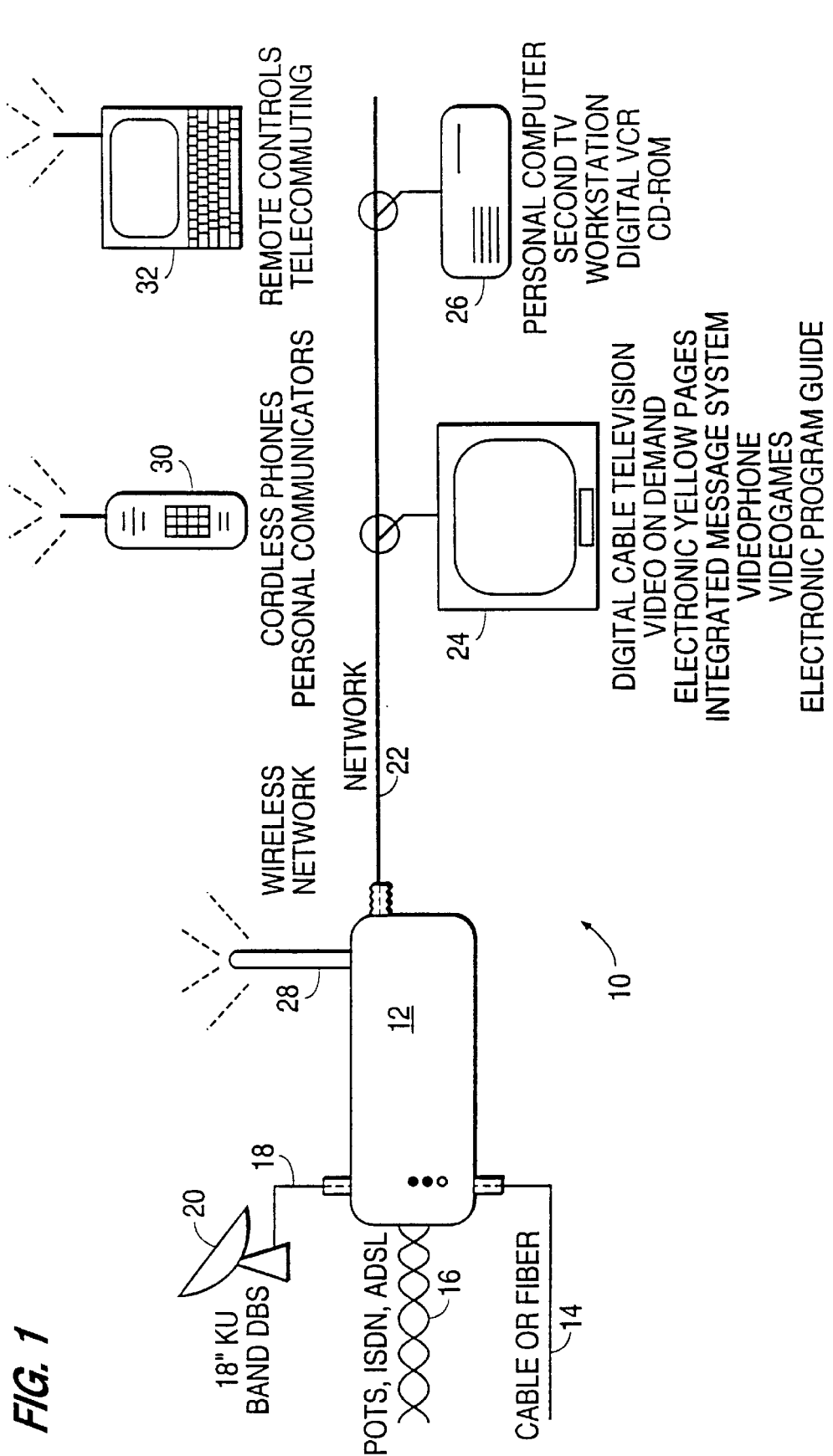
FIG. 1 is a block diagram of a broad band media computer employing the general purpose. programmable media processor of the invention.

Referring to the drawings, where like-reference numerals refer to like elements throughout, a broad band microcomputer 10 is provided in FIG. 1. The broad band microcomputer 10 consists essentially of a general purpose media processor 12. As will be described in more detail below, the general purpose media processor 12 receives, processes and transmits media data streams in a bi-directional manner from upstream network components to downstream devices. In general, media data streams received from upstream network components can comprise any combination of audio, video, radio, graphics, encryption, authentication, and networking information. As those skilled in the art will appreciate, however, the general purpose media processor 12 is in no way limited to receiving, processing and transmitting only these types of media information. The general purpose media processor 12 of the invention is capable of processing any form of digital media information without departing from the spirit and essential scope of the invention.

System Configuration

In the preferred embodiment of the invention shown in FIG. 1, media data streams are communicated to the media processor 12 from several sources. Ideally, unified media data streams are received and transmitted by the general purpose media processor 12 over a fiber optic cable network 14. As will be described in more detail below, although a fiber optic cable network is preferred, the presently existing communications network in the U.S. consists of a combination of fiber optic cable, coaxial cable and other transmission media. Consequently, the general purpose media processor 12 can also receive and transmit media data streams over coaxial cable 14 and traditional twisted pair wire connections 16. The specific communications protocol employed over the twisted pair 16, whether POTS, ISDN or ADSL, is not essential; all protocols are supported by the broad band microcomputer 10. The details of these protocols are generally known to those skilled in the art and no further discussion is therefore needed or provided herein.

Another form of upstream network communication is through a satellite link 18. The satellite link 18 is typically connected to a satellite receiver 20. The satellite receiver 20 comprises an antenna, usually in the form of a satellite dish, and amplification circuitry. The details of such satellite communications are also generally known in the art, and further detail is therefore not provided or included herein.

As described above, the general purpose media processor 12 communicates in a bi-directional manner to receive, process and transmit media data streams to and from downstream devices. As shown in FIG. 1, downstream communication preferably takes place in at least two forms. First, media data streams can be communicated over a bi-directional local network 22. Various types of local networks 22 are generally known in the art and many different forms exist. The general purpose media processor 12 is capable of communicating over any of these local networks 22 and the particular type of network selected is implementation specific.

The local network 22 is preferably employed to communicate between the unified processor 12, and audio/visual devices 24 or other digital devices 26. Presently preferred examples of audio/visual devices 24 include digital cable television, video-on-demand devices, electronic yellow pages services, integrated message systems, video telephones, video games and electronic program guides. As those skilled in the art will appreciate, other forms of audio/video devices are contemplated within the spirit and scope of the invention. Presently preferred embodiments of other digital devices 26 for communication with the general purpose media processor 12 include personal computers, television sets, work stations, digital video camera recorders, and compact disc read-only memories. As those skilled in the art will also appreciate, further digital devices 26 are contemplated for communication to the general purpose media processor 12 without departing from the spirit and scope of the invention.

Second, the general purpose media processor preferably also communicates with downstream devices over a wireless network 28. In the presently preferred embodiment of the invention, wireless devices for communication over the wireless network 28 can comprise either remote communication devices 30 or remote computing devices 32. Presently preferred embodiments of the remote communications devices 30 include cordless telephones and personal communicators. Presently preferred embodiments of the remote computing devices 32 include remote controls and telecommunicating devices. As those skilled in the art will appreciate, other forms of remote communication devices 30 and remote computing devices 32 are capable of communication with the general purpose media processor 12 without departing from the spirit and scope of the invention. An agile digital radio (not shown) that incorporates a general purpose media processor 12 may be used to communicate with these wireless devices.

Network Configuration

Figure 2:
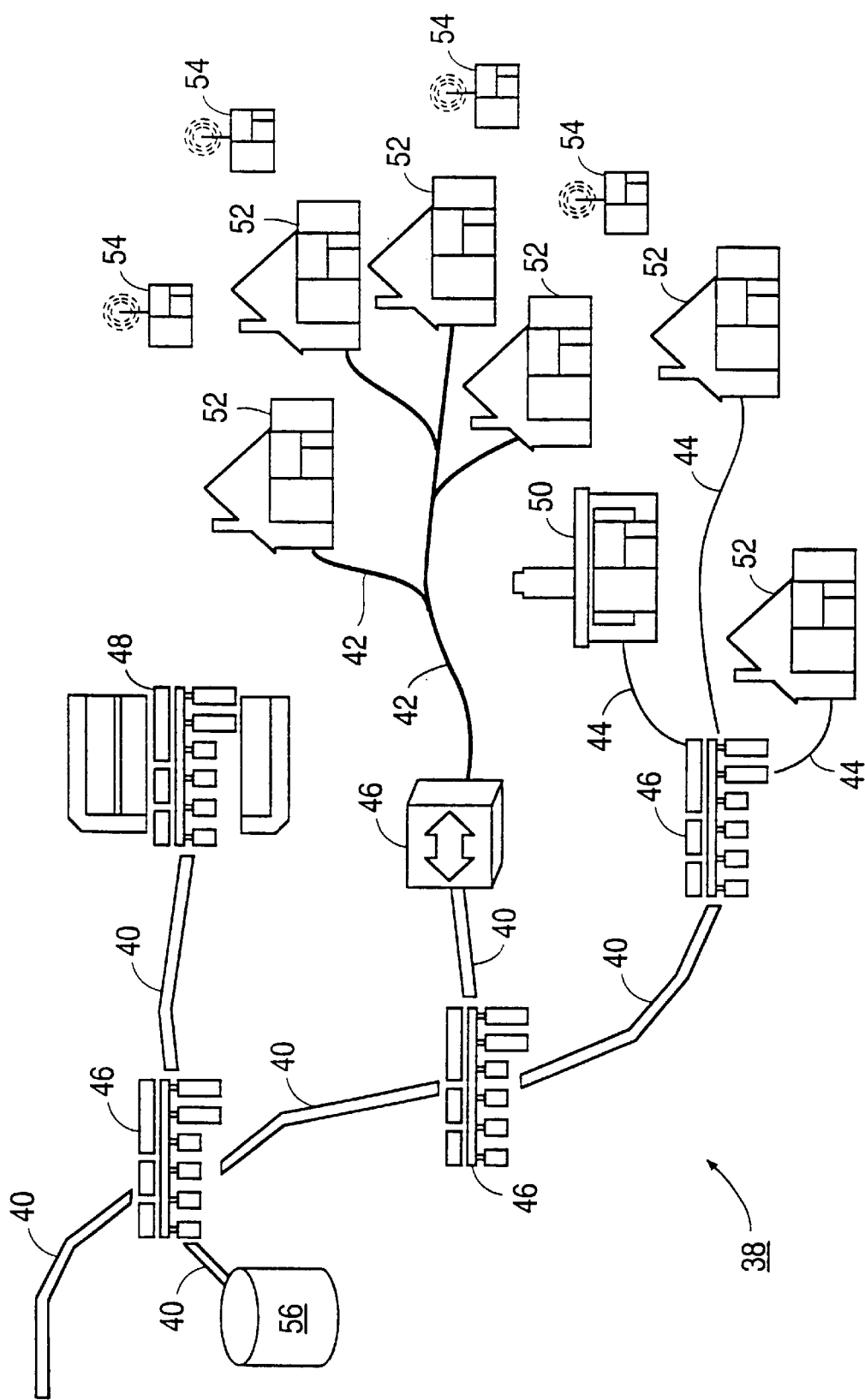
FIG. 2 is a block diagram of a global media processor employing multiple general purpose media processors according to the invention.

Referring now to FIG. 2, the general purpose media processor 12 is preferably disposed throughout a digital communications network 38. In order to enable communication among large and small businesses, residential customers and mobile users, the network 38 can consist of a combination of many individual sub-networks comprised of three main forms of interconnection. The trunk and main branches of the network 38 preferably employ fiber optic cable 40 as the preferred means of interconnection. Fiber optic cable 40 is used to connect between general purpose media processors 12 disposed as network servers 46 or large business installations 48 that are capable of coupling directly to the fiber optic link 40. For communications to small business and residential customers that may be incapable of directly coupling to the fiber optic cable 40, a general purpose media processor 12 can be used as an interface to other forms of network interconnection.

As shown in FIG. 2, alternate forms of interconnection consist of coaxial cable lines 42 and twisted pair wiring 44. Coaxial cable lines are currently in place throughout the U.S. and is typically employed to provide cable television services to residential homes. According to the preferred embodiment of the invention, general purpose media processors 12 can be installed at these residential locations 52. In contrast to the specialized processor approach, the general purpose media processor 12 provides enough bandwidth to allow for bi-directional communications to and from these residential locations 52.

Network servers 46 controlled by general purpose media processors 12 are also employed throughout the network 38. For example, the network servers 46 can be used to interface between the fiber optic network 40 and twisted pair wiring 44. Twisted pair wiring 44 is still employed for small businesses 50 and residential locations 52 that do not or cannot currently subscribe to coaxial cable or fiber optic network services. General purpose media processors 12 are also disposed at these small business locations 50 and non-cable residential locations 52. General purpose media processors 12 are also installed in wireless or mobile locations 52, which are coupled to the network 38 through agile digital radios (not shown). As shown in FIG. 2, network databases or other peripherals 56 can also coupled to general purpose media processors 12 in the network 38.

Figure 3:
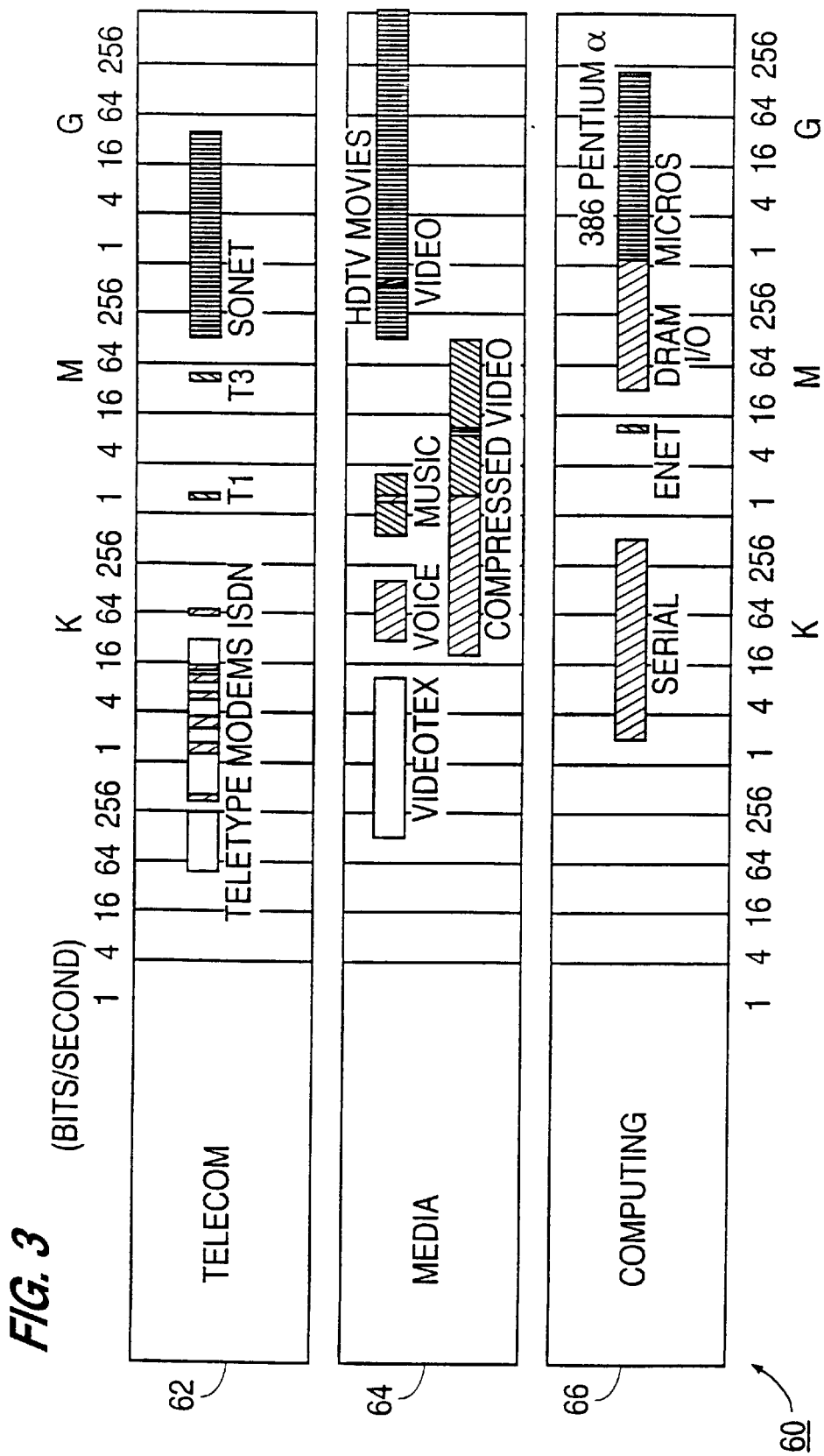
FIG. 3 is an illustration of the digital bandwidth spectrum for telecommunications, media and computing communications.

The general purpose media processor 12 is operable at significantly high bandwidths in order to receive, process and transmit unified media data streams. Referring to FIG. 3, the respective frequencies for various types of media data streams are set forth against a bandwidth spectrum 60. The bandwidth spectrum 60 includes three component spectrums, all along the same range of frequencies, which represent the various frequency rates of digital media communications. Current computing bandwidth capabilities are also displayed. The telecommunications spectrum 62 shows the various frequency bands used for telecommunications transmission. For example, teletype terminals and modems operate in a range between approximately 64 bits/second to 16 kilobits/second. The ISDN telecommunication protocol operates at 64 kilobits/second. At the upper end of the telecommunications spectrum 62, T1 and T3 trunks operate at one megabit per second and 32 megabits per second, respectively. The SONET frequency range extends from approximately 128 megabits per second up to approximately 32 gigabits per second. Accordingly, in order to carry such broad band communications, the general purpose media processor 12 is capable of transferring information at rates into the gigabits per second range or higher.

A spectrum of typical media data streams is presented in the media spectrum 64 shown in FIG. 3. Voice and music transmissions are centered at frequencies of approximately 64 kilobits per second and one megabit per second, respectively. At the upper end of the media spectrum 64, video transmission takes place in a range from 128 megabits per second for high density television up to over 256 gigabits per second for movie applications. When using common video compression techniques, however, the video transmission spectrum can be shifted down to between 32 kilobits per second to 128 megabits per second as a result of the data compression. As described below, the processing required to achieve the data compression results in an increase in bandwidth requirements.

Current computing bandwidths are shown in the computing spectrum 66 of FIG. 3. Serial communications presently take place in a range between two kilobits per second up to 512 kilobits per second. The Ethernet network protocol operates at approximately 8 megabits per second. Current dynamic random access memory and other digital input/output peripherals operate between 32 megabits per second and 512 megabits per second. Presently available microprocessors are capable of operation in the low gigabits per second range. For example, the '386 Pentium microprocessor manufactured by Intel Corporation of Santa Clara, Calif. operates in the lower half of that range, and the Alpha microprocessor manufactured by Digital Equipment Corporation approaches the 16 gigabits per second range.

Figure 4:
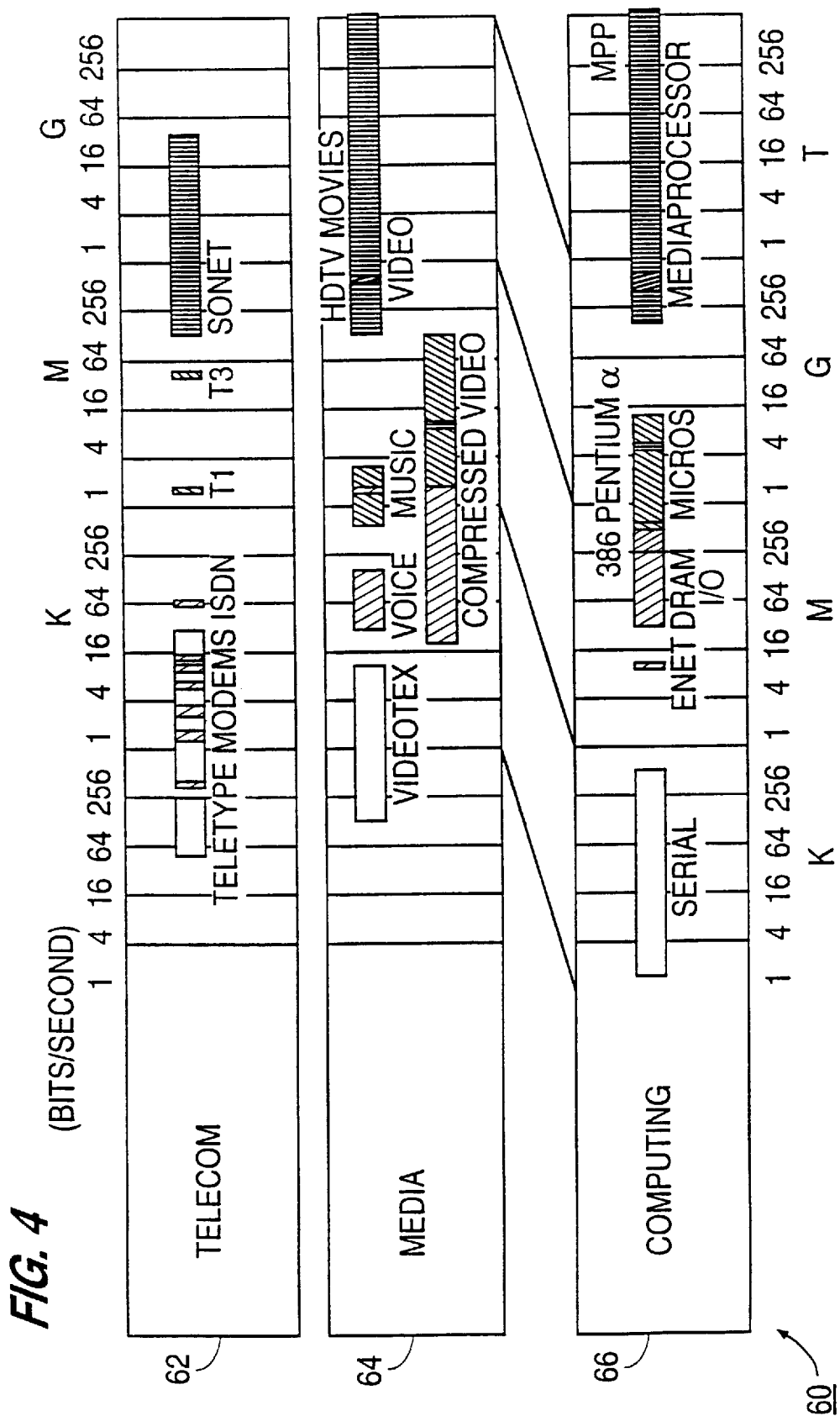
FIG. 4 is the digital bandwidth spectrum shown in FIG. 3 taking into account the bandwidth overhead associated with compressed video techniques.

When video compression is employed, as expressed above, the associated processing overhead reduces the effective bandwidth of the particular processor. As a result, in order to handle compressed video, these processors must operate in the terahertz frequency range. The bandwidth spectrum 60 shown in FIG. 4 represents the effect of handling media data streams including compressed video.

The computing spectrum 66 is skewed down to properly align the computing bandwidth requirements with the telecommunications spectrum 62 and the media spectrum 64. Accordingly, current processor technology is not sufficient to handle the transmission and processing associated with complex streams of multi-media data.

Figure 5:
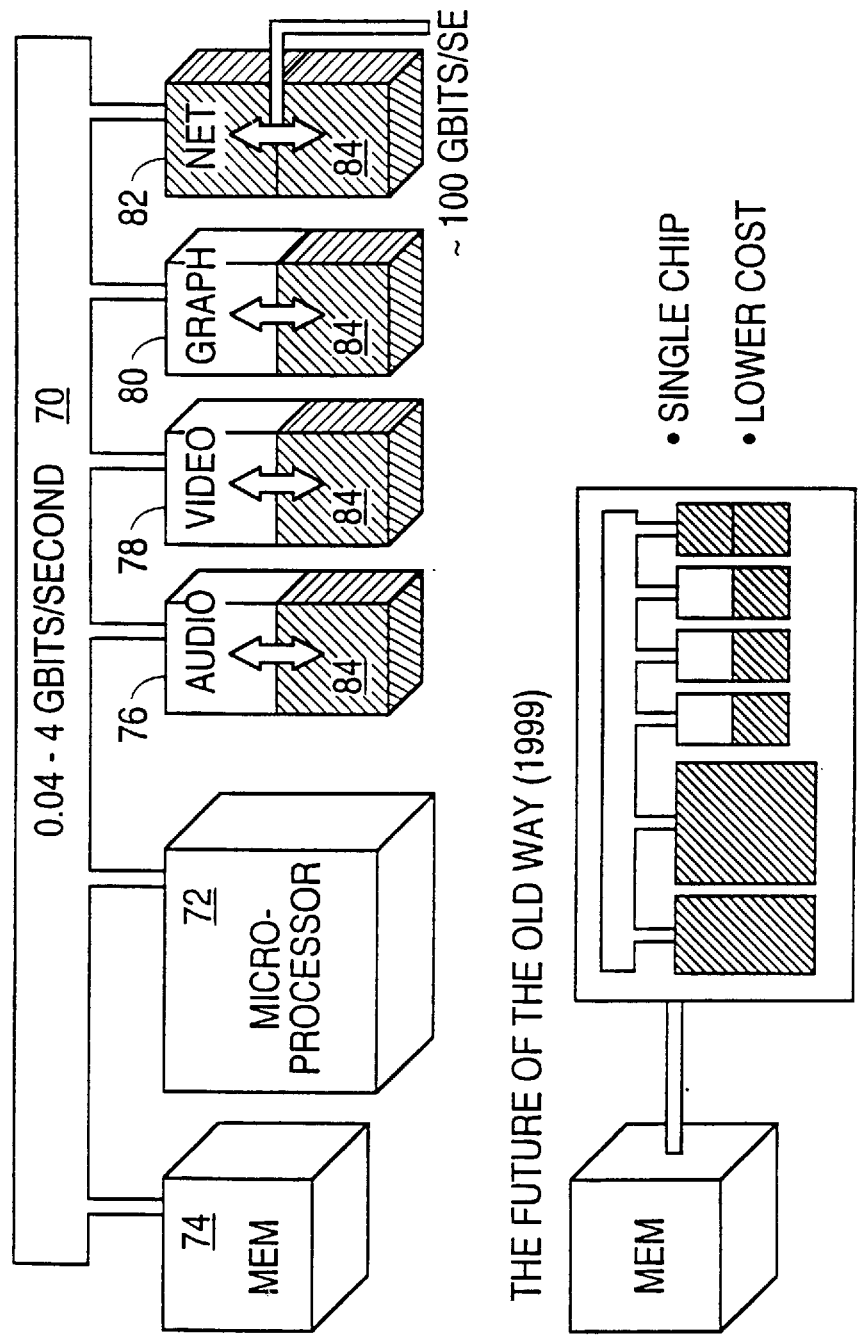
FIG. 5 is a block diagram of the current specialized processor solution for mass media communication, where

The current specialized processor approach to media processing is illustrated in the block diagram shown in FIG. 5. As shown in FIG. 5, special purpose processors are coupled to a back plane 70, which is capable of transmitting instructions and data at the upper kilobits to lower gigabits per second range. In a typical configuration, an audio processor 76, video processor 78, graphics processor 80 and network processor 82 are all coupled to the back plane 70. Each of the audio, video, graphics and network processors 76–82 typically employ their own private or dedicated memories 84, which are only accessible to the specific processor and not accessible over the back plane 70. As described above, however, unless video data streams are constantly being processed, for example, the video processor 78 will sit idle for periods of time. The computing power of the dedicated video processor 78 is thus only available to handle video data streams and is not available to handle other media data streams that are directed to other dedicated processors. This, of course, is an inefficient use of the video processor 78 particularly in view of the overall processing capability of this multi-processor system.

Figure 6:
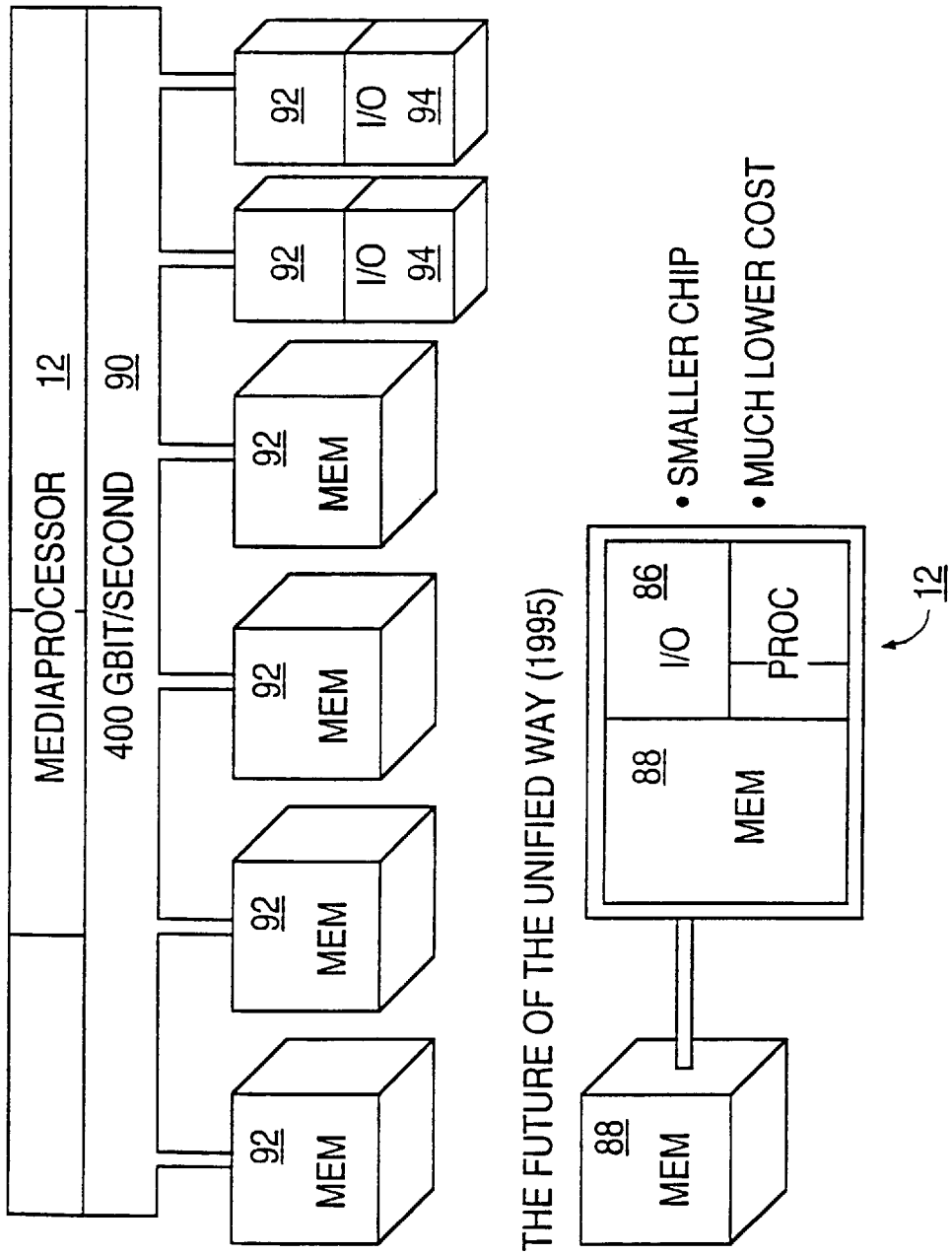
FIG. 6 is a block diagram of two presently preferred general purpose media processors.

The general purpose media processor 12, in contrast, handles a data stream of audio, video, graphics and network information all at the same time with the same processor. In order to handle the ever changing combination of data types, the general purpose media processor 12 is dynamically partitionable to allocate the appropriate amount of processing for each combination of media in a unified media data stream. A block diagram of two preferred general purpose media processor system configurations is shown in FIG. 6. Referring to FIG. 6(a), a general purpose media processor 12 is coupled to a high-speed back plane 90. The presently preferred back plane 90 is capable of operation at 30 gigabits per second. As those skilled in the art will appreciate, back planes 90 that are capable of operation at 400 gigabits per second or greater bandwidth are envisioned within the spirit and scope of the invention. Multiple memory devices 92 are also coupled to the back plane 90, which are accessible by the general purpose media processor 12. Input/output devices 94 are coupled to the back plane 90 through a dual-ported memory 92. The configuration of the input/output devices 94 on one end of the dual-ported memory 92 allows the sharing of these memory devices 92 throughout a network 38 of general purpose media processors 12.

Alternatively, FIG. 6(b) shows a presently preferred integrated general purpose media processor 12. The integrated processor includes on-board memory and I/O 86. The on-board memory is preferably of sufficient size to optimize throughput, and can comprise a cache and/or buffer memory or the like. The integrated media processor 12 also connects to external memory 88, which is preferably larger than the on-board memory 86 and forms the system main memory.

Execution Unit

Figure 7:
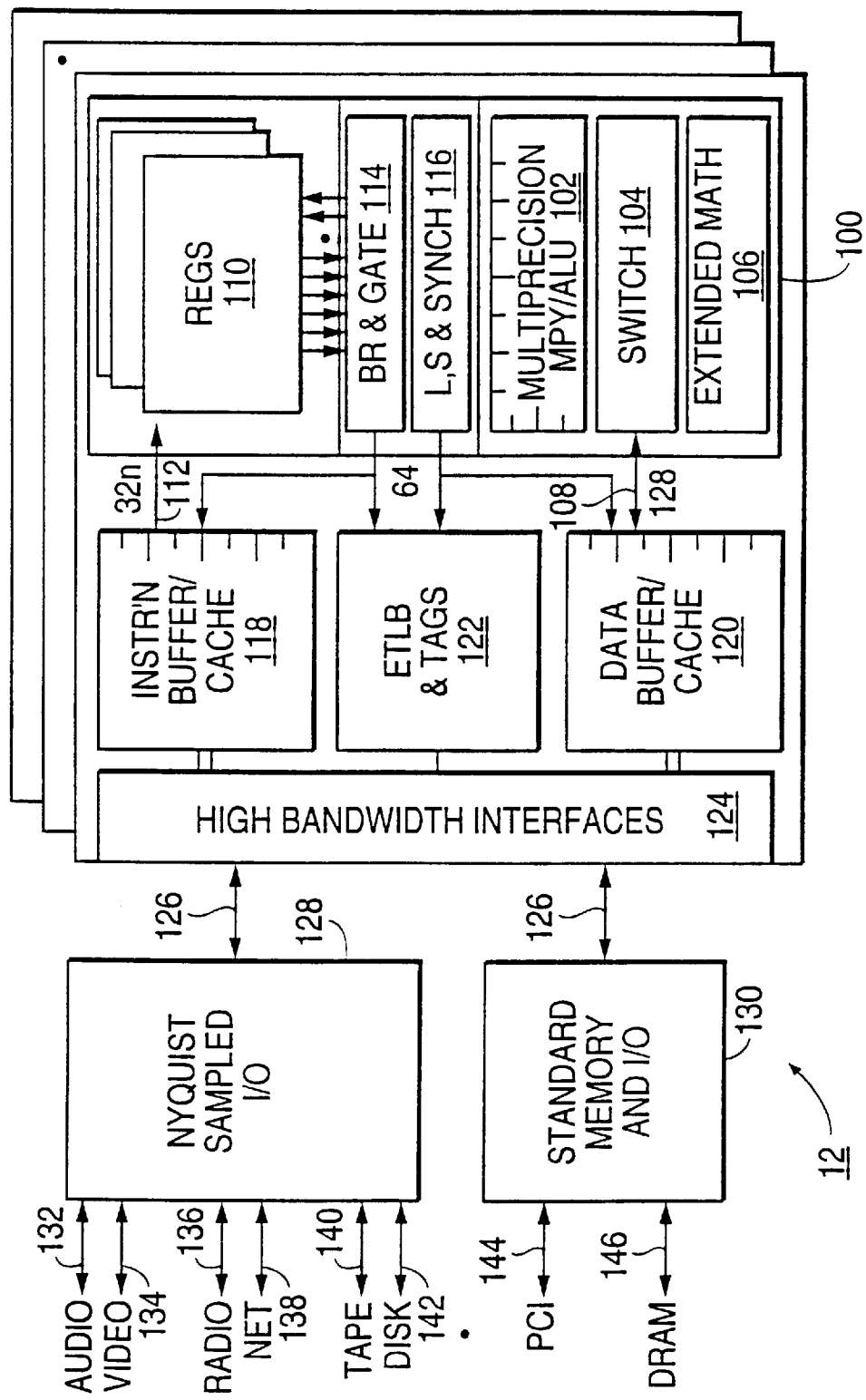
FIG. 7 is a block diagram of the presently preferred structure of a general purpose, programmable media processor according to the invention.

One presently preferred embodiment of an integrated general purpose media processor 12 is shown in FIG. 7. The core of the integrated general purpose media processor 12 comprises an execution unit 100. Three main elements or subsections are included in the execution unit 100. A multiple precision arithmetic/logic unit ("ALU") 102 performs all logical and simple arithmetic operations on incoming media data streams. Such operations consist of calculate and control operations such as Boolean functions, as well as addition, subtraction, multiplication and division. These operations are performed on single or unified media data streams transmitted to and from the multiple precision ALU 102 over a data bus or data path 108. Preferably the data path 108 is 128 bits wide, although those skilled in the art will appreciate that the data path 108 can take on any width or size without departing from the spirit and scope of the invention. The wider the data path 108 the more unified media data can be processed in parallel by the general purpose media processor 12.

Coupled to the multi-precision ALU 102 via the data path 108, and also an element of the execution unit 100, is a programmable switch 104. The programmable switch 104 performs data handling operations on single or unified media data streams transmitted over the data path 108. Examples of such data handling operations include deals, shuffles, shifts, expands, compresses, swizzles, permutes and reverses, although other data handling operations are contemplated. These operations can be performed on single bits or bit fields consisting of two or more bits up to the entire width of the data path 108. Thus, single bits or bit fields of various sizes can be manipulated through programmable operation of the switch 104.

Examples of the presently preferred data manipulation operations performed by the general purpose media processor 12 are shown in FIG. 8. A group expand operation is visually illustrated in FIG. 8(a). According to the group expand operation, a sequential field of bits 270 can be divided into constituent sub-fields 272a–272d for insertion into a larger field array 274. The reverse of the group expand operation is a group compress or extract operation. A visual illustration of the group compress or extract operation is shown in FIG. 8(b). As shown, separate sub-fields 272a–272d from a larger bit field 274 can be combined to form a contiguous or sequential field of bits 270.

Figure 8A:
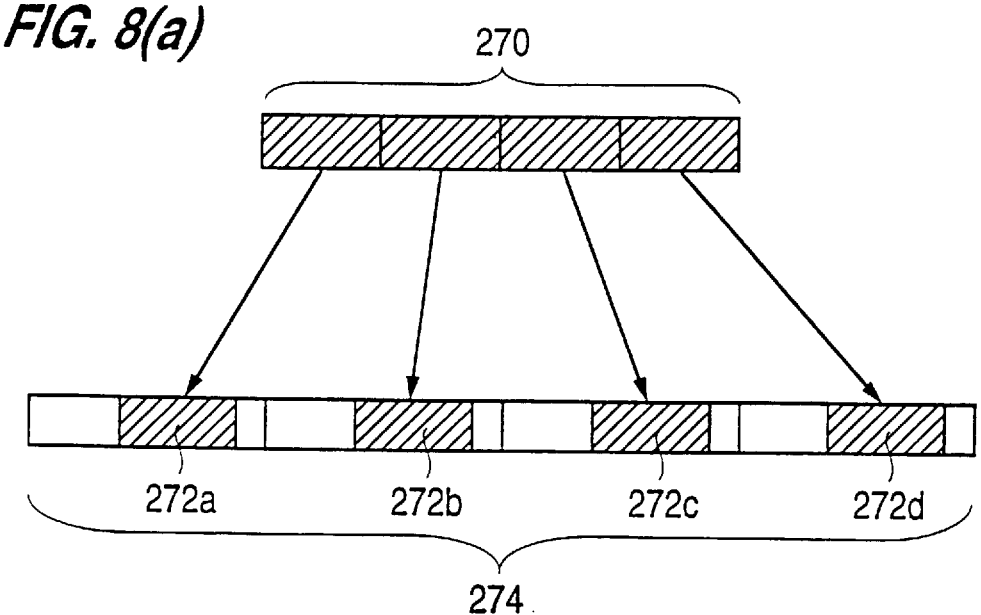
FIG. 8(a) illustrates the group expand operation.
Figure 8B:
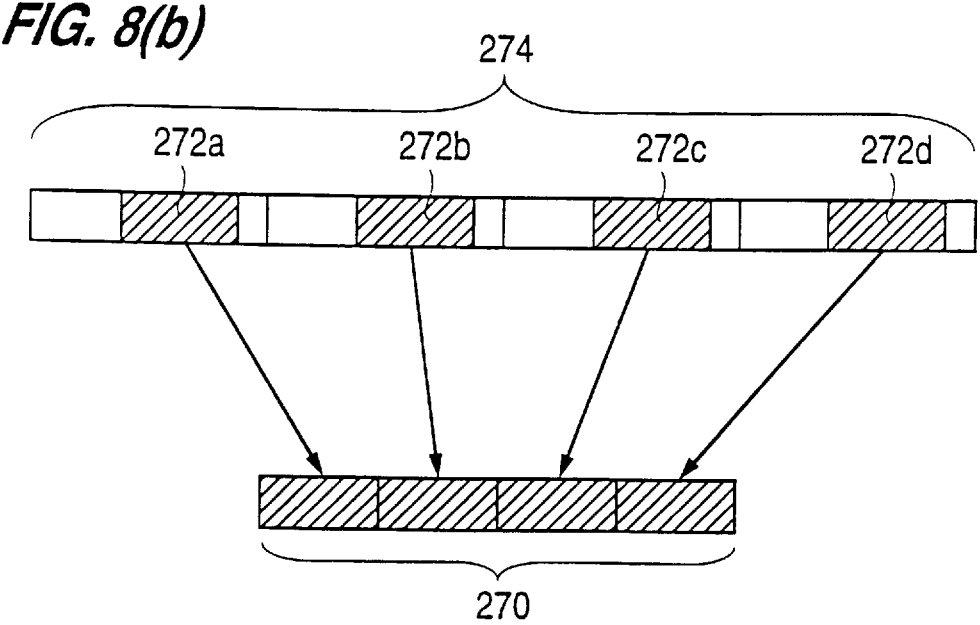
FIG. 8(b) illustrates the group compress or extract operation.
Figure 8C:
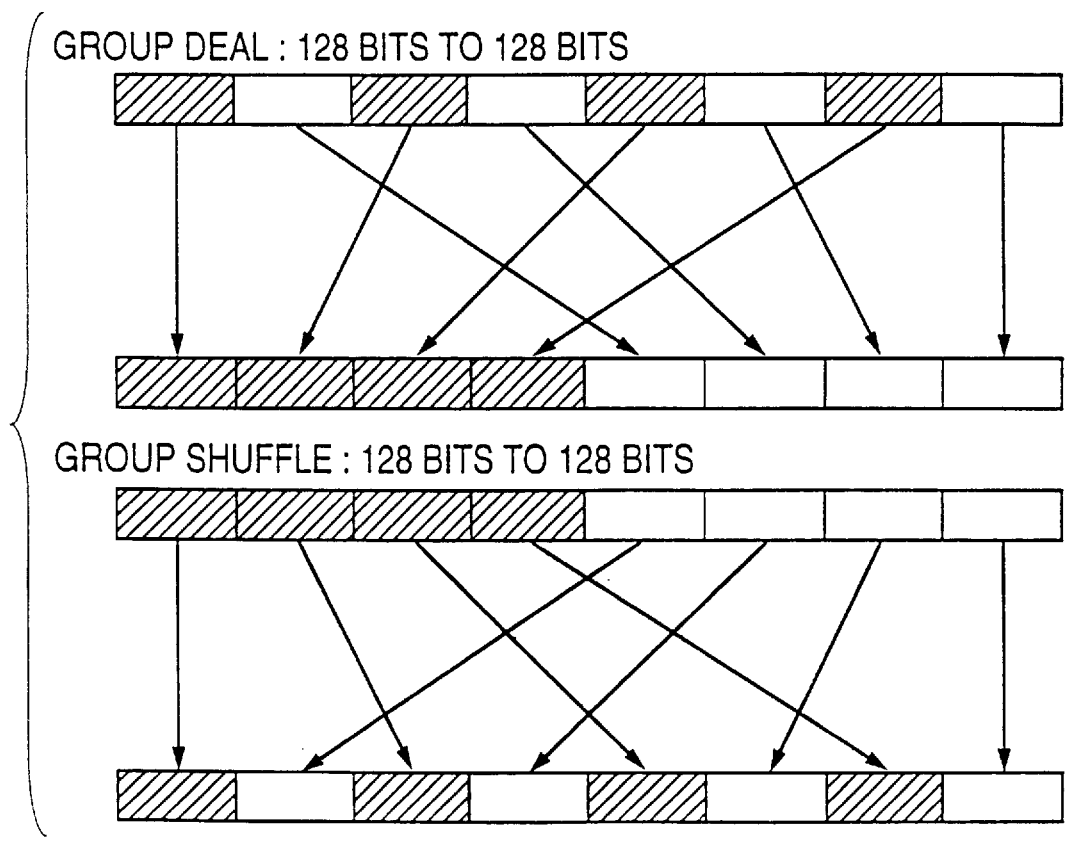
FIG. 8(c) illustrates the group deal and shuffle operations.
Figure 8D:
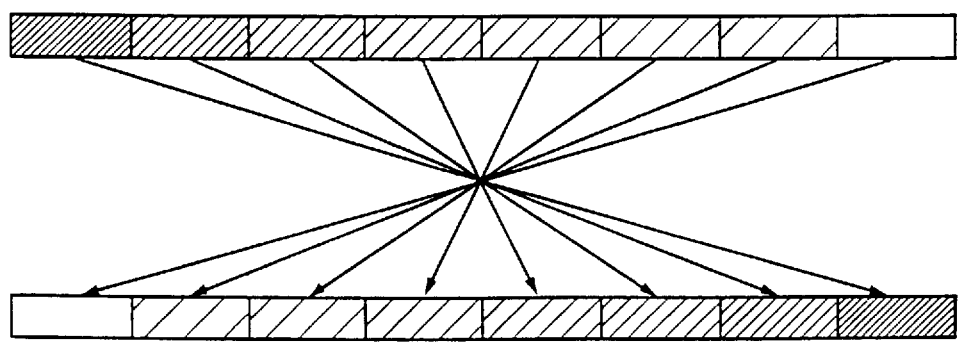

Referring to FIGS. 8(c)–8(e), group deal, shuffle, swizzle and permute operations performed by the programmable switch 104 are also illustrated. The operations performed by these instructions are readily understood from a review of the drawings. The group manipulation operations illustrated in FIGS. 8(a)–8(e) comprise the presently contemplated data manipulation operations for the general purpose media processor 12. As those skilled in the art will appreciate, either a subset of these operations or additional data manipulation operations can be incorporated in other alternate embodiments of the general purpose media processor 12 without departing from the spirit and scope of the invention.

Referring again to FIG. 7, higher level mathematical operations than those performed by the multi-precision ALU 102 are performed in the general purpose media processor 12 through an extended math element 106. The extended math element 106 is coupled to the data path 108 and also comprises part of the execution unit 100. The extended math element 106 performs the complex arithmetic operations necessary for video data compression and similarly intensive mathematical operations. One presently preferred example of an extended math operation comprises a Galois field operation. Other examples of extended mathematical functions performed by the extended math element 106 include CRC generation and checking, Reed-Solomon code generation and checking, and spread-spectrum encoding and decoding. As those skilled in the art appreciate, additional mathematical operations are possible and contemplated.

According to the preferred embodiment of the integrated general purpose media processor 12, a register file 110 is provided in addition to the execution unit 100 to process media data. The register file 110 stores and transmits data streams to and from the execution unit 100 via the data path 108. Rather than employing a complex set of specific or dedicated registers, the general purpose media processor 12 preferably includes 64 general purpose registers in the register file 110 along with one program counter (not shown). The 64 general purpose registers contained in the One presently preferred instruction set for the general purpose media processor 12 is included in the Microfiche Appendix, the contents of which are hereby incorporated herein by reference. A list of the presently preferred major operation codes for the general purpose media processor 12 appears below in Table I.

TABLE I

MAJOR OPERATION CODES
major operation code field values

| MAJOR | 0 | 32 | 64 | 96 | 128 | 160 | 192 | 224 |
|---|---|---|---|---|---|---|---|---|
| 0 | ERES | GSHUFFLEI | FMULADD16 | GMULADD1 | LU16LAI | SAAS64LAI | EADDIO | BFE16 |
| 1 | ESHUFFLE14MUX | GSHUFFLE14MUX | FMULADD32 | GMULADD2 | LU16BAI | SAAS64BAI | EADDIUO | BFNUE16 |
| 2 | | GSELECT8 | FMULADD64 | GMULADD4 | LU16LI | SCAS64LAI | ESETIL | BFNUGE16 |
| 3 | EMDEPI | GMDEPI | | GMULADD8 | LU16BI | SCAS64BAI | ESETIGE | BFNUL16 |
| 4 | EMUX | GMUX | FMULSUB16 | GMULADD16 | LU32LAI | SMAS64LAI | ESETIE | BFE32 |
| 5 | E8MUX | G8MUX | FMULSUB32 | GMULADD32 | LU32BAI | SMAS64BAI | ESETINE | BFNUE32 |
| 6 | EGFMUL64 | GGFMUL8 | FMULSUB64 | GMULADD64 | LU32LI | SMUX64LAI | ESETIUL | BFNUGE32 |
| 7 | ETRANSPOSE8MUX | GTRANSPOSE4MUX | | GEXTRACT128 | LU32BI | SMUX64BAI | ESETIUGE | BFNUL32 |
| 8 | | | | | L16LAI | S16LAI | ESUBIO | BFE64 |
| 9 | ESWIZZLE | GSWIZZLE | | GUMULADD2 | L16lBAI | S16BAI | ESUBIUO | BFNUE64 |
| 10 | | GSWIZZLECOPY | | GUMULADD4 | L16LI | S16LI | ESUBIL | BFNUGE64 |
| 11 | | GSWIZZLESWAP | | GUMULADD8 | L16BI | S16BI | ESUBIGE | BFNUL64 |
| 12 | EDEPI | GDEPI | F.16 | GUMULADD16 | L32LAI | S32LAI | ESUBIE | BFE128 |
| 13 | EUDEPI | GUDEPI | F.32 | GUMULADD32 | L32BAI | S32BAI | ESUBINE | BFNUE128 |
| 14 | EWTHI | GWTHI | F.64 | GUMULADD64 | L32LI | S32LI | ESUBIUL | BFNUGE128 |
| 15 | EUWTHI | GUWTHI | | GUEXTRACT128 | L32BI | S32BI | ESUBIUGE | BFNUL128 |
| 16 | | | GFMULADD16 | GEXTRACTI | L64LAI | S64LAI | EADDI | BANDE |
| 17 | | | GFMULADD32 | GEXTRACTI16 | L64BAI | S64BAI | EXORI | BANDNE |
| 18 | | | GFMULADD64 | GEXTRACTI32 | L64LI | S64LI | EORI | BL/BLZ |
| 19 | | | GFMULADD128 | GUEXTRACTI64 | L64BI | S64BI | EANDI | BGE/BGEZ |
| 20 | | | GFMULSUB16 | GEXTRACT | L126LAI | Sl28LAI | ESUBI | BE |
| 21 | | | GFMULSUB32 | .I.64 | L128BAI | S128BAI | | BNE |
| 22 | | | GFMULSUB64 | G.EXTRACT | L128LI | S128LI | ENORI | BUL/BGZ |
| 23 | | | GFMULSUB128 | .I.128 | L128BI | S128BI | ENANDI | BUGE/BLEZ |
| 24 | | | | G.1 | L8I | S8I | | BGATEI |
| 25 | | | | G.2 | LU8I | | | |
| 26 | | | | G.4 | | | | |
| 27 | | | | G.8 | | | | |
| 28 | | ECOPYI | GF.16 | G.16 | | | ECOPYI | BI |
| 29 | | | GF.32 | G.32 | | | | BLINKI |
| 30 | | | GF.64 | G.64 | | | | |
| 31 | | E.MINOR | GF.128 | G.128 | L.MINOR | S.MINOR | E.MINOR | B.MINOR | register file 110 are all available to the user/programmer, and comprise a portion of the user state of the general purpose media processor 12. The general purpose registers are preferably capable of storing any form of data. Each register within the register file 110 is coupled to the data path 108 and is accessible to the execution unit 100 in the same manner. Thus, the user can employ a general purpose register according to the specific needs of a particular program or unique application. As those skilled in the art will appreciate, the register file 110 can also comprise a plurality of register files 110 configured in parallel in order to support parallel multi-threaded processing.

Instruction Set and User Programming

Control or manipulation of data processed by the general purpose media processor 12 is achieved by selected instructions programmed by the user. Those skilled in the art will appreciate that a great number of programs are possible through various sequences of instructions. Particular programs can be developed for each unique implementation of the general purpose media processor 12. A detailed discussion of such specific programs is therefore beyond the scope of this description.

As shown in Table I, the major operation codes are grouped according to the function performed by the operations. The operations are thus arranged and listed above according to the presently preferred operation code number for each instruction. As many as 255 separate operations are contemplated for the preferred embodiment of the general purpose media processor 12. As shown in Table I, however, not all of the operation codes are presently implemented. As those skilled in the art will appreciate, alternate schemes for organizing the operation codes, as well as additional operation codes for the general purpose media processor 12, are possible.

The instructions provided in the instruction set for the general purpose media processor 12 control the transfer, processing and manipulation of data streams between the register file 110 and the execution unit 100. The presently preferred width of the instruction path 112 is 32-bits wide, organized as four eight-bit bytes ("quadlets"). Those skilled in the art will appreciate, however, that the instruction path 112 can take on any width without departing from the spirit and scope of the invention. Preferably, each instruction within the instruction set is stored or organized in memory on four-byte boundaries. The presently preferred format for instructions is shown in FIG. 9(*a*).

Figure 9A:
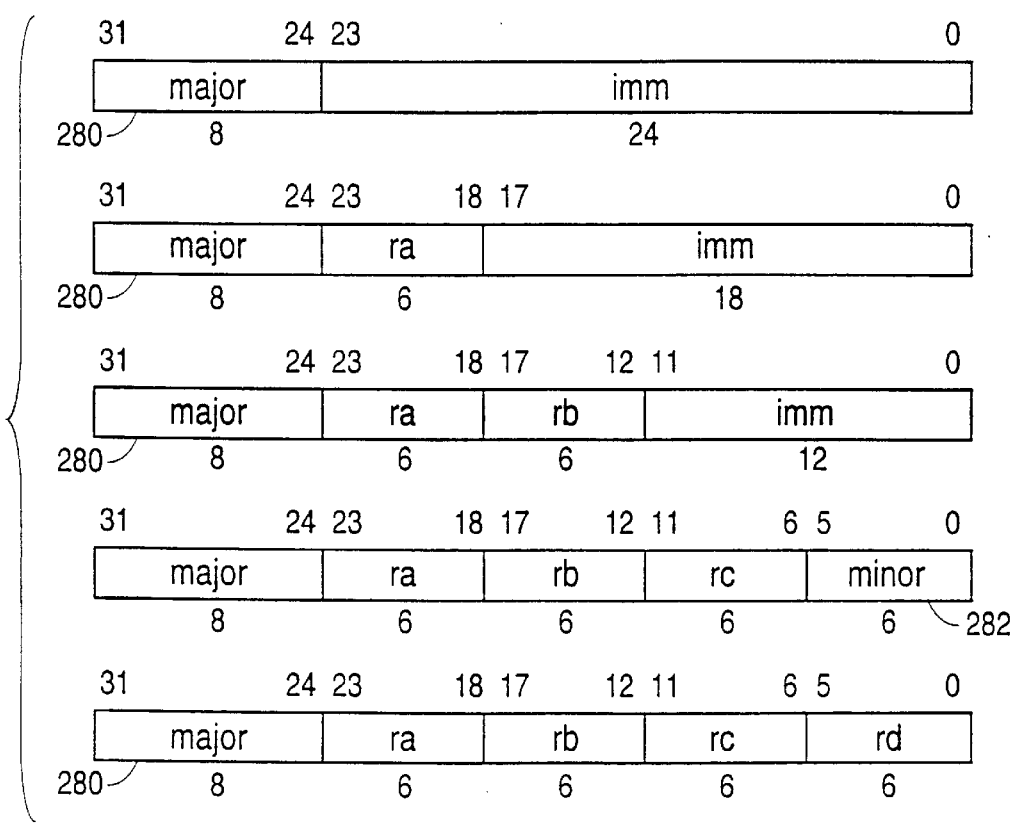
FIG. 9(a) is an illustration of the various instruction formats available on the general purpose, programmable media processor.

As shown in FIG. 9(a), each of the presently preferred instruction formats for the general purpose media processor 12 includes a field 280 for the major operation code number shown in Table I. Based on the type of operation performed, the remaining bits can provide additional operands according to the type of addressing employed with the operation. For example, the remainder of the 32-bit instruction field can comprise an immediate operand ("imm"), or operands stored in any of the general registers ("ra," "rb," "rc," and "rd"). In addition, minor operation codes 282 can also be included among the operands of certain 32-bit instruction formats.

The presently preferred embodiment of the general purpose media processor 12 includes a limited instruction set similar to those seen in Reduced Instruction Set Computer ("RISC") systems. The preferred instruction set for the general purpose media processor 12 shown in Table I includes operations which implement load, store, synchronize, branch and gateway functions. These five groups of operations can be visually represented as two general classes of related operations. The branch and gateway operations perform related functions on media data streams and are thus visually represented as block 114 in FIG. 7. Similarly, the load, store and synchronize operations are grouped together in block 116 and perform similar operations on the media data streams. (Blocks 114 and 116 only represent the above classification of these operations and their function in the processing of media data streams, and do not indicate any specific underlying electronic connections.) A more detailed discussion of these operations, and the functionality of the general purpose media processor 12, appears in the Microfiche Appendix.

The four-byte structure of instructions for the general purpose media processor 12 is preferably independent of the byte ordering used for any data structures. Nevertheless, the gateway instructions are specifically defined as 16-byte structures containing a code address used to securely invoke a procedure at a higher privilege level. Gateways are preferably marked by protection information specified in the translation lookaside buffer 148 in the memory management unit 122. Gateways are thus preferably aligned on 16-byte boundaries in the external memory. In addition to the general purpose registers and program counter, a privilege level register is provided within the register file 110 that contains the privilege level of the currently executing instruction.

The instruction set preferably includes load and store instructions that move data between memory and the register file 110, branch instructions to compare the content of registers and transfer control, and arithmetic operations to perform computations on the contents of registers. Swap instructions provide multi-thread and multi-processor synchronization. These operations are preferably indivisible and include such instructions as add-and-swap, compare-and-swap, and multiplex-and-swap instructions. The fixed-point compare-and-branch instructions within the instruction set shown in Table I provide the necessary arithmetic tests for equality and inequality of signed and unsigned fixed-point values. The branch through gateway instruction provides a secure means to access code at a higher privileged level in a form similar to a high level language procedure call generally known in the art.

Figure 9B:
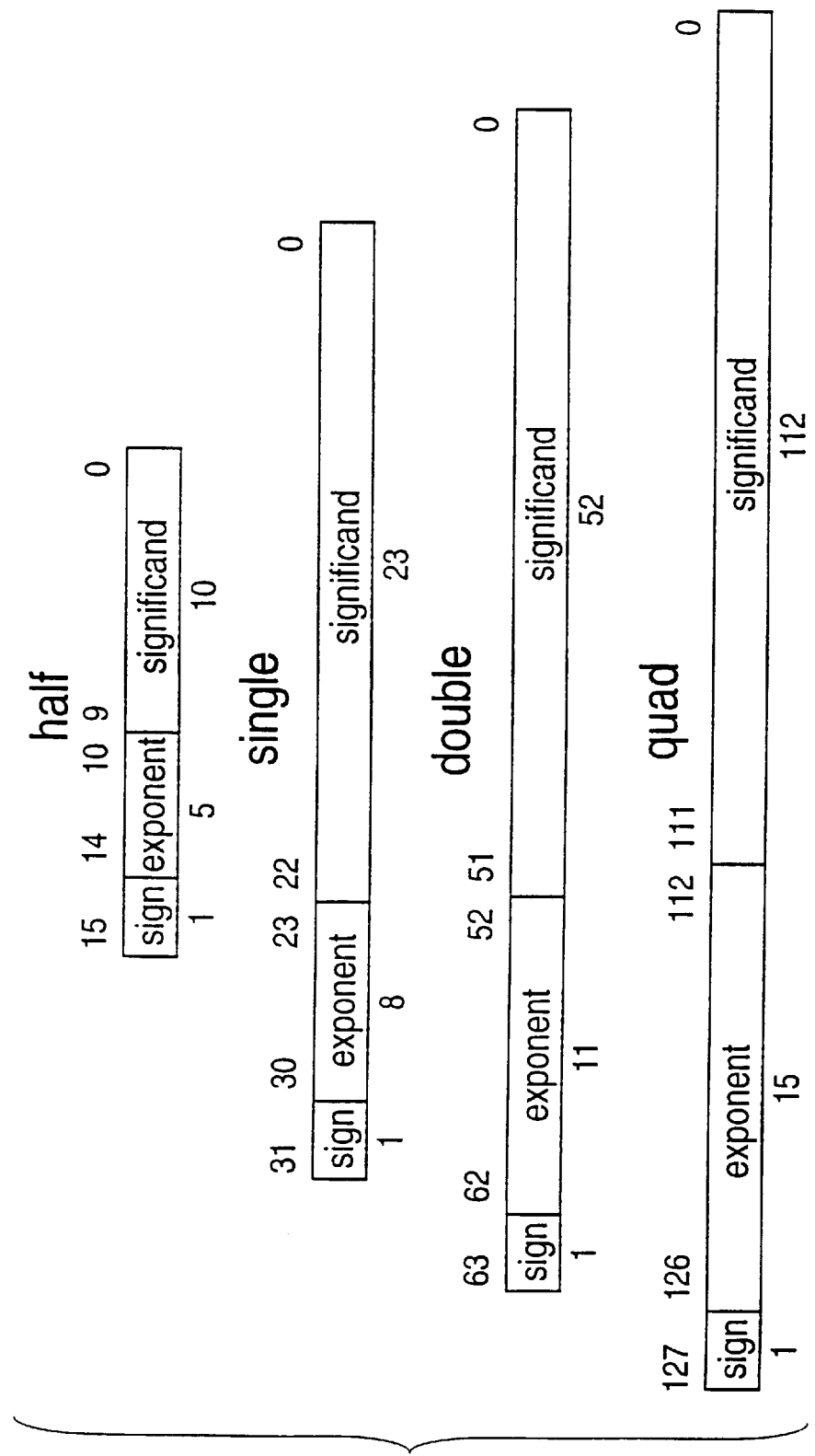
FIG. 9(b) illustrates the various floating-point data sizes available on the general purpose media processor.

The general purpose media processor 12 also preferably supports floating-point compare-and-branch instructions. The arithmetic operations, which are supported in hardware, include floating-point addition, subtraction, multiplication, division and square root. The general purpose media processor 12 preferably supports other floating-point operations defined by the ANSI-IEEE floating-point standard through the use of software libraries. A floating point value can preferably be 16, 32, 64 or 128-bits wide. Examples of the presenting preferred floating-point data sizes are illustrated in FIG. 9(b).

The general purpose media processor 12 preferably supports virtual memory addressing and virtual machine operation through a memory management unit 122. Referring to FIG. 10(a), one presently preferred embodiment of the memory management unit 122 is shown. The memory management unit 122 preferably translates global virtual addresses into physical addresses by software programmable routines augmented by a hardware translation lookaside buffer ("TLB") 148. A facility for local virtual address translation 164 is also preferably provided. As those skilled in the art will appreciate, the memory management unit 122 includes a data cache 166 and a tag cache 168 that store data and tags associated with memory sections for each entry in the TLB 148.

Figure 10B:
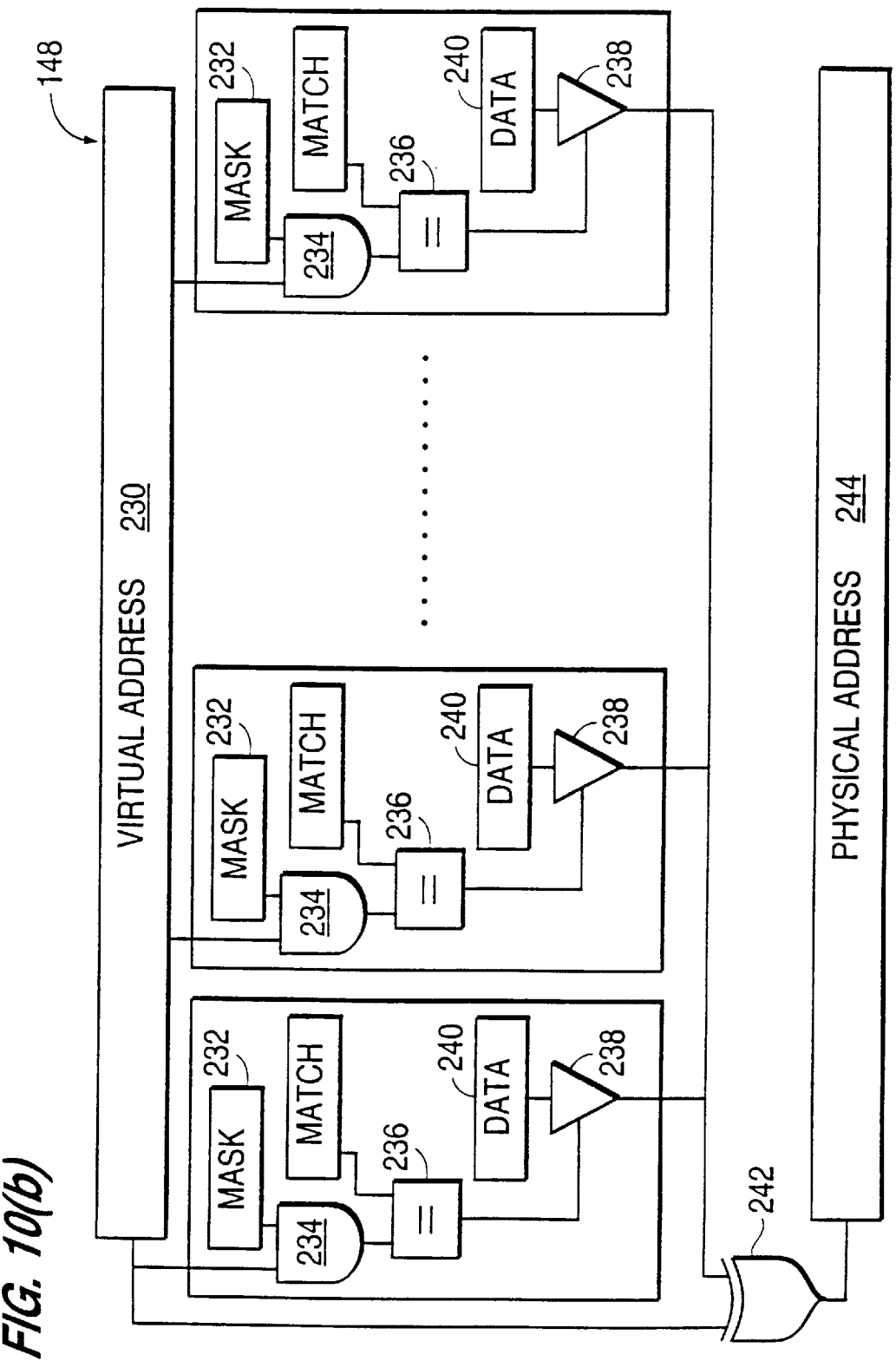

A block diagram of one preferred embodiment of the TLB 148 is shown in FIG. 10(b). The TLB 148 receives a virtual address 230 as its input. For each entry in the TLB 148, the virtual address 230 is logically AND-ed with a mask 232. The output of each respective AND gate 234 is compared via a comparator 236 with each entry in the TLB 148. If a match is detected, an output from the comparator 236 is used to gate data 240 through a transceiver 238. As those skilled in the art will appreciate, a match indicates the entry of the corresponding physical address within the contents of the TLB 148 and no external memory or I/O access is required. The data 240 for the data cache 166 (FIG. 10(a)) is then combined with the remaining lower bits of the virtual address 230 through an exclusive-OR gate 242. The resultant combination is the physical address 244 output from the TLB 148. If a match is not detected between the logical address and the contents of the tag cache 168, the memory management unit 122 an external memory or I/O access is necessary to retrieve the relevant portion of memory and update the contents of the TLB 148 accordingly.

Using generally known memory management techniques, the memory management unit 122 ensures that instructions (and data) are properly retrieved from external memory (or other sources) over an external input/output bus 126 (see FIG. 7). As described in more detail below, a high bandwidth interface 124 is coupled to the external input/output bus 126 to communicate instructions (and media data streams) to the general purpose media processor 12. The presently preferred physical address width for the general purpose media processor 12 is eight bytes (64-bits). In addition, the memory management unit 122 preferably provides match bits (not shown) that allow large memory regions to be assigned a single TLB entry allowing for fine grain memory management of large memory sections. The memory management unit 122 also preferably includes a priority bit (not shown) that allows for preferential queuing of memory areas according to respective levels of priority. Other memory management operations generally known in the art are also performed by the memory management unit 122.

Referring again to FIG. 7, instructions received by the general purpose media processor 12 are stored in a combined instruction buffer/cache 118. The instruction buffer/cache 118 is dynamically subdivided to store the largest sequence of instructions capable of execution by the execution unit 100 without the necessity of accessing external memory. In a preferred embodiment of the invention, instruction buffer space is allocated to the smallest and most frequently executed blocks of media instructions. The instruction buffer thus helps maintain the high bandwidth capacity of the general purpose media processor 12 by sustaining the number of instructions executed per second at or near peak operation. That portion of the instruction buffer/cache 118 not used as a buffer is, therefore, available to be used as cache memory. The instruction buffer/cache 118 is coupled to the instruction path 112 and is preferably 32 kilobytes in size.

A data buffer/cache 120 is also provided to store data transmitted and received to and from the execution unit 100 and register file 110. The data buffer/cache 120 is also dynamically subdivided in a manner similar to that of the instruction buffer/cache 118. The buffer portion of the data buffer/cache 120 is optimized to store a set size of unified media data capable of execution without the necessity of accessing external memory. In a preferred embodiment of the invention, data buffer space is allocated to the smallest and most frequently accessed working sets of media data. Like the instruction buffer, the data buffer thus maintains peak bandwidth of the general purpose media processor 12. The data buffer/cache 120 is coupled to the data path 108 and is preferably also 32 kilobytes in size.

The preferred embodiment of the general purpose media processor 12 includes a pipelined instruction pre-fetch structure. Although pipelined operation is supported, the general purpose media processor 12 also allows for non-pipelined operations to execute without any operational penalty. One preferred pipeline structure for the general purpose media processor 12 comprises a "super-string" pipeline shown in FIG. 11. A super-string pipeline is designed to fetch and execute several instructions in each clock cycle. The instructions available for the general purpose media processor 12 can be broken down into five basic steps of operation. These steps include a register-to-register address calculation, a memory load, a register-to-register data calculation, a memory store and a branch operation. According to the super-string pipeline organization of the general purpose media processor 12, one instruction from each of these five types may be issued in each clock cycle. The presently preferred ordering of these operations are as listed above where each of the five steps are assigned letters "A," "L," "E," "S" and "B" (see FIG. 11).

Figure 11:
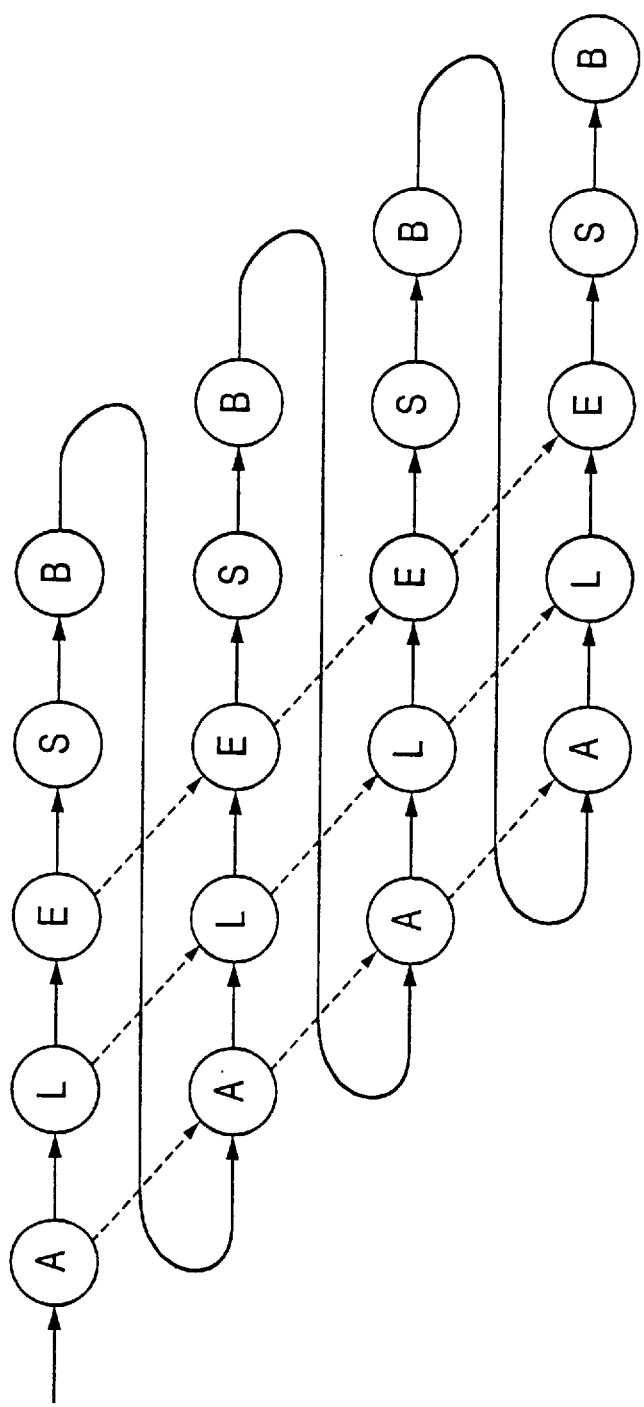
FIG. 11 is an illustration of a super-string pipeline technique.

According to the super-string pipelining technique, each of the instructions are serially dependent, as shown in FIG. 11, and the general purpose media processor 12 has the ability to issue a string of dependent instructions in a single clock cycle. These instructions shown in FIG. 11 can take from two to five cycles of latency to execute, and a branch prediction mechanism is preferably used to keep up the pipeline filled (described below). Instructions can be encoded in unit categories such as address, load, store/sync, fixed, float and branch to allow for easy decoding. A similar scheme is employed to pre-fetch data for the general purpose media processor 12.

As those skilled in the art will appreciate, the super-string pipeline can be implemented in a multi-threaded environment. In such an implementation, the number of threads is preferably relatively prime with respect to functional unit rates so that functional units can be scheduled in a non-interfering fashion between each thread.

Figure 12:
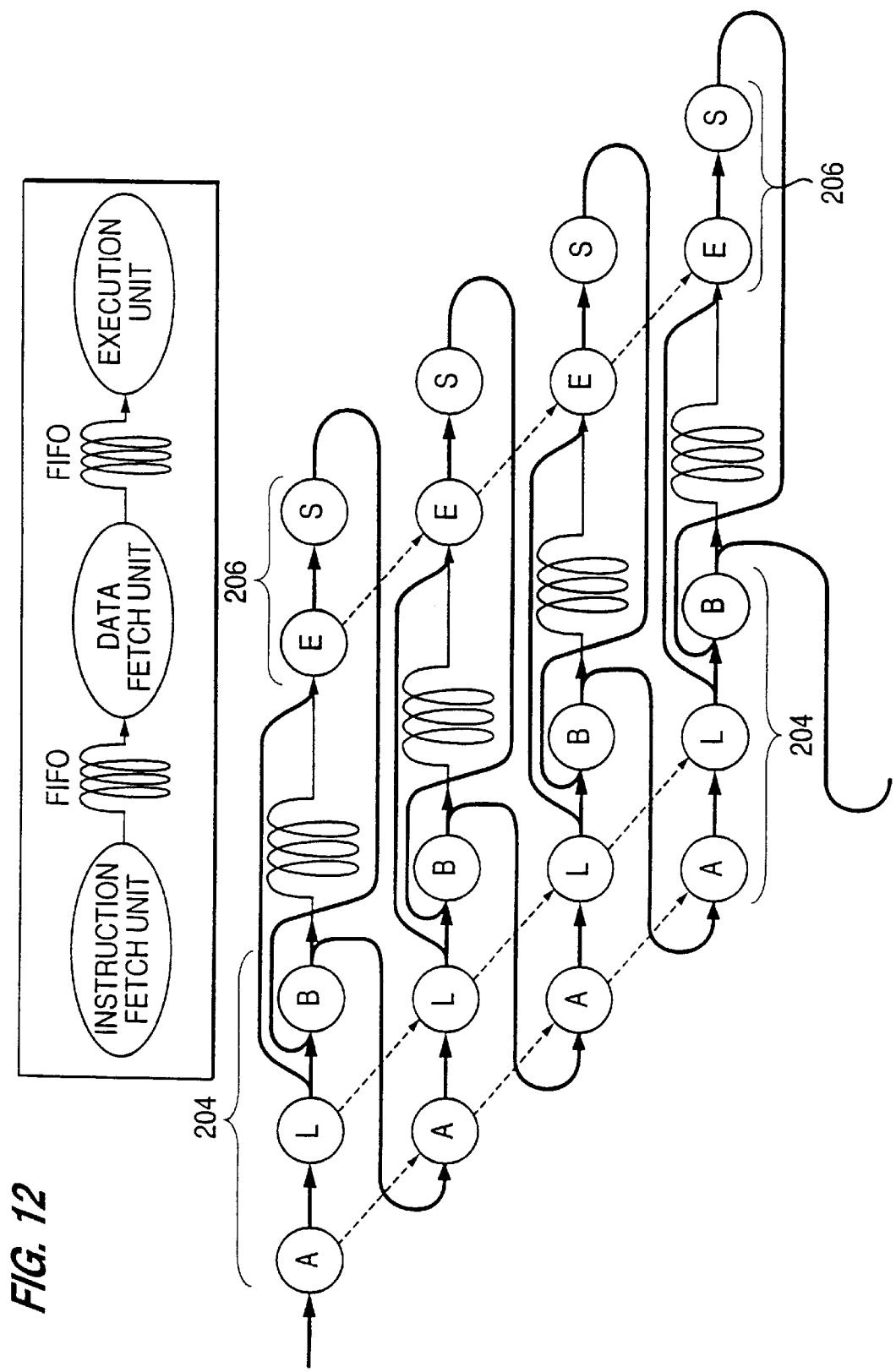
FIG. 12 is an illustration of the presently preferred super-spring pipeline technique.

In another more preferred embodiment, a "super-spring" pipelining scheme is employed with the general purpose media processor 12. The super-spring pipeline technique breaks the super-string pipeline shown in FIG. 11 into two sections that are coupled via a memory buffer (not shown). A visual representation of the super-spring pipeline technique is shown in FIG. 12. The front of the pipeline 204, in which address calculation (A), memory load (L), and branch (B) operations are handled, is decoupled from the back of the pipeline 206, in which data calculation (E) and memory store (S) operations are handled. The decoupling is accomplished through the memory buffer (not shown), which is preferably organized in a first-in-first-out ("FIFO") fast/dense structure. (The memory buffer is functionally represented as a spring in FIG. 12.)

As indicated in Table I above, the general purpose media processor 12 does not include delayed branch instructions, and so relies upon branch or fetch prediction techniques to keep the pipeline full in program flows around unconditional and conditional branch instructions. Many such techniques are generally known in the art. Examples of some presently preferred techniques include the use of group compare and set, and multiplex operations to eliminate unpredictable branches; the use of short forward branches, which cause pipeline neutralization; and where branch and link predicts the return address in a one or more entry stack. In addition, the specialized gateway instructions included in the general purpose media processor 12 allow for branches to and from protected virtual memory space. The gateway instructions, therefore, allow an efficient means to transfer between various levels of privilege.

Figure 9C:
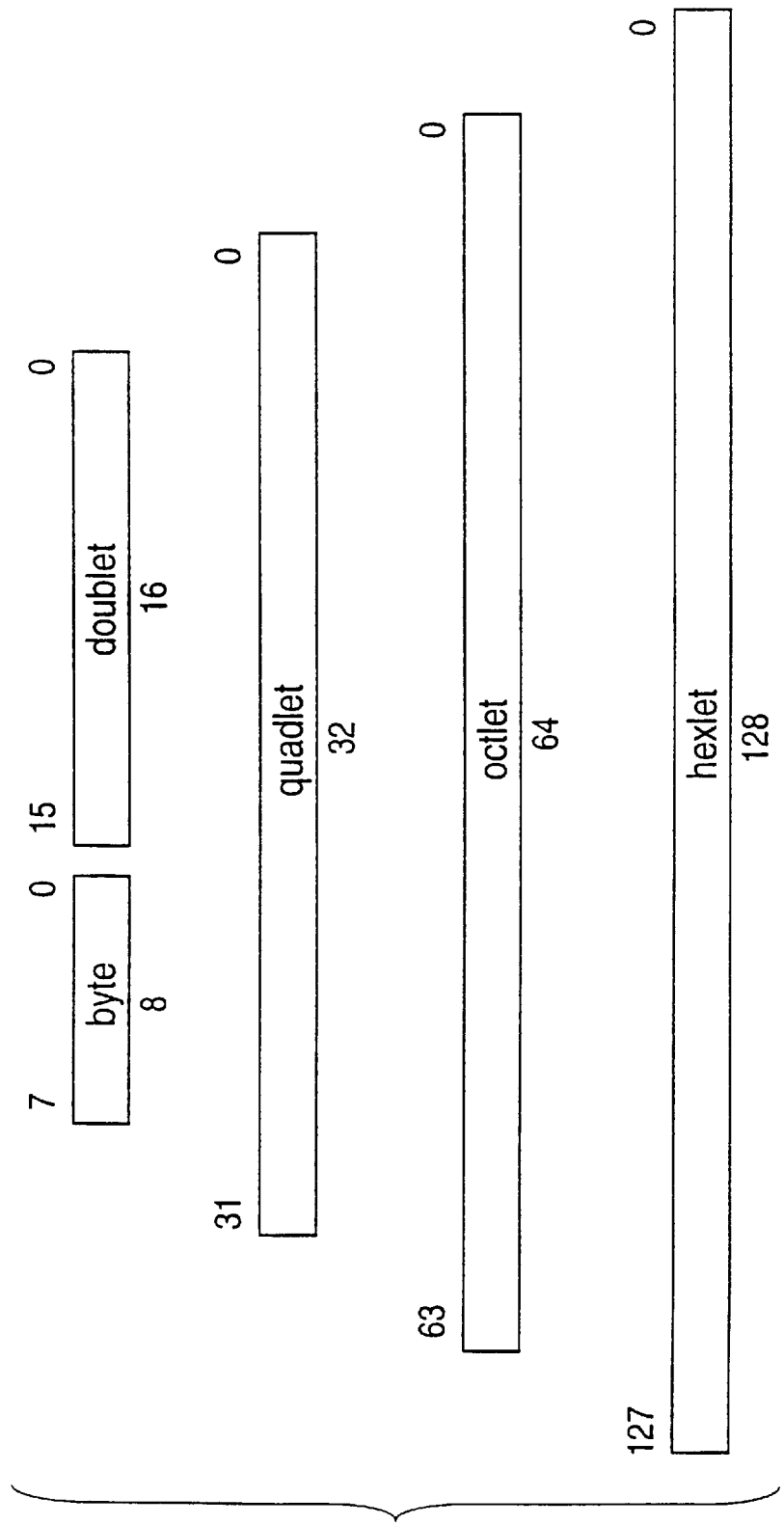
FIG. 9(c) illustrates the various fixed-point data sizes available on the general purpose media processor.

As described above, two basic forms of media data are processed by the general purpose media processor 12, as shown in FIG. 7. These data streams generally comprise Nyquist sampled I/O 128, and standard memory and I/O 130. As shown in FIG. 7, audio 132, video 134, radio 136, network 138, tape 140 and disc 142 data streams comprise some examples of digitally sampled I/O 128. As those skilled in the art will appreciate, other forms of digitally sampled I/O are contemplated for processing by the general purpose media processor 12 without departing from the spirit and scope of the invention. Standard memory and I/O 130 comprises data received and transmitted to and from general digital peripheral devices used in the design of most computer systems. As shown in FIG. 7, some examples of such devices include dynamic random access memory ("DRAM") 146, or any data received over the PCI bus 144 generally known in the art. Other forms of standard memory and I/O sources are also contemplated. The various fixed-point data sizes preferred for the general purpose media processor 12 are illustrated in FIG. 9(c).

External Interface

As mentioned above, the general purpose media processor 12 includes a high bandwidth interface 124 to communicate with external memory and input/output sources. As part of the high bandwidth interface 124, the general purpose media processor 12 integrates several fast communication channels 156 (FIG. 13) to communicate externally. These fast communication channels 156 preferably couple to external caches 150, which serve as a buffer to memory interfaces 152 coupled to standard memory 154. The caches 150 preferably comprise synchronous static random access memory ("SRAM"), each of which are sixty-four kilobytes in size; and the standard memories 154 comprise DRAM's. The memory interfaces 152 transmit data between the caches 150 and the standard memories 154. The standard memories 154 together form the main external memory for the general purpose media processor 12. The cache 150, memory interface 152, standard memory 154 and input/output channel 156 therefore make up a single external memory unit 158 for the general purpose media processor 12.

Figure 13:
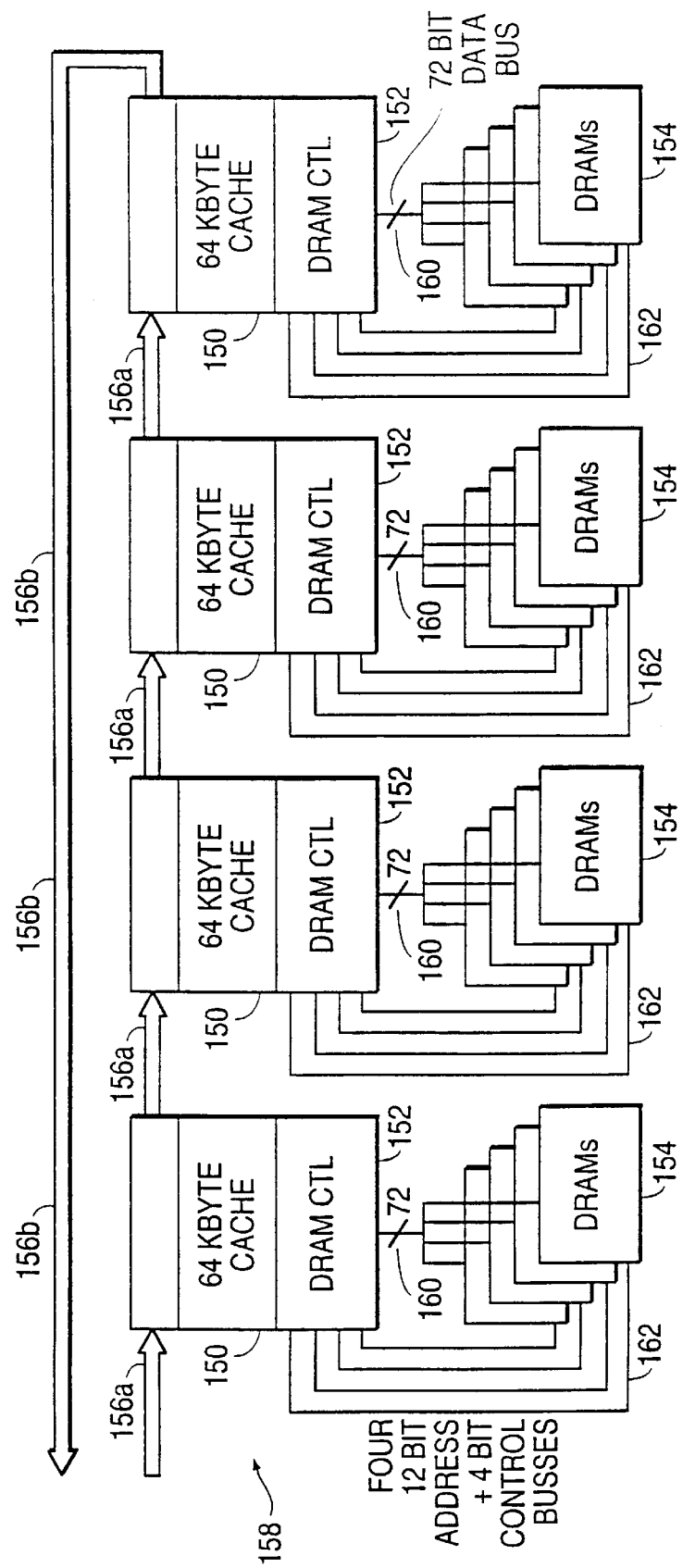
FIG. 13 is a block diagram of a single memory channel for communication to the general purpose media processor shown in FIG. 7.

According to the presently preferred embodiment of the invention, the memory interface protocol embeds read and write operations to a single memory space into packets containing command, address, data and acknowledgment information. The packets preferably include check codes that will detect single-bit transmission errors and some multiple-bit errors. As many as eight operations may be in progress at a time in each external memory unit 158. As shown in FIG. 13, up to four external memory units 158 may be cascaded together to expand the memory available to the general purpose media processor 12, and to improve the bandwidth of the external memory. Through such cascaded memory units 158, the memory interface 152 provides for the direct connection of multiple banks of standard memory 154 to maintain operation of the general purpose media processor 12 at sustained peak bandwidths.

Figure 14:
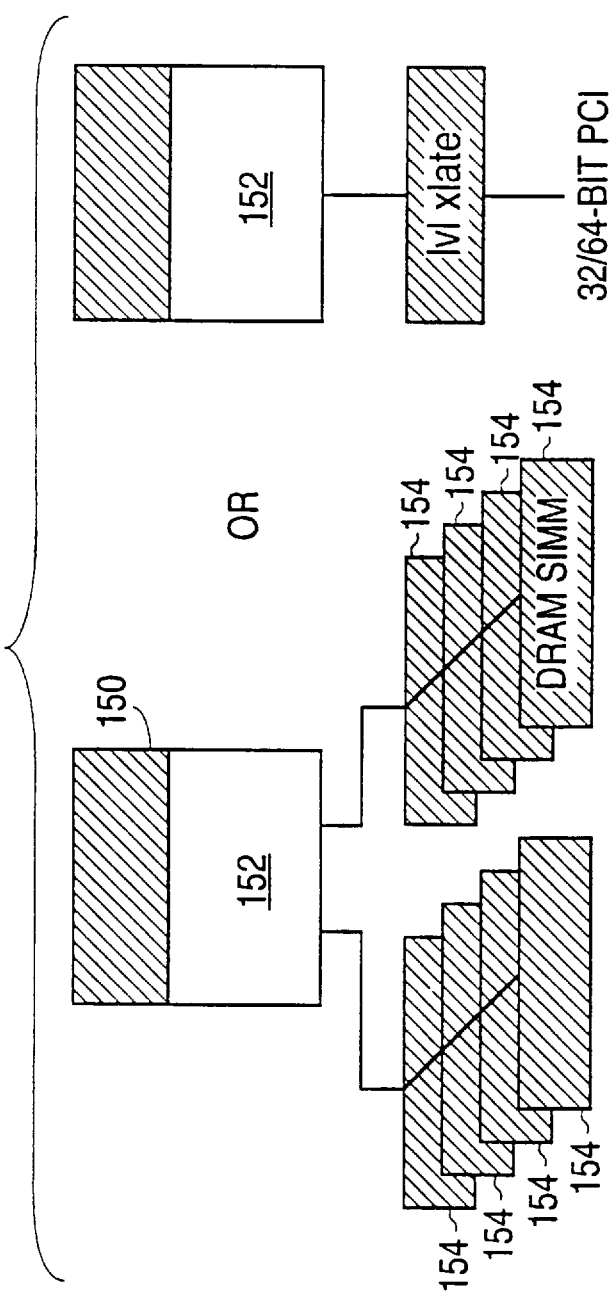
FIG. 14 is an illustration of the presently preferred connection of standard memory devices to the preferred memory interface.

According to one embodiment shown in FIG. 13, up to four standard memory devices 154 can be coupled to each memory interface 152. Each standard memory 154 thus includes as many as four banks of DRAM, each of which is preferably sixteen bits wide. The standard memories 154 are connected in parallel to the memory interface 152 forming a 72-bit wide data bus 160, where 64 bits are preferably provided for data transfer and eight bits are provided for error correction. In addition to the data bus 160, an address/control bus 162 is coupled between the memory interface 152 and each standard memory 154. The address/control bus 162 preferably comprises at least twelve address lines (4 kilobits×16 memory size) and four control lines as shown in FIG. 13. An alternate manner for coupling the DRAM's to the memory interface 152 is illustrated in FIG. 14. As shown in FIG. 14, two banks of four DRAM single in-line memory modules are coupled in parallel to the memory interface 152. The memory interface 152 also supports interleaving to enhance bandwidth, and page mode accesses to improve latency for localized addressing.

Using standard DRAM components, the external memory units 158 achieve bandwidths of approximately two gigabits/second with the standard memories 154. When four such external memory units 158 are coupled via the communication channel 156, therefore, the total bandwidth of the external main memory system increases to one gigabyte/second. As discussed further below, in implementations with two or eight communication channels 156, the aggregate bandwidth increases to two and eight gigabytes/second, respectively.

Figure 15:
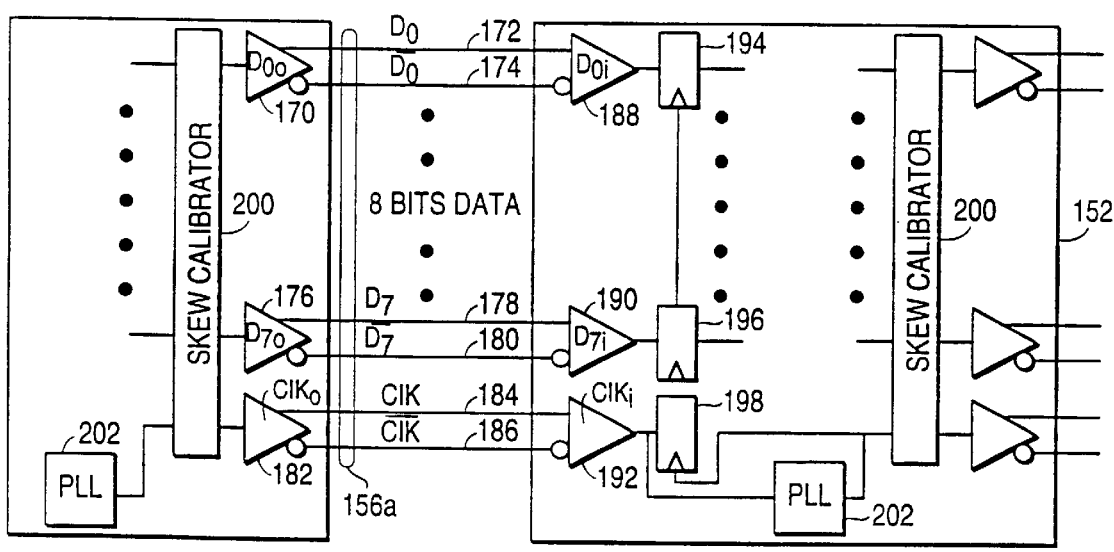
FIG. 15 is a block diagram of the input/output controller for use with the memory channel shown in FIG. 13.

A more detailed depiction of the communication channel 156 circuitry appears in FIG. 15. According to the preferred embodiment of the invention, each communication channel 156 comprises two unidirectional, byte-wide, differential, packet-oriented data channels 156a, 156b (see FIG. 13). As explained above, where memory units 158 are cascaded together in series, the output of one memory unit 158 is connected to the input of another memory unit 158. The two unidirectional channels are thus connected through the memory units 158 forming a loop structure and make up a single bi-directional memory interface channel.

Referring to FIG. 15, each communication channel 156 is preferably eight bits wide, and each bit is transmitted differentially. For example, output transceiver 170 for bit $D_{0out}$ transmits both $D_0$ and $/D_0$ signals over the communication channel 156. Additional transceivers are similarly provided for the remaining bits in the channel 156. (The transceiver 176 for bit $D_{7out}$ and associated differential lines 178, 180 are shown in FIG. 15.) A $CLK_{out}$ transceiver 182 is also provided to generate differential clock outputs 184, 186 over the channel 156. To complete the link between memory units 158, input transceivers 188–192 are provided in each memory unit 158 for each of the differential bits and clock signals transmitted over the communication channel 156. These input signals 172, 174, 178, 180, 184, 186 are preferably transmitted through input buffers 194–198 to other parts of the memory unit 158 (described above).

Each memory unit 158 also includes a skew calibrator 200 and phase locked loop ("PLL") 202. The skew calibrator 200 is used to control skew in signals output to the communication channel 156. Preferably, digital skew fields are employed, which include set numbers of delay stages to be inserted in the output path of the communication channel 156. Setting these fields, and the corresponding analog skew fields, permits a fine level of control over the relative skew between output channel signals.

The PLL 202 recovers the clock signal on either side of the communication channel 156 and is thus provided to remove clock jitter. The clock signals 184, 186 preferably comprise a single phase, constant rate clock signal. The clock signals 184, 186 thus contain alternating zero and one values transmitted with the same timing as the data signals 172, 174, 178, 180. The clock signal frequency is, therefore, one-half the byte data rate. The communication channel 156 preferably operates at constant frequency and contains no auxiliary control, handshaking or flow control information.

Each external memory unit 158 preferably defines two functional regions: a memory region, implemented by the cache 150 backed by standard memory 154 (see FIG. 13), and a configuration region, implemented by registers (not shown). Both regions are accessed by separate interfaces; the communication channel 156 is used to access the memory region, and a serial interface (described below) is used to access the configuration region. In the memory region, the caches 150 are preferably write-back (write-in) single-set (direct-map) caches for data originally contained in standard memory 154. All accesses to memory space should maintain consistency between the contents of the cache 150 and the contents of the standard memory 154. The configuration region registers provide the mechanism to detect and adjust skew in the communication channel 156. Software is preferably employed to adaptively adjust the skew in the channel 156 through digital skew fields, as explained above. The serial interface thus is used to configure the external memory units 158, set diagnostic modes and read diagnostic information, and to enable the use of a high-speed tester (not shown).

Figure 16A:
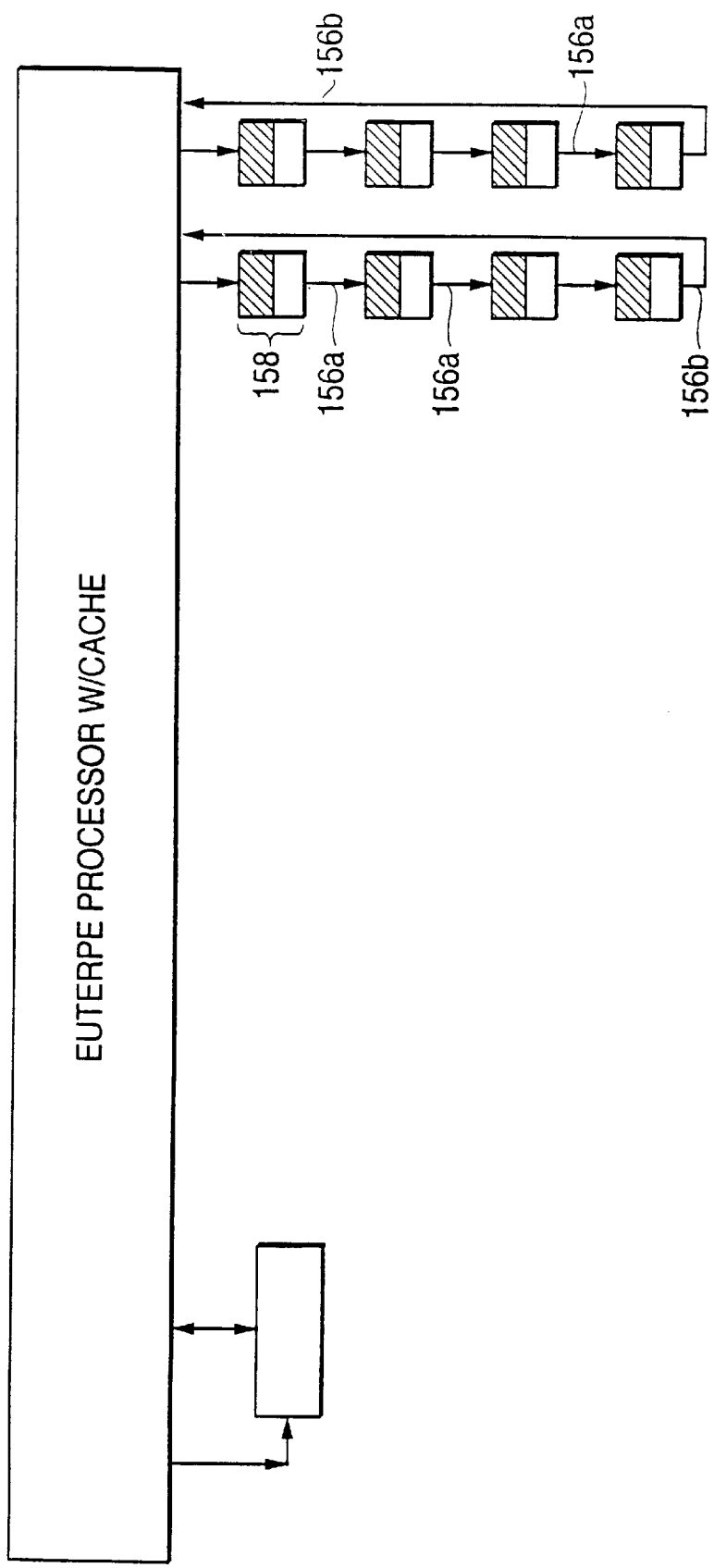
FIG. 16(a) shows a two-channel implementation and FIG. 16(b) illustrates a twelve-channel embodiment.

One presently preferred embodiment of the invention employs two byte-wide packet communication channels 156 (FIG. 16(*a*)). In order to further increase the bandwidth of the general purpose media processor 12, up to sixteen byte-wide packet communication channels 156 can be employed. Referring to FIG. 16(*b*), twelve communication channels, comprising eight memory channels 210, a ninth channel for parallel processing 212 (described below), and three input/output ("I/O") channels 214, are shown. Each of the communication channels 210–214 preferably employs the cascade configuration of four channel interface devices 216. (Each channel interface device 216 coupled to the memory channels 210 corresponds to the external memory unit 158 shown in FIG. 13.) Through each of the twelve communication channels shown in FIG. 16(*b*), the general purpose media processor 12 can request or issue read or write transactions. When not interleaved, the twelve channels provide a single contiguous memory space for each channel interface device 216.

Alternatively, memory accesses may be interleaved in order to provide for continuous access to the external memory system at the maximum bandwidth for the DRAM memories. In an interleaved configuration, at any point in time some memory devices will be engaged in row precharge, while others may be driving or receiving data, or receiving row or column addresses. The memory interface 152 (FIG. 13) thus preferably maps between a contiguous address space and each of the separate address spaces made available within each external memory unit 158. For maximum performance, therefore, the memory interface is interleaved so that references to adjacent addresses are handled by different memory devices. Moreover, in the preferred embodiment, additional memory operations may be requested before the corresponding DRAM bank is available. In an interleaved approach, these operations are placed in a queue until they can be processed. According to the preferred embodiment, memory writes have lower priority than memory reads, unless an attempt is made to read an address that is queued for a write operation. As those skilled in the art will appreciate, the depth of the memory write queue is dictated by the specific implementation.

Although up to four external memory units 158 are preferably cascaded to form effectively larger memories, some amount of latency may be introduced by the cascade. Packets of data transmitted over the communication channel 156 are uniquely addressed to a particular channel interface device 216. A packet received at a particular device, which specifies another module address, is automatically passed to the correct channel interface device 216. Unless the module address matches a particular device 216, that packet simply passes from the input to the output of the interface device 216. This mechanism divides the serial interconnection of interface devices 216 into strings, which function as a single larger memory or peripheral, but with possibly longer response latency.

Figure 16B:
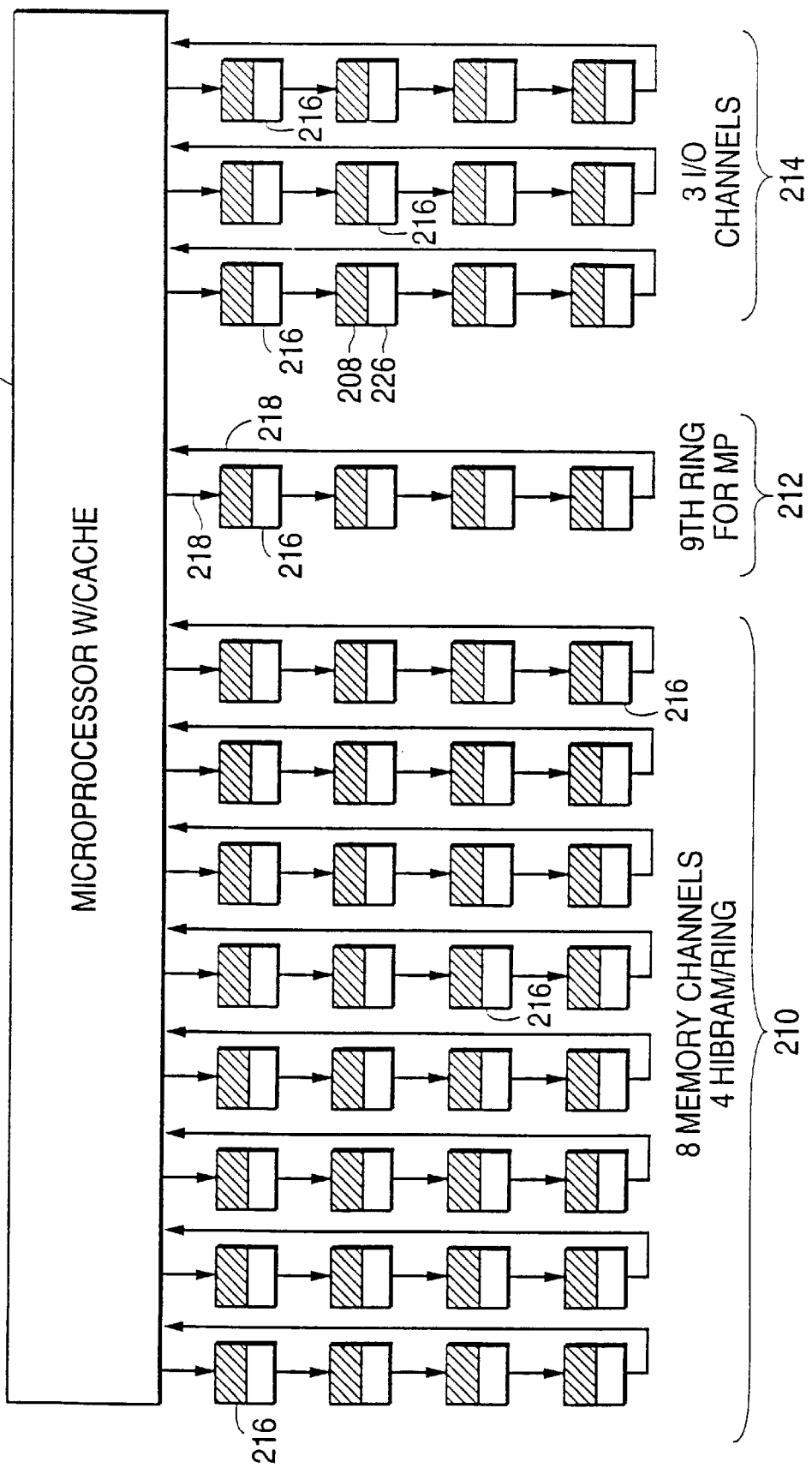

In addition to the memory channels 210, the general purpose media processor 12 provides several communication channels 214 for communication with external input/output devices. Referring to FIG. 16(b), three input/output channels 214 having SRAM buffered memory (see FIG. 13) provide an interface to external standard I/O devices (not shown). Like the eight memory channels 210, the three I/O channels 214 are byte-wide input/output channels intended to operate at rates of at least one gigahertz. The three I/O channels 214 also operate as a packet communication link to synchronous SRAM memory 208 within the channel interface device 216. A controller 226 within the channel interface device 216 completes the interface to the I/O devices.

The three I/O channels 214 preferably function in like manner to the memory channels 210 described above. The interface protocol for the three I/O channels 214 divides read and write operations to a single memory space into packets containing command, address, data and acknowledgment information. The packets also include a check code that will detect single-bit transmission errors and some multiple-bit errors. According to the preferred embodiment of the invention, as many as eight operations may progress in each interface device 216 at a time. As shown in FIG. 16(b), up to four channel interface devices 216 can be cascaded together to expand the bandwidth in the three I/O channels 214. A bit-serial interface (not shown) is also provided to each of the channel interface devices 216 to allow access to configuration, diagnostic and tester information at standard TTL signal levels at a more moderate data rate. (A more detailed description of the serial interface is provided below).

Like the memory channels 210, each I/O channel 214 includes nine signals—one clock signal and eight data signals. Differential voltage levels are preferably employed for each signal. Each channel interface device 216 is preferably terminated in a nominal 50 ohm impedance to ground. This impedance applies for both inputs and outputs to the communication channel 156. A programmable termination impedance is preferred.

Interface Communication

According to one presently preferred embodiment of the invention, the channel interface devices 216 can operate as either master devices or slave devices. A master device is capable of generating a request on the communication channel 156 and receiving responses from the communication channel 156. Slave devices are capable of receiving requests and generating responses, over the communication channel 156. A master device is preferably capable of generating a constant frequency clock signal and accepting signals at the same clock frequency over the communication channel 156. A slave device, therefore, should operate at the same clock rate as the communication channel 156, and generate no more than a specified amount of variation in output clock phase relative to input clock phase. The master device, however, can accept an arbitrary input clock phase and tolerates a specified amount of variation in clock phase over operating conditions.

Figure 17:
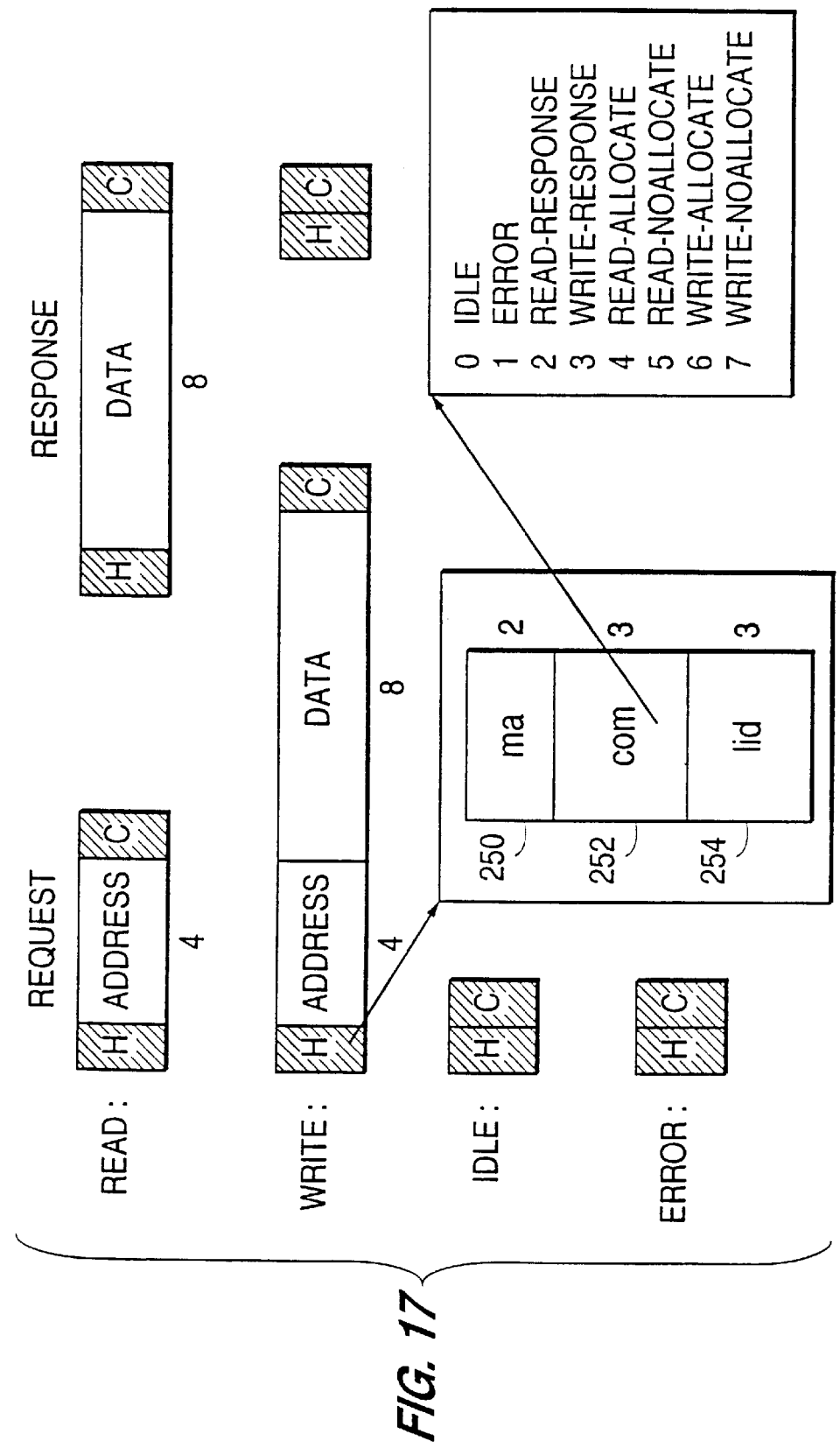
FIG. 17 illustrates the presently preferred packet communications protocol for use over the memory channel shown in FIG. 13.

Packets of information sent over the communication channel 156 preferably contain control commands, such as read or write operations, along with addresses and associated data. Other commands are provided to indicate error conditions and responses to the above commands. When the communication channel 156 is idle, such as during initialization and between transmitted packets, an idle packet, consisting of an all-zero byte and an all- one byte is transmitted through the communication channel 156. Each non-idle packet consists of two bytes or a multiple of two bytes, and begins with a byte having a value other than all zeros. All packets transmitted over the communication channel 156 also begin during a clock period in which the clock signal is zero, and all packets preferably end during a clock period in which the clock signal is one. A depiction of the preferred packet protocol format for transmission over the communication channel 156 appears in FIG. 17.

The general form of each packet is an array of bytes preferably without a specific byte ordering. The first byte contains a module address 250 ("ma") in the high order two bits; a packet identifier, usually a command 252 ("com"), in the next three bit positions; and a link identification number 254 ("lid") in the last three bit positions. The interpretation of the remaining bytes of a packet depend upon the contents of the packet identifier. The length of each packet is preferably implied by the command specified in the initial byte of the packet. A check byte is provided and computed as odd bit-wise parity with a leftward circular rotation after accumulating each byte. This technique provides detection of all single-bit and some multiple-bit errors, but no correction is provided.

The modular address 250 field of each packet is preferably a two-bit field and allows for as many as four slave devices to be operated from a single communication channel 156. Module address values can be assigned in one of two fashions: either dynamically assigned through a configuration register (not shown), or assigned via static/geometric configuration pins. Dynamic assignment through a configuration register is the presently preferred method for assigning module address values.

The link identification number 254 field is preferably 3-bits wide and provides the opportunity for master devices to initiate as many as eight independent operations at any one time to each slave device. Each outstanding operation requires a distinct link identification number, but no ordering of operations should be implied by the value of the link identification field. Thus, there is preferably no requirement for link identification values 254 to be sequentially assigned either in requests or responses.

The receipt of packets over the communication channel 156 that do not conform to the channel protocol preferably generates an error condition. As those skilled in the art will appreciate, the level or degrees to which a specific implementation detects errors is defined by the user. In one presently preferred embodiment of the invention, all errors are detected, and the following protocol is employed for handling errors. For each error detected, the channel interface device 216 causes a response explicitly indicating the error condition. Channel interface devices 216 reporting an invalid packet will then suppress the receipt of additional packets until the error is cleared. The transmitted packet is otherwise ignored. However, even though the erroneous packet is ignored, the channel interface devices 216 preferably continue to process valid packets that have already been received and generate responses thereto. An identification of the presently preferred commands 252 to be used over the communication channel 156 are listed in FIG. 17.

In the master/slave preferred embodiment, the channel interface devices 216 forward packets that are intended for other devices connected to the communication channel 156, as described above. In slave devices, forwarding is performed based on the module address 250 field of the packet. Packets which contain a module address 250 other than that of the current device are forwarded on to the next device. All non-idle packets are thus forwarded including error packets. In master devices, forwarding is performed based on the link identifier number 254 of the packet. Packets that contain link identifier numbers 254 not generated by the specific channel interface device 216 are forwarded. In order to reduce transmission latency, a packet buffer may be provided. As those skilled in the art appreciate, the suitable size for the packet buffer depends on the amount of latency tolerable in a particular implementation.

A variety of master/slave ring configurations are possible using the high bandwidth interface 124 of the invention. Five ring configurations are currently preferred: single-master, dual-master, multiple-master single-slave and multiple-master/multiple-slave. The simplest ring configuration contains a single non-forwarding master device and a single non-forwarding slave device. No forwarding is required for either device in this configuration as packets are sent directly to the recipient. A single-master ring, however, may contain a cascade of up to four slave devices (see FIGS. 13, 16). In the single-master ring configuration, each slave device is configured to a distinct module address, and each slave device forwards packets that contain module address fields unequal to their own. As discussed above, a single-master ring provides a larger memory or I/O capacity than a master-slave pair, but also introduces a potentially longer response latency. In the single-master ring, each slave device may have as many as eight transactions outstanding at any time, as described above.

The remaining combinations share many of the above basic attributes. In a dual-master pair, each master device may initiate read and write operations addressed to the other, and each may have up to eight such transactions outstanding. No forwarding is required for either device because packets are sent directly to the recipient. A multiple-master ring may contain multiple master devices and a single slave device. In this configuration, the slave device need not forward packets as all input packets are designated for the single slave device. A multiple-master ring may contain multiple master devices and as many as four slave devices. Each slave device may have up to eight transactions outstanding, and each master device may use some of those transactions. In a preferred embodiment, a master also has the capability to detect a time-out condition or when a response to a request packet is not received. Further aspects of inter-processor communications and configurations are discussed below in connection with FIG. 18.

Serial Bus

In one preferred embodiment of the invention, the general purpose media processor 12 includes a serial bus (not shown). The serial bus is designed to provide bootstrap resources, configuration, and diagnostic support to the general purpose media processor 12. The serial bus preferably employs two signals, both at TTL levels, for direct communication among many devices. In the preferred embodiment, the first signal is a continuously running clock, and the second signal is an open-collector bi-directional data signal. Four additional signals provide geographic addresses for each device coupled to the serial bus. A gateway protocol, and optional configurable addressing, each provide a means to extend the serial bus to other buses and devices. Although the serial bus is designed for implementation in a system having a general purpose media processor 12, as those skilled in the art will appreciate, the serial bus is applicable to other systems as well.

Because the serial bus is preferably used for the initial bootstrap program load of the general purpose media processor 12, the bootstrap ROM is coupled to the serial bus. As a result, the serial bus needs to be operational for the first instruction fetch. The serial bus protocol is therefore devised so that no transactions are required for initial bus configuration or bus address assignment.

According to the preferred embodiment, the clock signal comprises a continuously running clock signal at a minimum of 20 megahertz. The amount of skew, if any, in the clock signal between any two serial bus devices should be limited to be less than the skew on the data signal. Preferably, the serial data signal is a non-inverted open collector bi-directional data signal. TTL levels are preferred for communication on the serial bus, and several termination networks may be employed for the serial data signal. A simple preferred termination network employs a resistive pull-up of 220 ohms to 3.3 volts above $V_{ss}$. An alternate embodiment employs a more complex termination network such as a termination network including diodes or the "Forced Perfect Termination" network proposed for the SCSI-2 standard, which may be advantageous for larger configurations.

The geographic addressing employed in the serial bus is provided to insure that each device is addressable with a number that is unique among all devices on the bus and which also preferably reflects the physical location of the device. Thus, the address of each device remains the same each time the system is operated. In one preferred embodiment, the geographic address is composed of four bits, thus allowing for up to 16 devices. In order to extend the geographic addressing to more than 16 devices, additional signals may be employed such as a buffered copy of the clock signal or an inverted copy of the clock signal (or both).

The serial bus preferably incorporates both a bit level and packet protocol. The bit level protocol allows any device to transmit one bit of information on the bus, which is received by all devices on the bus at the same time. Each transmitted bit begins at the rising edge of the clock signal and ends at the next rising edge. The transmitted bit value is sampled at the next rising edge of the clock signal. According to one preferred embodiment where the serial data signal is an open collector signal, the transmission of a zero bit value on the bus is achieved by driving the serial data signal to a logical low value. In this embodiment, the transmission of a one bit value is achieved by releasing the serial data signal to obtain a logical high value. If more than one device attempts to transmit a value on the same clock, the resulting value is a zero if any device transmits a zero value, and one if all devices transmit a one value. This provides a "wired-AND" collision mechanism, as those skilled in the art will appreciate. If two or more devices transmit the same value on the same clock cycle, however, no device can detect the occurrence of a collision. In such cases, the transaction, which may occur frequently in some implementations, preferably proceeds as described below.

The packet protocol employed with the serial bus uses the bit level protocol to transmit information in units of eight bits or multiples of eight bits. Each packet transmission preferably begins with a start bit in which the serial data signal has a zero (driven) value. After transmitting the eight data bits, a parity bit is transmitted. The transmission continues with additional data. A single one (released) bit is transmitted immediately following the least significant bit of each byte signaling the end of the byte.

On the cycle following the transmission of the parity bit, any device may demand a delay of two cycles to process the data received. The two cycle delay is initiated by driving the serial data signal (to a zero value) and releasing the serial data signal on the next cycle. Before releasing the serial data signal, however, it is preferable to insure that the signal is not being driven by any other device. Further delays are available by repeating this pattern.

In order to avoid collisions, a device is not permitted to start a transmission over the serial bus unless there are no currently executing transactions. To resolve collisions that may occur if two devices begin transmission on the same cycle, each transmitting device should preferably monitor the bus during the transmission of one (released) bits. If any of the bits of the byte are received as zero when transmitting a one, the device has lost arbitration and must cease transmission of any additional bits of the current byte or transaction.

According to the preferred embodiment of the invention, a serial bus transaction consists of the transmission of a series of packets. The transaction begins with a transmission by the transaction initiator, which specifies the target network, device, length, type and payload of the transaction request. The transaction terminates with a packet having a type field in a specified range. As a result, all devices connected to the serial bus should monitor the serial data signal to determine when transactions begin and end. A serial bus network may have multiple simultaneous transactions occurring, however, so long as the target and initiator network addresses are all disjoint.

Parallel Processing

In one preferred embodiment of the invention, two or more general purpose media processors 12 can be linked together to achieve a multiple processor system. According to this embodiment, general purpose media processors 12 are linked together using their high bandwidth interface channels 124, either directly or through external switching components (not shown). The dual-master pair configuration described above can thus be extended for use in multiple-master ring configurations. Preferably, internal daemons provide for the generation of memory references to remote processors, accesses to local physical memory space, and the transport of remote references to other remote processors. In a multi-processor environment, all general purpose media processors 12 run off of a common clock frequency, as required by the communication channels 156 that connect between processors.

Figure 18A:
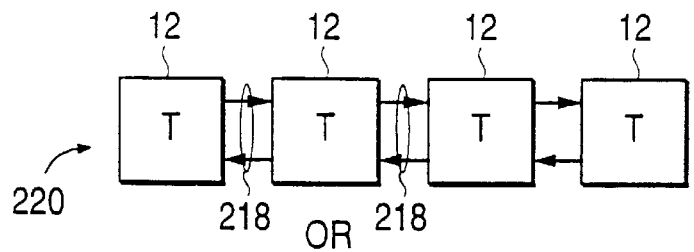
FIG. 18(a) shows a linear processor configuration.
Figure 18B:
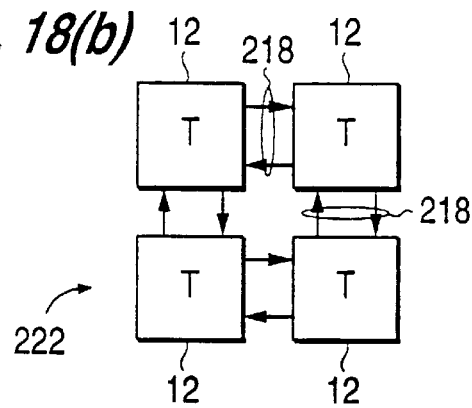
FIG. 18(b) shows a processor ring configuration.
Figure 18C:
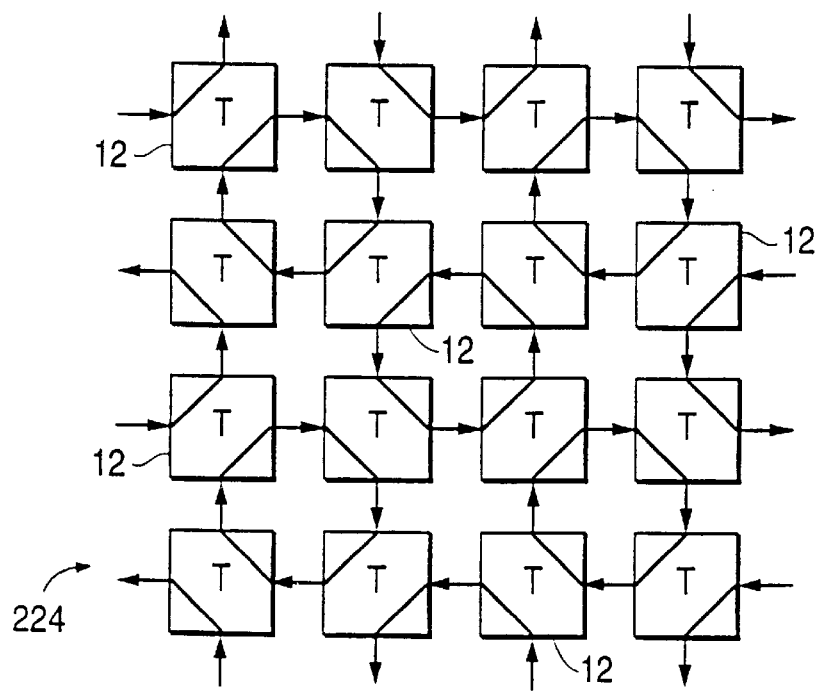
FIG. 18(c) shows a two-dimensional processor configuration.

Referring to FIG. 18, each general purpose media processor 12 preferably includes at least a pair of inter-processor links 218 (see also FIG. 16(b)). In one configuration, both pairs of inter-processor links 218 can be connected between the two processors 12 to further enhance bandwidth. As shown in FIG. 18(a) several processors 12 may be interconnected in a linear network employing the transponder daemons in each processor. In an alternate embodiment shown in FIG. 18(b), the inter-processor links 218 may be used to join the general purpose media processors 12 in a ring configuration. Alternatively still, general purpose media processors 12 may be interconnected into a two-dimensional network of processors of arbitrary size, as shown in FIG. 18(c). Sixteen processors are connected in FIG. 18(c) by connecting four ring networks. In yet another alternate embodiment, by connecting the inter-processor links 218 to external switching devices (not shown), multi-processors with a large number of processors can be constructed with an arbitrary interconnection topology.

The requester, responder and transponder daemons preferably handle all inter-processor operations. When one general purpose media processor 12 attempts a load or store to a physical address of a remote processor, the requester daemon autonomously attempts to satisfy the remote memory reference by communicating with the external device. The external device may comprise another processor 12 or a switching device (not shown) that eventually reaches another processor 12. Preferably, two requester daemons are provided each processor 12, which act concurrently on two different byte channels and/or module addresses. The responder daemon accepts writes from a specified channel and module address, which enables an external device to generate transaction requests in local memory or to generate processor events. The responder daemon also generates link level writes to the same external device that communicated responses for the received transaction request. Two such responder daemons are preferably provided; each of which operate concurrently to two different byte channels and/or module addresses.

The transponder daemon accepts writes from a specified channel and module address, which enable an external device to cause a requester daemon to generate a request on another channel and module address. Preferably, two such transponder daemons are provided, each of which act concurrently (back-to-back) between two different byte channel and/or module addresses. As those skilled in the art will appreciate, the requester, responder and transponder daemons must act cooperatively to avoid deadlock that may arise due to an imbalance of requests in the system. Deadlocks prevent responses from being routed to their destinations, which may defeat the benefits of a multi-processor distributed system.

According to one presently preferred embodiment of the invention, the general purpose media processor 12 can be implemented as one or more integrated circuit chips. Referring to FIG. 19, the presently preferred embodiment of the general purpose media processor 12 consists of a four-chip set. In the four-chip set, a general purpose media processor 12 is manufactured as a stand alone integrated circuit. The stand alone integrated circuit includes a memory management unit 122, instruction and data cache/buffers 118, 120, and an execution unit 100. A plurality of signal input/output pads 260 are provided around the circumference of the integrated circuit to communicate signals to and from the general purpose media processor 12 in a manner generally known in the art.

The second and third chips of the four-chip set comprise in an external memory element 158 and a channel interface device 216. The external memory element 158 includes an interface to the communication channel 156, a cache 150 and a memory interface 152. The channel interface device 216 also includes an interface to the communication channel 156, as well as buffer memory 262, and input/output interfaces 264. Both the external memory element 158 and the channel interface device 216 include a plurality of input/output signal pads 260 to communicate signals to and from these devices in a generally known manner.

The fourth integrated circuit chip comprises a switch 226, which allows for installation of the general purpose media processor 12 in the heterogeneous network 38. In addition to the plurality of input/output pads 260, the switch 226 includes an interface to the communication channel 156. The switch 226 also preferably includes a buffer 262, a router 266, and a switch interface 268.

As those skilled in the art will appreciate, many implementations for the general purpose media processor 12 are possible in addition to the four-chip implementation described above. Rather than an integrated approach, the general purpose media processor can be implemented in a discrete manner. Alternatively, the general purpose media processor 12 can be implemented in a single integrated circuit, or in an implementation with fewer than four integrated circuit chips. Other combinations and permutations of these implementations are contemplated.

There has been described a system for processing streams of media data at substantially peak rates to allow for real time communication over a large heterogeneous network. The system includes a media processor at its core that is capable of processing such media data streams. The heterogeneous network consists of, for example, the fiber optic/coaxial cable/twisted wire network in place throughout the U.S. To provide for such communication of media data, a media processor according to the invention is disposed at various locations throughout the heterogeneous network. The media processor would thus function both in a server capacity and at an end user site within the network. Examples of such end user sites include televisions, set-top converter boxes, facsimile machines, wireless and cellular telephones, as well as large and small business and industrial applications.

To achieve such high rates of data throughput, the media processor includes an execution unit, high bandwidth interface, memory management unit, and pipelined instruction and data paths. The high bandwidth interface includes a mechanism for transmitting media data streams to and from the media processor at rates at or above the gigahertz frequency range. The media data stream can consist of transmission, presentation and storage type data transmitted alone or in a unified manner. Examples of such data types include audio, video, radio, network and digital communications. According to the invention, the media processor is dynamically partitionable to process any combination or permutation of these data types in any size.

A programmable, general purpose media processor system presents significant advantages over current multimedia communications. Rather than rigid, costly and inefficient specialized processors, the media processor provides a general purpose instruction set to ease programmability in a single device that is capable of performing all of the operations of the specialized processor combination. Providing a uniform instruction set for all media related operations eliminates the need for a programmer to learn several different instruction sets, each for a different specialized processor. The complexity of programming the specialized processors to work together and communicate with one another is also greatly reduced. The unified instruction set is also more efficient. Highly specialized general calculation instructions that are tailored to general or special types of calculations rather than enhancing communication are eliminated.

Moreover, the media processor system can be easily reprogrammed simply by transmitting or downloading new software over the network. In the specialized processor approach, new programming usually requires the delivery and installation of new hardware. Reprogramming the media processor can be done electronically, which of course is quicker and less costly than the replacement of hardware.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of this invention.

We claim:

1. A high bandwidth processor interface for receiving and transmitting a media stream, comprising:

a data path, the data path operable to transmit and receive media information comprising memory access requests and memory access responses at sustained peak rates;

a plurality of controllers coupled to the data path, the plurality of controllers for controlling the transmission and receipt of the media information to and from the data path; and a cache coupled to the plurality of controllers and to the data path, for buffering multiple memory access requests and memory access responses, the cache being configured to transmit and receive the media information in the form of packets comprising command information, address information, and data, the command information including identification data for linking the memory access responses to respective memory access requests.

2. The high bandwidth processor interface defined in claim 1, further comprising a high bandwidth data channel for transmitting and receiving the media stream.

3. The high bandwidth processor interface defined in claim 2, wherein the high bandwidth data channel is unidirectional.

4. The high bandwidth processor interface defined in claim 1, further comprising a general purpose programmable media processor coupled to the data path to receive, process and transmit the media information at substantially peak rates.

5. The high bandwidth processor interface defined in claim 1, wherein the peak rate of operation comprises at least one gigabyte of information per second from point to point.

6. The high bandwidth processor interface defined in claim 2, wherein the high bandwidth data channel comprises unidirectional ports having differential data inputs and outputs and a differential clock signal for transmitting and receiving plural bits of data comprising the media stream.

7. The high bandwidth processor interface defined in claim 6, wherein the high bandwidth data channel further comprises a digital skew calibrator to adjust the plural bits of data relative to the differential clock signal to eliminate skew between the data.

8. The high bandwidth processor interface defined in claim 6, wherein the high bandwidth data channel further comprises a phase locked loop to eliminate jitter in the differential clock signal.

9. The high bandwidth processor interface defined in claim 6, wherein the plural bits comprise eight input bits and eight output bits.

10. The high bandwidth processor interface defined in claim 6, wherein the high bandwidth data channel further comprises termination resistors to form matched impedances for each of the plural bits of data.

11. The high bandwidth processor interface defined in claim 2, wherein the high bandwidth data channel comprises plural parallel high bandwidth data channels.

* * * * *

US005822603C1

(12) EX PARTE REEXAMINATION CERTIFICATE (6966th)
United States Patent
Hansen et al.

(10) Number: US 5,822,603 C1
(45) Certificate Issued: Aug. 4, 2009

(54) HIGH BANDWIDTH MEDIA PROCESSOR INTERFACE FOR TRANSMITTING DATA IN THE FORM OF PACKETS WITH REQUESTS LINKED TO ASSOCIATED RESPONSES BY IDENTIFICATION DATA

(75) Inventors: Craig Hansen, Los Altos, CA (US); John Moussouris, Palo Alto, CA (US)

(73) Assignee: Microunity Systems Engineering, Inc., Sunnyvale, CA (US)

Reexamination Request:
No. 90/008,514, Mar. 1, 2007

Reexamination Certificate for:
Patent No.: 5,822,603
Issued: Oct. 13, 1998
Appl. No.: 08/754,827
Filed: Nov. 22, 1996

Related U.S. Application Data

(62) Division of application No. 08/516,036, filed on Aug. 16, 1995, now Pat. No. 5,742,840.

(51) Int. Cl.
*G06F 12/08* (2006.01)
*G06F 12/10* (2006.01)
*G06F 9/30* (2006.01)
*G06F 9/302* (2006.01)
*G06F 15/78* (2006.01)
*G06F 15/76* (2006.01)
*G06F 9/308* (2006.01)
*G06F 9/312* (2006.01)
*G06F 9/38* (2006.01)
*G06F 9/315* (2006.01)
*H04N 7/58* (2006.01)
*H04N 7/52* (2006.01)
*H04N 7/24* (2006.01)

(52) U.S. Cl. ............. 712/210; 712/E9.016; 712/E9.017; 712/E9.021; 712/E9.028; 712/E9.033; 712/E9.034; 712/E9.055; 712/E9.062; 712/E9.063; 712/E9.019; 712/36; 375/E7.019; 375/E7.268; 708/490; 711/E12.02; 711/E12.061

(58) Field of Classification Search ........................ None
See application file for complete search history.

(56) References Cited

U.S. PATENT DOCUMENTS 4,025,772 A    5/1977   Constant
(Continued)

FOREIGN PATENT DOCUMENTS

EP            0 468 820 A2    1/1992
(Continued)

OTHER PUBLICATIONS

Diefendorff et al., "The PowerPC User Instruction Set Architecture," *IEEE Micro*, No. 5, 30–41 (Oct. 1994) [XP000476678].

(Continued)

*Primary Examiner*—Deandra M Hughes

(57) ABSTRACT

A general purpose, programmable media processor for processing and transmitting a media data stream of audio, video, radio, graphics, encryption, authentication, and networking information in real-time. The media processor incorporates an execution unit that maintains substantially peak data throughout of media data streams. The execution unit includes a dynamically partionable multi-precision arithmetic unit, programmable switch and programmable extended mathematical element. A high bandwidth external interface supplies media data streams at substantially peak rates to a general purpose register file and the multi-precision execution unit. A memory management unit, and instruction and data cache/buffers arc also provided. High bandwidth memory controllers are linked in series to provide a memory channel to the general purpose, programmable media processor. The general purpose, programmable media processor is disposed in a network fabric consisting of fiber optic cable, coaxial cable and twisted pair wires to transmit, process and receive single or unified media data streams. Parallel general purpose media processors are disposed throughout the network in a distributed virtual manner to allow for multi-processor operations and sharing of resources through the network. A method for receiving, processing and transmitting media data streams over the communications fabric is also provided.

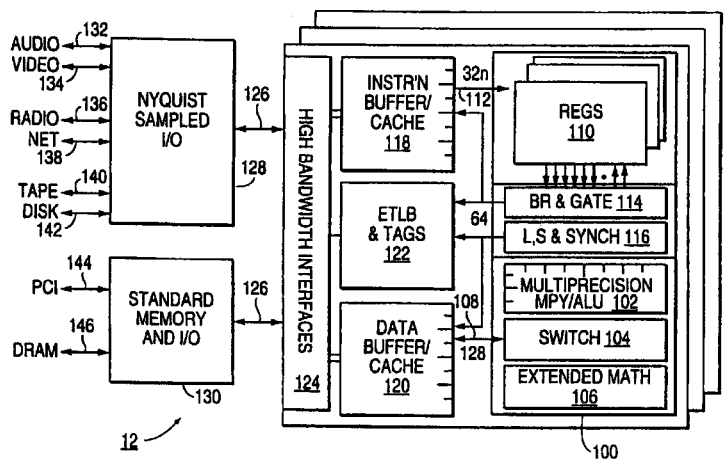

U.S. PATENT DOCUMENTS

| | | | |
|---|---|---|---|
| 4,489,393 A | 12/1984 | Kawahara et al. |
| 4,509,119 A | 4/1985 | Gumaer |
| 4,701,875 A | 10/1987 | Konishi et al. |
| 4,727,505 A | 2/1988 | Konishi et al. |
| 4,852,098 A | 7/1989 | Brechard et al. |
| 4,875,161 A | 10/1989 | Lahti |
| 4,876,660 A | 10/1989 | Owen et al. |
| 4,893,267 A | 1/1990 | Alsup et al. |
| 4,943,919 A | 7/1990 | Aslin |
| 4,949,294 A | 8/1990 | Wambergue |
| 4,953,073 A | 8/1990 | Moussouris et al. |
| 4,956,801 A | 9/1990 | Priem et al. |
| 4,959,779 A | 9/1990 | Weber et al. |
| 4,969,118 A | 11/1990 | Montoye et al. |
| 4,975,868 A | 12/1990 | Freerksen |
| 5,032,865 A | 7/1991 | Schlunt |
| 5,081,698 A | 1/1992 | Kohn |
| 5,113,506 A | 5/1992 | Moussouris et al. |
| 5,132,898 A | 7/1992 | Sakamura et al. |
| 5,155,816 A | 10/1992 | Kohn |
| 5,157,388 A | 10/1992 | Kohn |
| 5,161,247 A | 11/1992 | Murakami et al. |
| 5,179,651 A | 1/1993 | Taaffe et al. |
| 5,201,056 A | 4/1993 | Daniel et al. |
| 5,208,914 A | 5/1993 | Wilson |
| 5,231,646 A | 7/1993 | Heath et al. |
| 5,233,690 A | 8/1993 | Sherlock |
| 5,241,636 A | 8/1993 | Kohn |
| 5,253,342 A | 10/1993 | Blount |
| 5,256,994 A | 10/1993 | Langendorf |
| 5,258,660 A | 11/1993 | Nelson et al. |
| 5,268,855 A | 12/1993 | Mason et al. |
| 5,268,995 A | 12/1993 | Diefendorff et al. |
| 5,280,598 A | 1/1994 | Osaki et al. |
| 5,287,327 A | 2/1994 | Takasugi |
| 5,325,495 A | 6/1994 | McLellan |
| 5,327,369 A | 7/1994 | Ashkenazi |
| 5,327,570 A | 7/1994 | Foster |
| 5,371,772 A | 12/1994 | Al-Khairi |
| 5,375,208 A | 12/1994 | Pitot |
| 5,390,135 A | 2/1995 | Lee |
| 5,408,581 A | 4/1995 | Suzuki et al. |
| 5,410,669 A | 4/1995 | Biggs et al. |
| 5,410,682 A | 4/1995 | Sites et al. |
| 5,423,051 A | 6/1995 | Fuller et al. |
| 5,426,600 A | 6/1995 | Nakagawa et al. |
| 5,448,509 A | 9/1995 | Lee |
| 5,467,131 A | 11/1995 | Bhaskaran |
| 5,471,628 A | 11/1995 | Phillips et al. |
| 5,477,181 A | 12/1995 | Li |
| 5,487,024 A | 1/1996 | Girardeau, Jr. |
| 5,500,811 A | 3/1996 | Corry |
| 5,515,520 A | 5/1996 | Hatta et al. |
| 5,522,054 A | 5/1996 | Gunlock |
| 5,530,960 A | 6/1996 | Parks |
| 5,533,185 A | 7/1996 | Lentz et al. |
| 5,539,449 A | 7/1996 | Blahut et al. |
| 5,541,865 A | 7/1996 | Ashkenazi |
| 5,557,724 A | 9/1996 | Sampat et al. |
| 5,581,705 A | 12/1996 | Passint et al. |
| 5,583,990 A | 12/1996 | Birrittella et al. |
| 5,590,350 A | 12/1996 | Guttag |
| 5,590,365 A | 12/1996 | Ide et al. |
| 5,592,405 A | 1/1997 | Gove et al. |
| 5,600,814 A | 2/1997 | Gahan et al. |
| 5,636,351 A | 6/1997 | Lee |
| 5,673,407 A | 9/1997 | Poland et al. |
| 5,680,338 A | 10/1997 | Agarwal et al. |
| 5,732,236 A | 3/1998 | Nguyen |
| 5,734,874 A | 3/1998 | Van Hook |
| 5,758,176 A | 5/1998 | Agarwal et al. |
| 5,809,292 A | 9/1998 | Wilkinson et al. |
| 5,826,106 A | 10/1998 | Pang |
| 5,828,869 A | 10/1998 | Johnson |
| 5,883,824 A | 3/1999 | Lee |
| 6,016,538 A | 1/2000 | Guttag et al. |

FOREIGN PATENT DOCUMENTS

| | | |
|---|---|---|
| EP | 0 474 246 A2 | 3/1992 |
| EP | 0 649 085 A1 | 4/1995 |
| EP | 0 653 703 A1 | 5/1995 |
| EP | 0 654 733 A1 | 5/1995 |
| JP | S60-217435 | 10/1985 |
| JP | 3268024 | 11/1991 |
| JP | 6095843 A | 4/1994 |
| WO | WO 93/01543 | 1/1993 |
| WO | WO 93/01565 | 1/1993 |
| WO | WO 93/11500 | 6/1993 |
| WO | WO 97/07450 | 2/1997 |

OTHER PUBLICATIONS

Greenley et al., "UltraSPARC™; The Next Generation Superscaler 64-bit SPARC," IEEE, 442–51 (995) [XP000545452]..

Laudon et al., "Interleaving: A Multithreading Technique Targeting Multiprocessors and Workstations," ACM Sigplan Notices, No. 11, 308–18 (Nov. 29, 1994) [XP000491743].

"MC88110 RISC Microprocessor User's Manual, Second Edition," Motorola, Inc. (1990), Sections 1 through 3 (148 pages) [XP002474804].

Sato et al., "Multiple Instruction Streams in a Highly Pipelined Processor," IEEE, 182–89 (1990) [XP010021363].

Wang et al., "The 3DP: A Processor Architecture for Three–Dimensional Applications," *Computer*, No. 1, 25–36 (Jan. 1992) [XP000287832].

Yamamoto et al., "Performance Estimation of Multi-streamed, Superscaler Processors," IEEE, 195–204 (1994) [XP01009694].

Zhou et al., "MPEG Video Decoding with the UltraSPARC Visual Instruction Set," IEEE, 470–75 (1995) [XP002472254].

P27838EP–D1–PCT Extended European Search Report dated May 2, 2008 in Appplication No./Patent No. 07111352.6–1243.

P27838EP–D4–PCT Extended European Search Report dated May 8, 2008 in Application No./Patent No. 07111349.2–1243.

P27838EP–D5–PCT Extended European Search Report dated Apr. 23, 2008 in Application No./Patent No. 07111344.3–1243.

P27838EP–D6–PCT Partial European Search Report dated Apr. 1, 2008 in Application No./Patent No. 07111348.4–1243.

P27838EP–D7–PCT Extended European Search Report dated Mar. 10, 2008 in Application No./Patent No. 07111473.0–1243.

P27838EP–D8–PCT Extended European Search Report dated May 27, 2008 in Application No./Patent No. 07111476.3–1243.

P27838EP–D9–PCT Extended European Search Report dated Mar. 26, 2008 in Application No./Patent No. 07111480.5–1243.

Fuller et al., "The PowerPC 604™ Microprocessor—Multimedia Ready," *Circuits and Systems, 1995, Proceedings of the 38th Midwest Symposium on Rio de Janeiro, Brazil (Aug. 13–16, 1995), New York, NY*, IEEE, vol. 2, 1135–38 (Aug. 13, 1995) [XP010165331].

Gwennap, "MIPS R10000 Uses Decoupled Architecture—High–Performance Core Will Drive MIPS High–End for Years," *Microprocessor Report*, vol. 8, No. 14 (Oct. 24, 1994), MicroDesign Resources (1994) [XP002219607].

Murakami et al., "SIMP (Single Instruction Stream/Multiple Instruction Pipelining): A Novel High–Speed Single–Processor Architecture," *Computer Architecture News*, ACM, New York, NY, vol. 17, No. 3, 78–85 (Jun. 1, 1989) [XP000035291].

"UltraSPARC Multimedia Capabilities On–Chip Support for Real–Time Video and Advanced Graphics," Sun Microsystems, Inc., 1–8 (1994) [XP002177546].

P27838EP–D3–PCT Extended European Search Report dated Jul. 3, 2008 in Application No./Patent No. 07111350.0-1243/1873654.

P27838EP–D6–PCT Extended European Search Report dated Jun. 27, 2008 in Application No./Patent No. 07111348.4-1243/1873629.

Nov. 2, 2005 Complaint for Patent Infringement (*MicroUnity Systems Engineering, Inc. v. Sony Computer Entertainment America. Inc.*; 2:05–cv–505; USDC for the Eastern District of Texas, Marshall Division).

Feb. 16, 2006 SCEA's Motion for Stay of Litigation Pending Reexamination (*MicroUnity Systems Engineering, Inc.v Sony Computer Entertainment American, Inc.*: 2:05–cv–cv–505; USDC for the Eastern District of Texas, Marshall Division).

Mar. 1, 2006 MicroUnity's Opposition to Defendant's Motion for Stay of Litigation Pending Reexamination (*MicroUnity Systems Engineering, Inc. v. Sony Computer Entertainment America, Inc.*; 2:05–cv–505: USDC for the Eastern District of Texas, Marshall Division).

Mar. 1, 2006 MicroUnity's Answer to SCEA's Counterclaim (*MicroUnity Systems Engineering, Inc. v. Sony Computer Entertainment America, Inc.*; 2:05–cv–505; USDC for the Eastern District of Texas, Marshall Division).

Mar. 6, 2006 SCEA's Reply Supporting Its Motion for Stay of Litigation Pending Rexxamination (*MicroUnity Systems Engineering, Inc. v. Sony Computer Entertainment America, Inc.*; 2:05–cv–505; USDC for the Eastern District of Texas, Marshall Division).

Sep. 29, 2006 Order Denying Motion to Continue, Finding as Moot Motion to Stay (*MicroUnity Systems Engineering, Inc. v. Sony Computer Entertainment America, Inc.*; 2:05–cv–505; USDC for the Eastern District of Texas, Marshall Division).

Dec. 1, 2006 MicroUnity's Disclosure of Asserted Claims And Preliminary Infringement Contentions Pursuant to Local Patent Rule 3–1 and Attachments A–Z, AA, and BB (*MicroUnity Systems Engineering, Inc. v. Sony Computer Entertainment America, Inc.*; 2:05–cv–505; USDC for the Eastern District of Texas, Marshall Division).

Dec. 1, 2006 MicroUnity's Identification of Documents Pursuant to Local Patent Rule 3–2 (*MicroUnity Systems Engineering, Inc. v. Sony Computer Entertainment America, Inc.*; 2:05–cv–505; USDC for the Eastern District of Texas, Marshall Division).

Dec. 20, 2006 MicroUnity's Initial Disclosures (*MicroUnity Systems Engineering, Inc. v. Sony Computer Entertainment America, Inc.*; 2:5–cv–505; USDC for the Eastern District of Texas, Marshall Division).

Dec. 21, 2006 SCEA's Initial Disclosures Pursuant to the Discovery Order (*MicroUnity Systems Engineering,.Inc. v. Sony Computer Entertainment America, Inc.*; 2:05–cv–505; USDC for the Eastern District of Texas, Marshall Division).

Jan. 25, 2007 First Amended Complaint for Patent Infringement and Exhibits A–J (*MicroUnity Systems Engineering, Inc. v. Sony Computer Entertainment America, Inc.*; 2:05–cv–505; USDC for the Eastern District of Texas, Marshall Division).

Feb. 12, 2007 SCEA's Answer, Affirmative Defenses, And Counterclaims to MicroUnity's First Amended Complaint (*MicroUnity Systems Engineering, Inc. v. Sony Computer Entertainment America, Inc.* ; 2:05–cv–505; USDC for the Eastern District of Texas, Marshall Division).

Mar. 2, 2007 MicroUnity's Answer to SCEA's Counterclaim in Response to MicroUnity's First Amended Complaint (*MicroUnity Systems Engineering, Inc. v. Sony Computer Entertainment America, Inc.*; 2:05–cv–505; USDC for the Eastern District of Texas, Marshall Division).

Mar. 5, 2007 SCEA's Invalidity Contentions & Attachments A–1 (portions of G and H are Outside Counsel Eyes Only and are not included) (*MicroUnity Systems Engineering, Inc. v. Sony Computer Entertainment America, Inc.*; 2:05–cv–505; USDC for the Eastern District of Texas, Marshall Division).

Apr. 3, 2007 SCEA's Supplemental Disclosures (*MicroUnity Systems Engineering, Inc. v. Sony Computer Entertainment America, Inc.*; 2:05–cv–505; USDC for the Eastern District of Texas, Marshall Division).

May 1, 2007 SCEA's Supplemental Invalidity Contentions & Attachments A–1 (Exhibits A2, E3, F2, G9 and H7 are Outside Counsel Eyes Only and are not included) (*MicroUnity Systems Engineering, Inc. v. Sony Computer Enterainment America, Inc.*; 2:05–cv–505: USDC for the Eastern District of Texas, Marshall Division).

May 9, 2007 SCEA's Amended Answer, Affirmative Defenses, And Counterclaims to MicroUnity's First Amended Complaint (*MicroUnity Systems Engineering, Inc. v. Sony Computer Entertainment America, Inc.*; 2:05–cv–505; USDC for the Eastern District of Texas, Marshall Division).

May 22, 2007 MicroUnity's LPR 4–1 Proposed List of Terms to be Construed (*MicroUnity Systems Engineering, Inc. v. Sony Computer Entertainment America, Inc.*; 2:05–cv–505; USDC for the Eastern District of Texas, Marshall Division).

May 22, 2007 SCEA's Proposed List of Claim Terms, Phrases, Clauses, And Elements For Construction (*MicroUnity Systems Engineering, Inc. v. Sony Computer Entertainment America, Inc.*; 2:05–cv–505; USDC for the Eastern District of Texas, Marshall Division).

May 29, 2007 MicroUnity's Answer to SCEA's Amended Counterclaim in Response to Microunity's First Amended Complaint (*MicroUnity Systems Engineering, Inc. v. Sony Computer Entertainment America, Inc.*; 2:05–cv–505; USDC for the Eastern District of Texas, Marshall Division).

Nov. 22, 2006 Complaint Against Advanced Mirco Devices, Inc. and Exhibits A–L (*MicroUnity Systems Engineering, Inc. v. Advanced Micro Devices, Inc.*; 2:06–cv–486; USDC for the Eastern District of Texas, Marshall Division).

Feb. 26, 2007 AMD's Answer to MicroUnity's Complaint (*MicroUnity Systems Engineering, Inc.* v. *Advanced Micro Devices, Inc.*; 2:06–cv–486; USDC for the Eastern District of Texas, Marshall Division).

Advance Datasheet for MT48LC2M8Sl(S) 2 Meg×8 SDRAM, Micron Semiconductor, Inc., 2–43 to 2–84 (1994).

Asprey et al., "Performance Features of the PA7100 Microprocessor," IEEE Micro. 22–35 (Jun. 1993).

BSP and BSP Customer Attributes, Inclosure 5, Burroughs Corporation (Aug. 1, 1977).

BSP Floating Point Arithmetic, Burroughs Corporation, (Dec. 1978).

BSP Implementation of Fortran, Burroughs Corporation (Feb. 1978).

BSP. Burroughs Scientific Process. Burroughs Corporation, 1–29 (Jun. 1977).

Bursky, "Synchronous DRAMs Clock At 100 MHz," Electronic Design, vol. 41, No. 4, 45–49 (Feb. 18, 1993).

D. D. Gajski and L. P. Rubinfeld, "Design for Arithmetic Elements for Burroughs Scientific Processor," Proceedings of the 4th Symposium on Computer Arithmetic, Santa Monica, CA, 245–56 (1978).

"System Architecture." ELXSI (2d Ed. Oct. 1983).

"System Foundation Guide," ELXSI (1st Ed. oct. 1987).

L. Higbie, "Applications of Vector Processing," Computer Design, 139–45 (Apr. 1978).

Ide et al., "A 320–MFLOPS CMOS Floating–Point Processing Uit for Superscalar Processors," IEEE Journal of Solid–State Circuits, vol. 28, No. 3, 352–61 (Mar. 1993).

"IEEE Standard for Communicating Among Processors and Peripherals Using Shared Memory (Direct Memory Access—DMA)," IEEE (1994).

D.A. Kuck & R. Stokes, "The Burroughs Scientific Processor (BSP)," IEEE Transactions on Computers, vol. C–31, No. 5, 363–76 (May 1982).

Lee, "Accelerating Multimedia with Enhanced Microprocessors," IEEE Micro, vol. 15, No. 2, 22–32 (Apr. 1995).

Lion Extension Architecture (Oct. 12, 1991).

"MC88110 Second Generation RISC Microprocessor User's Manual," Motorola (1991).

Spaderna et al., "An Integrated Floating Point Vector Processor for DSP and Scientific Computing," IEEE International Conference on Computer Design: VLSI in Computers and Processors, 8–13 (Oct. 1989).

Sprunt et al., "Priority–Driven, Preemptive I/O Controllers for Real–Time Systems,"0 IEEE (1988).

Thornton, "Design of a Computer—The Control Data 6600," Scott, Foresman and Company (1970).

Watkins et al., "A Memory Controller with an Integrated Graphics Processor," IEEE 324–36 (1993).

*MU* v. *SCEA* Feb. 14, 2006 SCEA's Answer, Affirmative Defenses, and Counterclaim to MicroUnity's Original Complaint (*MicroUnity Systems Engineering, Inc.* v. *Sony Computer Entertainment America, Inc.*; 2:05–cv–505; USDC for the Eastern District of Texas, Marshall Division).

Jun. 27, 2007 Declaration of Richard A. Belgard in Support of MicroUnity's Claim Construction with Exhibits A–C (MU's Supporting Evidence—Reference #7—for Joint Claim Construction (PR 4–3 Disclosures)) (*MicroUnity Systems Engineering, Inc.* v. *Sony Entertainment America, Inc.*, 2:05–cv–505, U.S.D.C., E.D. Texas Marshall Division).

Jun. 29, 2007 Joint Motion to Dismiss Claims Regarding U.S. Patent No. 5,630,096 (*MicroUnity Systems Engineering, Inc.* v. *Sony Computer Entertainment America, Inc.*, 2:05–cv–505, U.S.D.C., E.D. Texas, Marshall Division).

Jul. 5, 2007 Order Granting Joint Motion to Dismiss Claims Regarding U.S. Patent No. 5,630,096 (*MicroUnity Systems Engineering, Inc.* v. *Sony Computer Entertainment America, Inc.*, 2:05–cv–505, U.S.D.C., E.D. Texas, Marshall Division).

Jul. 11, 2007 SCEA's Second Amended Answer, Affirmative Defenses, And Counterclaims to MicroUnity's First Amended Complaint (*MicroUnity Systems Engineering, Inc.* v *Sony Computer Entertainment America, Inc.*, 2:05–cv–505, U.S.D.C., E.D. Texas, Marshall Division).

Jul. 11, 2007 P.R. 4–3 Joint Claim Construction Statement (*MicroUnity Systems Engineering, Inc.* v. *Sony Computer Entertainment America, Inc.*, 2:05–cv–505, U.S.D.C., E.D. Texas, Marshall Division).

Jul. 11, 2007 P.R. 4–3 Joint Claim Construction Statement—SCEA's Supporting Evidence—Reference #1: Definitions of "finite group" and "ring", McGraw–Hill Dictionary of Scientific and Technical Terms, $5^{th}$ ed. (McGraw–Hill, Inc. 1994), pp. 757 and 1716 (SCEA–1723177–180) (*MicroUnity Systems Engineering, Inc.* v. *Sony Computer Entertainment America, Inc.*, 2:05–cv–505, U.S.D.C., E.D. Texas, Marshall Division).

Jul. 11, 2007 P.R. 4–3 Joint Claim Construction Statement—MU's Supporting Evidence—Reference #1: Aug. 26, 2005 Memo and Order re Claim Construction (*Markman* ruling) in *MicroUnity Systems Engineering, Inc.* v. *Dell, Inc. and Intel Corporation*, No. 2–04 CV–120 (U.S.D.C., E.D. Tex.) (*MicroUnity Systems Engineering, Inc.* v. *Sony Computer Entertainment America, Inc.*, 2:05–cv–505, U.S.D.C., E.D. Texas, Marshall Division).

Jul. 11, 2007 P.R. 4–3 Joint Claim Construction Statement—MU's Supporting Evidence—Reference #2: Definitions of "Execution" and "general purpose computer", The IEEE Standard Dictionary of Electrical and Electronics Terms, $6^{th}$ ed. (IEEE 1996), pp. 379, 451 and 1232 (*MicroUnity Systems Engineering, Inc.* v. *Sony Computer Entertainment America, Inc.*, 2:05–cv–505, U.S.D.C., E.D. Texas, Marshall Divison).

Jul. 11, 2007 P.R. 4–3 Joint Claim Construction Statement—MU's Supporting Evidence—Reference #3: Definition of "execution", Modern Dictionary of Electronics, $6^{th}$ ed. revised and updated (Newnes/Butterworth–Heinemann 1997), p. 355 (*MicroUnity Systems Engineering, Inc.* v. *Sony Computer Entertainment America, Inc.*, 2:05–cv–505, U.S.D.C., E.D. Texas, Marshall Division).

Jul. 11, 2007 P.R. 4–3 Joint Claim Construction Statement—MU's Supporting Evidence—Reference #4: Definition of "unique", Merriam–Webster Online Dictionary 2005, http://www.m–w.com (Jul. 19, 2007) (*MicroUnity Systems Engineering, Inc.*v. *Sony Computer Entertainment America, Inc.*, 2:05–cv–505. U.S.D.C., E.D. Texas, Marshall Division).

Jul. 11, 2007 P.R. 4–3 Joint Claim Construction Statement—MU's Supporting Evidence —Reference #5: Mar. 9, 2005 Joint Claim Construction and Prehearing Statement in *MicroUnity Engineering Systems, Inc.* v. *Dell, Inc. and Intel Corporation*, No. 2–04–cv–120 (U.S.D.C., E.D. Texas) (*MicroUnity Systems Engineering, Inc.* v. *Sony Computer Entertainment America, Inc.*, 2:05–cv–505, U.S.D.C., E.D. Texas, Marshall Division).

Jul. 11, 2007 P.R. 4–3 Joint Claim Construction Statement—MU's Supporting Evidence—Reference #6: Rudolf Lidl & Harald Niederreiter, Introduction to Finite Fields and Their Applications (1994), pp. 2–19 (*MicroUnity Systems Engineering, Inc.* v. *Sony Computer Entertainment America, Inc.*, 2:05–cv–505, U.S.D.C., E.D. Texas, Marshall Division).

Jul. 16, 2007 Joint Motion to Dismiss Claims Regarding U.S. Pat. No. 5,867,735 (*MicroUnity Systems Engineering, Inc.* v. *Sony Computer Entertainment America, Inc.*, 2:05–cv–505, U.S.D.C., E.D. Texas, Marshall Division).

Jul. 19, 2007 Order Granting Joint Motion to Dismiss Claims Regarding U.S. Patent No. 5,867,735 (*MicroUnity Systems Engineering, Inc.* v. *Sony Computer Entertainment America, Inc.*, 2:05–cv–505, U.S.D.C., E.D. Texas, Marshall Division).

July 25, 2007 MU's Answer to SCEA's Second Amended Counterclaim in Response to MU's First Amended Complaint (*MicroUnity Systems Engineering, Inc.* v. *Sony Computer Entertainment American, Inc.*, 2:05–cv–505, U.S.D.C., E.D. Texas, Marshall Division).

*MU* v. *AMD* May 21, 2007 Motion For a Stay of Action Pending Reexamination by AMD (Attachments: #(1) Appendix A to Motion to Stay. #(2) Declaration of Michael Sapoznikow. #(3) Exhibits 1–9, #(4) Text of Proposed Order (*MicroUnity Systems Engineering, Inc.* v. *Advanced Micro Devices, Inc.*, 2:06–cv–486, U.S.D.C., E.D. Texas, Marshall Division).

Jun. 8, 2007 MicroUnity's Opposition to Defendant's Motion For a Stay of Action Pending Reexamination and Declaration of Stuart Bartow (Attachments: Exhibits 1 & 2) (*MicroUnity Systems Engineering, Inc.* v. *Advanced Micro Devices, Inc.*, 2:06–cv–486, U.S.D.C., E.D. Texas, Marshall Division).

Jun. 18, 2007 AMD's Reply Memorandum in Support of Motion For a Stay of Action Pending Reexamination (*MicroUnity Systems Engineering, Inc.* v. *Advanced Micro Devices, Inc.*, 2:06–cv–486, U.S.D.C., E.D. Texas, marshall Division).

Jul. 10, 2007 Order Granting Agreed Motion to Enter the Stipulation of the Parties Concerning Modification to the Docket Control Order and Agreed Motion to Allow the Plaintiff to Amend its Original Complaint (Dismissals with prejudice) (*MicroUnity Systems Engineering, Inc.* v. *Advanced Micro Devices, Inc.*, 2:06–cv–486, U.S.D.C., E.D. Texas, Marshall Division).

Beckerle, "Overview of the Start (*T) Multithreaded Computer," IEEE COMPON, 148–56 (Feb. 22–26, 1993).

Diefendroff et al., "Organization of the Motorola 88110 Superscalar RISC Microprocessor," IEEE Micro. 40–63 (Apr. 1992).

Grimes et al., "The Intel i860 65–Bit Processor: A General–Purpose CPU with 3D Graphics Capabilities," IEEE Computer Graphcis & Applications, 85–94 (Jul. 1989).

Guttag et al., "A Single–Chip Multiprocessor For Multimedia: The MVP," IEEE Computer Graphics & Applications, 53–64 (Nov. 1992).

Gwennap, "New PA–RISC Processor Decodes MPEG Video: HP's PA–7100LC Uses New Instructions to Eliminate DecoderChip," Microprocessor Report, 16–17 (Jan. 24, 1994).

K. Hwang & F. Briggs, "Computer Architecture and Parallel Processing," McGraw Hill Book Co., Singapore (1988).

Kohn et al., "Introducing the Intel i860 64–Bit Microprocessor," IEEE Micro, 15–30 (Aug. 1989).

Kurpanek et al., "PA7200: A PA–RISC Processor with Intergated High Performance MP Bus Interface." IEEE COMPCON '94, 373–82 (FEB. 28–Mar. 4, 1994).

Margulis, "i860 Microprocessor Architecture," Intel Corporation (1990).

N15 External Architecture Specification (Dec. 14, 1990).

N15 Micro Architecture Specification (Apr. 29, 1991).

"Paragon User's Guide," Intel Corporation (Oct. 1993).

PA–RISC 1.1 Architecture and Instruction Set Reference Manual, Third Edition, Hewlett–Packard (Feb. 1994).

"TMS320C80 (MVP) Parallel Processor User's Guide," Texas Instruments (Mar. 1995).

Turcotte, "A Survey of Software Environments for Exploiting Networked Computing Resources," Engineering Research Center for Computational Field Simulation (Jun. 11, 1993).

Undy et al., "A Low–Cost Graphics and Multimedia Workstation Chip Set," IEEE Micro, 10–22 (Apr. 1994).

Patent Family Tree for U.S. Patent No. 5,742,840.

*Mu* v. *Dell & Intel* Mar. 26, 2004 Original Complaint for Patent Infringement (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

Apr. 20, 2004 Amended Complaint for Patent Infringement (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

Jan. 12, 2005 Defendant Intel Corporation and Defendant Dell Inc.'s Corrected Preliminary Invalidty Contentions and Exhibits A–H (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

Feb. 25, 2005 Defendant Dell Inc.'s Amended Answer, Affirmative Defenses, and Counterclaims to Plaintiff's First Amended Complaint (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

Feb. 25, 2005 Defendant Intel Corporation's Amended Answer, Affirmative Defenses, and Counterclaims to Plaintiff's First Amended Complaint (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

Mar. 9, 2005 Joint Claim Construction and Prehearing Statement with Exhibits A through F–2 (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

Apr. 11, 2005 MicroUnity Systems Engineering, Inc.'s Opening Brief Regarding Claim Construction Pursuant to Patent Local Rule 4–5(a) and Exhibits A–I (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

Apr. 26, 2005 Supplement to Plaintiff MicroUnity Systems Engineering, Inc.'s Opening Brief Regarding Claim Construction (submitting a corrected p. 41) (*MicroUnity Systems Engineering, Inc.* v. *Dell, Inc. f/k/a/ Dell Computer and Intel Corporation*; C.A. No. 2–04–cv–120; U.S.D.C., E.D. Texas, Marshall Division).

May 12, 2005 Dell, Inc. and Intel Corporation's Responsive Brief Regarding Claim Construction Pursuant to Patent Local Rule 4–5(b) (*MicroUnity Systems Engineering, Inc. v. Dell, Inc. f/k/a/ Dell Computer and Intel Corporation*; C.A. No. 2–04–cv–120; U.S.D.C., E.D. Texas, Marshall Division).

May 25, 2005 MicroUnity's Reply Brief Regarding Claim Construction Pursuant to Patent Local Rule 4–5(c) (*MicroUnity Systems Engineering, Inc. v. Dell, Inc. f/k/a/ Dell Computer and Intel Corporation*; C.A. No. 2–04–cv–120; U.S.D.C., E.D. Texas, Marshall Division).

Jun. 9, 2005 Intel and Dell's Surreply Brief Regarding Claim Construction (*MicroUnity Systems Engineering, Inc. v. Dell, Inc. F/k/a/ Dell Computer and Intel Corporation*; C.A. No. 2–04–cv–120; U.S.D.C., E.D. Texas, Marshall Division).

Sep. 9, 2005 Deposition of Leslie Kohn taken in *MicroUnity Systems Engineering, Inc. v. Dell, Inc. f/k/a Dell Computer and Intel Corporation* (U.S.D.C., E.D. Tex.—Marshall Div.), C.A. No. 2–4CV–120.

Sep. 12, 2005 Expert Witness Report of Richard A. Kilworth, Esq. (*MicroUnity Systems Engineering, Inc. v. Dell, Inc. f/k/a/ Dell Computer and Intel Corporation*; C.A. No. 2–04–cv–120; U.S.D.C., E.D. Texas, Marshall Division).

Sep. 12, 2005 Declaration and Expert Witness Report of Ray Mercer Regarding Written Description and Enablement Issues (*MicroUnity Systems Engineering, Inc. v. Dell, Inc. f/k/a/ Dell Computer and Intel Corporation*; C.A. No. 2–04–cv–120; U.S.D.C., E.D. Texas, Marshall Division).

Sep. 19, 2005 Defendants Intel and Dell's Invalidity Contentions and Exhibits A–G (*MicroUnity Systems Engineering, Inc. v. Dell, Inc. f/k/a/ Dell Computer and Intel Corporation*; C.A. No. 2–04–cv–120; U.S.D.C., E.D. Texas, Marshall Division).

Sep. 22, 2005 Deposition of Larry Mennemeier and Exhibit 501 taken in *MicroUnity Engineering, Inc. v. Dell, Inc. f/k/a Dell Computer and Intel Corporation* (U.S.D.C., E.D. Tex.—Marshall Div.), C.A. No. 2–4CV–120.

Oct. 6, 2005 Corrected Expert Report of Dr. Stephen B. Wicker Regarding Invalidty of U.S. Patent Nos. 5,742,840; 5,794,060; 5,794,061; 5,809,321; 6,584,482; 6,643,765; and 6,725,356 and Exhibits A–I (*MicroUnity Systems Engineering, Inc. v. Dell, Inc. f/k/a/ Dell Computer and Intel Corporation*; C.A. No. 2–04–cv–120; U.S.D.C., E.D. Texas, Marshall Division).

Oct. 7, 2005 Defendants Dell Inc. and Intel Corporation's Identification of Prior Art Pursuant to 35 USC § 282 (*MicroUnity Systems Engineering, Inc. v. Dell, Inc. f/k/a/ Dell Computer and Intel Corporation*; C.A. No. 2–04–cv–120; U.S.D.C., E.D. Texas, Marshall Division).

*MU v. SCEA* May 1, 2007 SCEA's Supplemental Invalidity Contentions—(Exhibits A–2, E–2, and F–2 previously marked Outside Counsel Eyes Only, but now released) (*MicroUnity Systems Engineering, Inc. v. Sony Computer Entertainment America, Inc.*; 2:05–cv–505; USDC for the Eastern District of Texas, Marshall Division).

Aug. 24, 2007 MU's LRP 4–5(a) Opening Brief on Claim Construction, and Exhibits 1–14 *MicroUnity Systems Engineering, Inc. v. Sony Computer Entertainment America, Inc.*, 2:05–cv–505, U.S.D.C., E.D. Texas, Marshall Division).

Sep. 12, 2007 SCEA's Responsive Brief Regarding Claim Construction Pursuant to P.R. 4–5(b), and Exhibits 1–34 (*MicroUnity Systems Engineering, Inc. v. Sony Computer Entertainment America, Inc.*, 2:05–cv–505, U.S.D.C., E.D. Texas, Marshall Division).

Sep. 13, 2007 SCEA's Unopposed Motion to Supplement P.R. 4–3 Joint Claim Construction Statement, and Proposed Order (*MicroUnity Systems Engineering, Inc. v. Sony Computer Entertainment America, Inc.*, 2:05–cv–505, U.S.D.C., E.D. Texas, Marshall Division).

Sep. 13, 2007 Notice of Filing of P.R. 4–5(d) Joint Claim Construction Chart, and Exhibit 1 (*MicroUnity Systems Engineering, Inc. v. Sony Computer Entertainment America, Inc.*, 2:05–cv–505, U.S.D.C., E.D. Texas, Marshall Div).

Sep. 14, 2007 Order Granting SCEA's Unopposed Motion to Supplement P.R. 4–3 Joint Claim Construction Statement (*MicroUnity Systems Engineering, Inc. v. Sony Computer Entertainment America, Inc.*, 2:05–cv–505. U.S.D.C., E.D. Texas, Marshall Division).

Sep. 17, 2007 LPR 4–5(c) Reply Brief on Claim Construction from MicroUnity Systems Engineering, Inc., and Exhibits 15 and 16 (*MicroUnity Systems Engineering, Inc. v. Sony Computer Entertainment America, Inc.*, 2:05–cv–505, U.S.D.C., E.D. Texas, Marshall Division).

Sep. 20, 2007 Transcript of Claim Construction Hearing Before the Honorable T. John Ward United States District Judge (*MicroUnity Systems Engineering, Iinc. v. Sony Computer Entertainment America, Inc.*, 2:05–cv–505, U.S.D.C., E.D. Texas, Marshall Division).

Oct. 15, 2007 SCEA's Motion for Partial Summary Judgment of Invalidity for U.S. Patent Nos. 6,643,765 and 6,.725, 356, and Proposed Order, and Exhibits A–U (*MicroUnity Systems Engineering, Inc. v. Sony Computer Entertainment America, Inc.*, 2:05–cv–505, U.S.D.C., E.D. Texas, Marshall Division).

Oct. 29, 2007 MU's Response Brief in Opposition to Sony's Motion for Partial Summary Judgment of Invalidity of U.S. Patent Nos. 6,643,765 and 6,725,356, and Proposed Order (*MicroUnity Systems Engineering, Inc. v. Sony Computer Entertainment America, Inc.*, 2:05–cv–505, U.S.D.C., E.D. Texas , Marshall Division, Oct. 29, 2007 Declaration of Michael Heim in Support of MU's Response Brief in Opposition to Sony's Motion for Partial Summary Judgment of Invalidity of U.S. Pat.ent Nos. 6,643,765 and 6,725,356, and Exhibits A–P (*MicroUnity Systems Engineering, Inc. v. Sony Computer Entertainment America, Inc.*, 2:05–cv–505, U.S.D.C., E.D. Texas, Marshall Division).

Nov. 6, 2007 Order Granting Joint Motion to Stay Litigation Pending Settlement (*MicroUnity Systems Engineering, Inc. v. Sony Computer Entertainment America, Inc.*, 2:05–cv–505, U.S.D.C., E.D. Texas, Marshall Division).

Dec. 12, 2007 Order of Dismissal with Prejudice and Final Judgment (*MicroUnity Systems Engineering, Inc. v. Sony Computer Entertainment America, Inc.*, 2:05–cv–505, U.S.D.C., E.D. Texas, Marshall Division).

*MU v. AMD* Aug. 6, 2007 AMD's Invalidity Contentions Under Patent Rule 3–3, and Exhibits A–I (*MicroUnity Systems Engineering, Inc. v. Advanced Micro Devices, Inc.*, 2:06–cv–486, U.S.D.C., E.D. Texas, Marshall Division).

Sep. 5, 2007 AMD's Supplemental and Consolidated Invalidity Contentions—LPR 3–3, and Exhibits A–L (*MicroUnity Systems Engineering, Inc. v. Advanced Micro Devices, Inc.*, 2:06–cv–486, U.S.D.C., E.D. Texas, Marshall Division).

Sep. 13, 2007 First Amended Complaint, and Exhibits A–K (*MicroUnity Systems Engineering, Inc. v. Advanced Micro Devices, Inc.*, 2:06–cv–486, U.S.D.C., E.D. Texas, Marshall Division).

Oct. 1, 2007 AMD's Answer to First Amended Complaint (*MicroUnity Systems Engineering, Inc.* v. *Advanced Micro Devices, Inc.*, 2:06–cv–486, U.S.D.C., E.D. Texas, Marshall Division).
Jan. 8, 2008 Order of Dismissal With Prejudice and Final Judgment (*MicroUnity Systems Engineering, Inc.* v. *Advanced Micro Devices, Inc.*, 2:06–cv–486, U.S.D.C., E.D. Texas, Marshall Division).
1979 Annual Report: The S–1 Project vol. 1 Architecture.
1979 Annual Report: The S–1 Project vol. 2 Hardware.
Abel et al., "Extensions to Fortran for Array Procesisng," ILLIAC IV Document No. 235, Department of Computer Science, University of Illinois at Urbana–Champaign (Sep. 1, 1970).
Ang, "StarT Next Generation: Integrating Global Caches and Dataflow Architecture," *Proceedings of the ISCA 1992 Dataflow Workshop* (1992).
Arends, "88110: Memory System and Bus Interface," *Northcon* (1992).
Arnould et al., "The Design of Nectar: A Network Backplane for Heterogeneous Multicomputers," ACE (1989).
Atkins, "Performance and the i860 Microprocessor," *IEEE Micro*, 24–27, 72–78 (Oct. 1991).
Awaga et al., "The µ VP 64–bit Vector Coprocessor: A New Implementation of High–Performance Numerical Computation," *IEEE Micro*, vol. 13, No. 5, 24–36 (Oct. 1993).
Barnes et al., "The ILLIAC IV Computer," *IEEE Transactions on Computers*, vol. C–17, No. 8, 746–57 (Aug. 1968).
Bass, "The PA 7100LC Microprocessor: A Case Study of IC Design Decisions in a Competitive Environment," *Hewlett–Packard J.*, vol. 46, No. 2, 12–22 (Apr. 1995).
Bell, "Ultracomputers: A Teraflop Before its Time," *Communication of the ACM*, 27–47 (Aug. 1992).
BIT Data Sheet—Product Summary: B3110/B3120/B2110/B2120 Floating Point Chip Set, Bipolar Integrated Technology, Inc. (Dec. 1986).
"Bit Manipulator," IBM Technical Disclosure Bulletin, 1575–76 (Nov. 1974).
Bowers et al., "Development of a Low–Cost, High Performance, Multiuser Business Server System," *Hewlett –Packard J.*, vol. 46, No. 2, 79 (Apr. 1995).
Broomell et al., "Classification Categories and Historical Development of Circuit Switching Topologies," *Computing Surveys*, vol. 15, No. 2, 95–133 (Jun. 1983).
Broughton et al., "The S–I Project: Top–End Computer Systems for National Security Applications," A Review Presentation to the OSD and Navy Communities, Livermore, CA (Oct. 24, 1985) —also referred to as "The S–I Project, Jan. 1985, S–I Technical Staff".
Colwell et al., "Architecture and Implementation of a VLIW Supercomputer," *IEEE*, 910–19 (1990).
Colwell et al., "A VLIW Architecture for a Trace Scheduling Compiler," *IEEE Transactions on Computers*, vol. 37, No. 8, 967–79 (Aug. 1988).
"Convex Adds GaAs System," *Electronic News* (Jun. 20, 1994).
"Convex Architecture Reference Manual (C Series)," Sixth Edition, Convex Computer Corp. (1992).
"Convex Assembly Language Reference Manual (C Series)," First Edition, Convex Computer Corp. (Dec. 1991).
"Convex C3400 Supercomputer System Overview," Convex Computer Corp. (Jul. 24, 1991).
"Convex C4/XA Offer 1 GFLOPS from GaAs Uniprocessor, "*Computergram International* (Jun. 15, 1994).

Convex C4600 Assembly Language Manual, First Edition (May 1995).
Convex Data Sheet, "C4/XA High–Performance Programming Environment," Convex Computer Corp. (1994).
Convex Notebook containing various "Machine Descriptions."
Culler et al., "Analysis Of Multithreaded Microprocessors Under Multiprogramming,"*Report No. UCB/CSD 92/687* (May 1992).
Diefendorff et al., "The Motorola 88110 Superscalar RISC Microprocessor," *IEEE*, 157–62 (1992).
Donovan et al., "Pixel Processing in a Memory Controller," *IEEE Computer Graphics and Applications*, 51–61 (Jan. 1995).
Eisig, "The Design of a 64–Bit Integer Multiplier/Divider Unit," *IEEE*, 171–78 (1993).
Excerpt from *Advanced Computer Architectures—A Design Space Approach*, Ch. 14.8, "The Convex C4/XA System".
Excerpt from Convex C4600 Assembly Language Manual (1995).
Farmwald, "High Bandwidth Evaluation of Elementary Functions," *IEEE Proceedings, 5th Symposium on Computer Arithmetic* (1981).
Farmwald, "On the Design of High–Performance Digital Arithmetic Units," Ph.D Thesis (Aug. 1981).
Farmwald, "Signal processing aspects of the S–I multiprocessor project," *SPIE*, vol. 241, Real–Time Signal Processing (1980).
Feng, "Data Manipulating Functions in Parallel Processors and Their Implementations," *IEEE Transactions on Computers*, 89–98 (Mar. 1974).
Fields, "Hunting for Wasted Computing Power: New Software for Computing Networks Puts Idle PC's to Work," *1993 Research Sampler*, Univ. of Wisconsin–Madison (1993).
Finney et al., "Using a Common Barrel Shifter for Operand Normalization, Operand Alignment and Operand Unpack and Pack in Floating Point," *IBM Technical Disclosure Bulletin*, 699–701 (Jul. 1986).
Geist, "Cluster Computing: The Wave of the Future?," Oak Ridge National Laboratory, 84OR21400 (May 30, 1994).
Ghafoor, "Systolic architecture for finite field exponentiation," *IEEE Proceedings*, vol. 136, pt. E, No. 6 (Nov, 1989).
Gilbert, "An Investigation of the Partitioning of Algorithms Across an MIMD Computing System," *Technical Note No. 176*, Computer Systems Laboratory, Stanford Univ. (Feb. 1980).
Gilder, *Microcosm. Touchstone*, Ch. 8, "Intel Minds," Simon & Schuster, New York, N.Y. (1989).
Giloi, "Parallel Programming Models and Their Interdependence with Parallel Architectures," *IEEE Proceedings* (Sep. 1993).
Gipper, "Designing Systems for Flexibility, Functionality, and Performance with the 88110 Symmetric Superscalar Microprocessor," IEEE (1992).
Gove, "The Multimedia Video Processor (MVP): a Chip Architecture for Advanced DSP Applications," *IEEE DSP Workshop*, 27–30 (Oct. 2–5, 1994).
Gove, "The MVP: A Highly–Integrated Video Compression Chip," *IEEE Data Compression Conference*, 215–24 (Mar. 1994).
Grimes et al., "A New Processor with 3–D Graphics Capabilities,"*NCGA '89 Conference Proceedings*, vol. 1, 275–84 (Apr. 17–20, 1989).

Gwennap, "IBM Creates PowerPC Processors for AS/400 Two New CPU's Implement 64–Bit Power PC with Extensions" (Jul. 31, 1995).

Gwennap, "IBM Regains Performance Lead with Power2," Microprocessor Report, vol. 7, No. 13. 1, 6–10 (Oct. 4, 1993).

Gwennap, "UltraSPARC Adds Multimedia Instructions," Microprocessor Report, vol. 8, No. 6, 1–3 (Dec. 5, 1994), MicroDesign Resources © (1994).

High Performance Computing & Communications: Toward a National Information Infrastructure, "National Science Foundation (NSF)" (1994).

"HP 9000 Series 700 Workstations Technical Reference Manual: Model 712 (System)," Hewlett–Packard Co. (Jan. 1994).

Hwang, Advanced Computer Architecture: Parallelism, Scalability, Programmability, McGraw–Hill, Inc. (1993).

Hwang et al., Computer Architecture and Parallel Processing, McGraw Hill Book Co., Singapore (1988) (7 pages).

Hwang et al., Parallel Processing for Supercomputers & Artificial Intelligence, McGraw–Hill, Inc. (1993).

Ide et al., "A 320 MFLOPS CMOS Floating–Point Processing Unit for Superscalar Processors," IEEE 1992 Custom Integrated Circuits Conference (1992).

IEEE Draft Standard for "Scalable Coherent Interface–Low– Voltage Differential Signal Specifications and Packet Encoding", IEEE Standards Department, P1596.3/D0.15 (Mar. 1992).

IEEE Draft Standard for "High–Bandwidth Memory Interface Based on SCI Signaling Technology (RamLink)," IEEE Standards Department, Draft 1.25 IEEE P1596.4–199X (May 1995).

IEEE Standard for Binary Floating–Point Arithmetic, IEEE Std 754–1985, © (1985).

"ILLIAC IV Quarterly Progress Report: Oct., Nov., Dec. 1969," ILLIAC IV Document No. 238, Department of Computer Science, University of Illinois at Urbana–Champaign (Jan. 15, 1970).

"ILLIAC IV Systems Characteristics and Programming Manual," Institute for Advanced Computation, Ames Research Center, NASA (Jun. 1, 1972).

"Intel i860 XP Microprocessor Data Book," Intel Corp. (May 1991).

Iwaki, "Architecture of a High Speed Reed–Solomon Decoder," IEEE Consumer Electronics (Jan. 1994).

Jain et al., "Square–Root, Reciprocal, Sine/Cosine, Arctangent Cell for Signal and Image Processing," IEEE ICASSP '94, II–521–II–524 (Apr. 1994).

Jovanovic et al., "Computational Science: Advances Through Collaboration," San Diego Supercomputer Center 1993 Science Report (1993).

Kane et al., "MIPS RISC Architecture," Prentice Hall (1995).

Kimura et al., "Development of Gmicro 32–bit Family of Microprocessors, Fujitsu Semiconductor Special Collection," Fujitsu, vol. 43, No. 2, 89–97 (Feb. 1992) (English translation).

Knapp et al., "Bulk Storage Application in the ILLIAC IV System," ILLIAC IV Document No. 250, Center for Advanced Computation, University of Illinois at Urbana–Champaign (Aug. 3, 1971).

Knebel et al., "HP's PA7100LC: A Low–Cost Superscalar PA–RISC Processor," IEEE, 441–47 (1993).

Kohn et al., "A 1,000,000 Transistor Microprocessor," Proceedings of the IEEE Internat'l Solid –State Circuits Conference Digest of Technical Papers, 54–55, 290 (Feb. 15, 1989).

Kohn et al., "The i860 64–Bit Supercomputing Microprocessor," AMC, 450–56 (1989).

Kohn et al., "A New Microprocessor With Vector Processing Capabilities," Electro/89 Conference Record, 1–6 (Apr. 11–13, 1989).

Kohn et al., "The Visual Instruction Set (VIS) in UltraSPARC™, " IEEE, 462–469 (1995).

Kuck et al., "The Structure of Computers and Computation: vol. 1," John Wiley & Sons, Inc. (1978).

Laudon et al., "Architectural And Implementation Tradeoffs In The Design Of Multiple–Context Processors," Technical Report No. CSL–TR–92–523 (May 1992).

Lawrie, "Access and Alignment of Data in an Array Processor," IEEE Transactions on Computers, vol. C–24, No. 12, 99–109 (Dec. 1975).

Lee et al., "MediaStation 5000: Integrating Video and Audio," IEEE Multimedia, 50–61 (Summer 1994).

Lee et al., "Pathlength Reduction Features in the PA–RISC Architecture," IEEE COMPCON, 129–35 (Feb. 24–28, 1992).

Lee, "Realtime MPEG Video via Software Decompression on a PA–RISC Processor," IEEE, 186–92 (1995).

Lee et al., "Real–Time Software MPEG Video Decoder on Multimedia–Enhanced PA 7100LC Processors, "Hewlett–Packard J., vol. 46, No. 2, 60–68 (Apr. 1995).

Le–Ngoc, "A Gate–Array–Based Programmable Reed–Solomon Codec: Structure—Implementation—Applications," IEEE Military Communications (1990).

Levinthal et al., "Parallel Computers for Graphics Applications," Pixar San Rafael, California (1987).

Lion Extension Architecture (Oct. 12, 1991).

Litzkow et al., "Condor—A Hunter of Idle Workstations," IEEE (1988).

Lowney et al., "The Multiflow Trace Scheduing Com:lter," (Oct. 30, 1992).

Maguire, "MC88110: Datpath," Northcon (1992).

Manferdelli et al., "Signal Processing Aspects of the S–I Multiprocessor Project," submitted to SPIE Annual International Technical Symposium, San Diego, SPIE, 1–8 (Jul. 30, 1980).

Markstein, "Computation of Elementary Functions on the IBM RISC System/6000 Processor," IBM J. Res. Develop., vol. 34, No. 1, 111–19 (Jan. 1990).

Martin, "An Integrated Graphics Accelerator for a Low–Cost Multimedia Workstation," Hewlett–Packard J., vol. 46, No. 2, 43–50 (Apr. 1995).

Michielse, "Programming the Convex Exemplar Series SPP System," Proceedings of Parallel Scientific Computing, First Int'l Workshop, PARA '94, 375–82 (Jun. 20–23, 1994).

"MIPS Digital Media Extension" (MDMX), rev. 1.0, C–1 to C–40.

"MIPS R4000 User's Manual," MIPS Computer Systems, Inc. (1991).

Moussouris et al., "Architecture of a Broadband MediaProcessor," Microprocessor Forum (1995).

Mueller, "The MC88110 Instruction Sequencer," Northcon (1992).

"Multimedia Extension Unit for the X86 Architecture," Compaq Computer Corp., Revision 0.8b (Jun. 20, 1995).

*Multithreaded Computer Architecture: A Summary of the State of the Art*, Ed. R. Iannucci et al., Kluwer Academic Publishers, Ch. 1 and 11 (1994).

N12 Performance Analysis dated Sep. 21, 1990.

N15 External Architecture Specification (EAS), Intel Corp., dated Oct. 17, 1990.

N15 Product Implementation Plan, Intel Corp., dated Dec. 21, 1990.

N15 Product Requirements Document, Intel Corp., dated Dec. 21, 1990.

Nienhaus, "A Fast Square Rooter Combining Algorithmic and Lookup Table Techniques," *IEEE Proceedings Southeastcon*, 1103–05 (1989).

Nikhil et al., "T: A Multithreaded Massively Parallel Architecture," *Computation Structures Group Memo 325–2*, Laboratory for Computer Science, Massachusetts Institute of Technology (Mar. 5, 1992).

Papadopoulos et al., "T: Integrated Building Blocks for Parallel Computing," ACM, 624–35 (1993).

PA–RISC 1.1 Architecture and Instruction Set Reference Manual, Manual Part No. 09740–90039, Hewlett–Packard Co. (1990).

PA–RISC 2.0 Architecture and Instruction Set Reference Manual, Hewlett–Packard Co. (1995).

Patel et al., "Architectural Features of the i860—Microprocessor RISC Core and On–Chip Caches," IEEE, 385–90 (1989).

Patterson, "Motorola Announces First High Performance Single Board Computer Using Superscalar Chip," Motorola Computer Group (1992).

Pepe, "The MC88110's High Performance Load/Store Unit," *Northcon* (1992).

Perry, "Intel's secret is out," *IEEE Spectrum*, 22–28 (Apr. 1989).

Phillip, "Performance Issues for 881100 RISC Microprocessor," IEEE (1992).

"The PowerPC™ Architecture: A Specification for a New Family of RISC Processors," Second Edition, Morgan Kaufmann Publishers, Inc., IBM Corp. (May 1994).

Rathnam et al., "An Architectural Overview of the Programmable Multimedia Processor, TM–1," *Proceedings of COMPCON '96*, IEEE (Spring 1996).

Renwick, "Building a Practical HIPPI LAN," IEEE, 355–60 (1992).

Rhodehamel, "The Bus Interface and Paging Units of the i860 Microprocessor," IEEE, 380–84 (1989).

Rohrbacher et al., "Image Processing with the Staran Parallel Computer," *IEEE Computer*, vol. 10, No. 8, 54–59 (Aug. 1977) (reprinted version 119–124).

Rubinfeld, et al., "Motion Video Instruction Extensions for Alpha," Semiconductor Eng'g Group (Oct. 18, 1996).

Ryne, "Advanced Computers and Simulation," IEEE, 3229–33 (1993).

S–1 Architecture and Assembler SMA–4 manual (Preliminary Version) (Dec. 19, 1979).

S–1 Uniprocessor Architecture (UCID 19782) (Apr. 21, 1983).

Saturn Architecture Specification, Convex (Apr. 29, 1993).

Saturn Assembly Level Performance Tuning Guide, by P. McGehearty, Convex (Jan. 1, 1994).

Saturn C4/XA Architecture Overview, Convex Technical Marketing (Nov. 11, 1993 & Feb. 4, 1994).

Saturn Differences from C Series, Convex, 1–8 (Feb. 6, 1994).

Shipnes, "Graphics Processing with the 88110 RISC Microprocessor," *IEEE COMPCON*,169–74 (Feb. 24–28, 1992).

Siegel, "Interconnection Networks for SIMD Machines," *IEEE Computer*, vol. 12, No. 6 (Jun. 1979) (reprinted version, 110–18).

Singh et al., "A Programmable HIPPI Interface for a Graphics Supercomputer," ACM (1993).

Sit et al., "An 80 MFLOPS Floating–point Engine in the Intel i860 Processor,"IEEE, 374–79 (1989).

Smith, "Cache Memories,"*Computing Surveys*, vol. 14, No. 3 (Sep. 1982).

Smotherman et al., "Instruction Scheduling for the Motorola 88110," IEEE (1993).

Takahashi et al., "A 289 MFLOPS Single Chip Vector Processing Unit," *The Institute of Electronics, Information, and Communication Engineers Technical Research Report*, 17–22 (May 28, 1992).

Tenbrink et al., "HIPPI: The First Standard for High–Performance Networking," *Los Alamos Science* (1994).

"TMS320C80 (MVP) Master Processor User's Guide," *Document No. SPRU109A*, Texas Instruments Incorporated © (Mar. 1995).

Tolmie, "Gigabit LAN Issues: HIPPI, Fibre Channel, or ATM?," *Los Alamos National Laboratory Rep. No. LA–UR 94–3994* (1994).

Tolmie et al., "HIPPI: It's Not Just for Supercomputers Anymore," *Data Communications* (May 8, 1995).

Toyokura, "A Video DSP with a Macroblock–Level–Pipeline and a SIMD Type Vector–Pipeline Architecture for MPEG2 CODEC," *ISSCC94, Section 4, Video and Communications Signal Processors, Paper WP 4.5*, 74–75 (1994).

"Trace/300 Series: F Board Architecture," *Multiflow Computer* (Dec. 9, 1988).

Tullsen et al., "Simultaneous Multithreading: Maximizing On–Chip Parallelism," *Proceedings of the 22nd Annual International Symposium on Computer Architecture* (Jun. 1995).

Uchiyama et al., "The Gmicro/500 Superscalar Microprocessor with Branch Buffers," IEEE Micro, 12–21 (Oct. 1993).

Vetter et al., "Network Supercomputing," *IEEE Network* (May 1992).

Wadleigh et al., "High–Performance FFT Algorithms for the Convex C4/XA Supercomputer," *J. of Super Computing*, vol. 9, 163–78 (1995).

Wadleigh et al., "High–Performance FFT Algorithms for the Convex C4/XA Supercomputer," Poster, *Conference on Supercomputing*, Washington, D.C. (Nov. 1994).

Wang, "Bit–Level Systolic Array for Fast Exponentiation in GF(2ôm)," *IEEE Transactions on Computers*, vol. 43. No. 7, 838–41 (Jul. 1994).

Ware et al., "64 Bit Monolithic Floating Point Processors," *IEEE J. of Solid–State Circuits*, vol. Sc–17, No. 5 (Oct. 1982).

Widdoes, "The S–1 Project: Developing High–Performance Digital Computers," *IEEE Computer Society COMPCON Spring '80* (Dec. 11, 1979).

Wilson, "The History of the Development of Parallel Computing," http://punch.purdue.edu (1994).

X86 64–Bit Extension Multimedia Instruction Set Architecture, *Intel 64–bit Multimedia ISA Ratification Summit* (Apr.–May 1992) [SCEA–1423558–655] (previously marked Confidential—Counsel Eyes Only, but released for submission).

Extended European Search Report dated Feb. 18, 2008 re Application No./Patent No. 07111351.8–1243.

IEEE Standard for Scalable Coherent Interface (SCI), Std. IEEE1596–1992, © 1993.

Motorola MC88110 Second Generation RISC Microprocessor User's Manual, document No. MC88110UM/AD, © Motorola, Inc. © 1991.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–11, dependent on an amended claim, are determined to be patentable.

New claims 12–13 are added and determined to be patentable.

1. A high bandwidth processor interface for receiving and transmitting a media stream, comprising:

a data path, the data path operable to transmit and receive media information comprising memory access requests and memory access responses at sustained peak rates;

a plurality of controllers coupled to the data path, the plurality of controllers for controlling the transmission and receipt of the media information to and from the data path; and a cache coupled to the plurality of controllers and to the data path, for buffering multiple memory access requests and memory access responses, the cache being configured to transmit and receive the media information in the form of packets comprising command information, address information, and data, the command information including identification data for linking the memory access responses to respective memory access requests, *wherein the length of a packet is indicated by an initial byte of the packet.*

*12. The high bandwidth processor interface defined in claim 1 where the identification data for linking the memory access responses to respective memory access requests is n-bits wide and allows master devices to initiate as many as $2^n$ independent operations at one time to each slave device.*

*13. The high bandwidth processor interface defined in claim 12 where n is equal to 3.*

\* \* \* \* \*